United States Patent [19]
Pearce

[11] Patent Number: 6,026,527
[45] Date of Patent: *Feb. 22, 2000

[54] GELATINOUS CUSHIONS WITH BUCKLING COLUMNS

[75] Inventor: Tony M. Pearce, Alpine, Utah

[73] Assignee: EdiZone, LC, Pleasant Grove, Utah

[ * ] Notice: This patent is subject to a terminal disclaimer.

[21] Appl. No.: 08/968,750

[22] Filed: Aug. 13, 1997

Related U.S. Application Data

[63] Continuation-in-part of application No. 08/601,374, Feb. 14, 1996, Pat. No. 5,749,111.

[51] Int. Cl.[7] .............................. A47C 27/00; A47C 27/14
[52] U.S. Cl. ...................... 5/654; 5/909; 5/948; 428/137; 428/138
[58] Field of Search ........................... 5/655.5, 654, 653, 5/740, 706, 420, 690, 953, 948, 909, 652.1, 652, 724; 428/137, 138, 131

[56] References Cited

U.S. PATENT DOCUMENTS

| | | |
|---|---|---|
| 1,228,783 | 6/1917 | Kerivan . |
| 2,491,557 | 12/1949 | Goolsbee .................................. 5/348 |
| 2,655,369 | 10/1953 | Musilli ...................................... 267/1 |
| 2,672,183 | 3/1954 | Forsyth ................................... 155/179 |
| 2,814,053 | 11/1957 | Sevik ......................................... 5/348 |
| 3,407,406 | 10/1968 | Werner et al. ................................ 2/3 |
| 3,459,179 | 8/1969 | Olesen .................................... 128/60 |
| 3,462,778 | 8/1969 | Whitney ................................... 5/347 |
| 3,518,786 | 7/1970 | Holtvoigt .................................. 46/24 |
| 3,529,368 | 9/1970 | Canfield ................................. 36/2.5 |
| 3,552,044 | 1/1971 | Wiele ........................................ 36/71 |
| 3,605,145 | 9/1971 | Graebe ...................................... 5/348 |
| 3,748,669 | 7/1973 | Warner ...................................... 5/348 |
| 3,748,779 | 7/1973 | Cherk et al. ............................. 46/115 |
| 3,801,420 | 4/1974 | Anderson ................................. 161/50 |
| 3,893,198 | 7/1975 | Blair ......................................... 5/345 |
| 3,968,530 | 7/1976 | Dyson ....................................... 5/338 |
| 3,986,213 | 10/1976 | Lynch ......................................... 3/36 |
| 4,038,762 | 8/1977 | Swan, Jr. .................................. 36/89 |
| 4,083,127 | 4/1978 | Hanson ..................................... 36/93 |
| 4,144,658 | 3/1979 | Swan, Jr. ................................. 36/117 |
| 4,163,297 | 8/1979 | Neumark .................................. 5/446 |
| 4,229,546 | 10/1980 | Swan, Jr. ................................. 521/55 |
| 4,243,754 | 1/1981 | Swan, Jr. ................................. 521/55 |
| 4,247,963 | 2/1981 | Reddi ......................................... 5/450 |
| 4,252,910 | 2/1981 | Schaefer ................................. 521/145 |
| 4,255,202 | 3/1981 | Swan, Jr. ................................ 106/122 |
| 4,256,304 | 3/1981 | Smith et al. ............................. 273/60 |
| 4,274,169 | 7/1981 | Standiford .................................. 5/502 |
| 4,279,044 | 7/1981 | Douglas ..................................... 5/453 |
| 4,292,701 | 10/1981 | Woychick ................................. 5/422 |
| 4,335,476 | 6/1982 | Watkin ....................................... 5/464 |
| 4,335,478 | 6/1982 | Watkin ....................................... 5/740 |
| 4,369,284 | 1/1983 | Chen ....................................... 524/476 |
| 4,370,769 | 2/1983 | Herzig et al. ............................. 5/452 |
| 4,422,194 | 12/1983 | Viesturs et al. ........................... 5/451 |
| 4,467,053 | 8/1984 | Markle .................................... 521/128 |
| 4,472,847 | 9/1984 | Gammons et al. ........................ 5/453 |
| 4,483,029 | 11/1984 | Paul ........................................... 5/453 |
| 4,485,505 | 12/1984 | Paul ........................................... 5/453 |

(List continued on next page.)

FOREIGN PATENT DOCUMENTS

| | | |
|---|---|---|
| 0 614 622 A1 | 9/1994 | European Pat. Off. . |
| 1106958 | 3/1968 | United Kingdom . |
| 2 150 431 | 7/1985 | United Kingdom . |
| WO 91/04290 | 4/1991 | WIPO . |
| WO 92/14387 | 9/1992 | WIPO . |
| WO 96/39065 | 12/1996 | WIPO . |
| WO 97/17001 | 5/1997 | WIPO . |

*Primary Examiner*—Alexander Grosz
*Attorney, Agent, or Firm*—Daniel McCarthy; Brick Power

[57] ABSTRACT

A cushioning element that has a number of substantially parallel elongate columns which buckle under an appropriate load. The cushioning element may be formed from a soft, easily deformable elastic or visco-elastic cushioning media. As a force is exerted against the cushioning element generally parallel to a column, the cushioning media may compress, and eventually the walls of the column may buckle. This equalizes pressure across the contact area of the object being cushioned.

38 Claims, 45 Drawing Sheets

U.S. PATENT DOCUMENTS

| | | | |
|---|---|---|---|
| 4,485,568 | 12/1984 | Landi et al. | 36/44 |
| 4,498,205 | 2/1985 | Hino | 5/449 |
| 4,541,136 | 9/1985 | Graebe | 8/456 |
| 4,572,174 | 2/1986 | Eilender et al. | 128/149 |
| 4,588,229 | 5/1986 | Jay | 297/459 |
| 4,618,213 | 10/1986 | Chen | 350/96.34 |
| 4,628,557 | 12/1986 | Murphy | 5/446 |
| 4,660,238 | 4/1987 | Jay | 5/431 |
| 4,686,724 | 8/1987 | Bedford | 5/468 |
| 4,698,864 | 10/1987 | Graebe | 5/441 |
| 4,709,431 | 12/1987 | Shaktman | 5/481 |
| 4,713,854 | 12/1987 | Graebe | 5/481 |
| 4,726,624 | 2/1988 | Jay | 297/459 |
| 4,728,551 | 3/1988 | Jay | 428/76 |
| 4,737,998 | 4/1988 | Johnson, Sr. | 5/422 |
| 4,744,564 | 5/1988 | Yamada | 273/232 |
| 4,761,843 | 8/1988 | Jay | 5/431 |
| 4,842,330 | 6/1989 | Jay | 297/4 |
| 4,913,755 | 4/1990 | Grim | 156/145 |
| 4,945,588 | 8/1990 | Cassidy et al. | 5/451 |
| 4,952,190 | 8/1990 | Tarnoff et al. | 446/267 |
| 4,952,439 | 8/1990 | Hanson | 428/72 |
| 4,953,913 | 9/1990 | Graebe | 297/459 |
| 4,959,059 | 9/1990 | Eilender et al. | 604/358 |
| 5,010,608 | 4/1991 | Barnett et al. | 5/453 |
| 5,013,518 | 5/1991 | Gilroy et al. | 5/453 |
| 5,015,313 | 5/1991 | Drew et al. | 156/87 |
| 5,018,790 | 5/1991 | Jay | 297/458 |
| 5,020,176 | 6/1991 | Dotson | 5/453 |
| 5,027,801 | 7/1991 | Grim | 128/80 H |
| 5,039,567 | 8/1991 | Landi et al. | 428/116 |
| 5,052,068 | 10/1991 | Graebe | 5/455 |
| 5,053,436 | 10/1991 | Delgado | 521/64 |
| 5,058,291 | 10/1991 | Hanson | 36/117 |
| 5,074,620 | 12/1991 | Jay et al. | 297/337 |
| 5,079,786 | 1/1992 | Rojas | 5/450 |
| 5,079,787 | 1/1992 | Pollman | 5/450 |
| 5,093,138 | 3/1992 | Drew et al. | 426/68 |
| 5,100,712 | 3/1992 | Drew et al. | 428/68 |
| 5,103,518 | 4/1992 | Gilroy et al. | 5/453 |
| 5,111,544 | 5/1992 | Graebe | 5/470 |
| 5,147,685 | 9/1992 | Hanson | 428/189 |
| 5,149,173 | 9/1992 | Jay et al. | 297/284.9 |
| 5,152,023 | 10/1992 | Graebe | 5/654 |
| 5,163,196 | 11/1992 | Graebe et al. | 5/654 |
| 5,171,766 | 12/1992 | Mariano et al. | 523/218 |
| 5,180,619 | 1/1993 | Landi et al. | 428/116 |
| 5,190,504 | 3/1993 | Scatterday | 482/49 |
| 5,191,752 | 3/1993 | Murphy | 54/44.5 |
| 5,201,780 | 4/1993 | Dinsmoor, III et al. | 5/455 |
| 5,203,607 | 4/1993 | Landi . | |
| 5,204,154 | 4/1993 | Drew et al. | 428/68 |
| 5,211,446 | 5/1993 | Jay et al. | 297/444 |
| 5,255,404 | 10/1993 | Dinsmoor, III et al. | 5/451 |
| 5,262,468 | 11/1993 | Chen | 524/476 |
| 5,282,286 | 2/1994 | MacLeish | 5/654 |
| 5,289,878 | 3/1994 | Landi et al. | 168/14 |
| 5,314,735 | 5/1994 | Aiken | 428/116 |
| 5,330,249 | 7/1994 | Weber et al. | 297/214 |
| 5,334,646 | 8/1994 | Chen | 524/474 |
| 5,334,696 | 8/1994 | Olson et al. | 528/322 |
| 5,335,907 | 8/1994 | Spector | 273/58 |
| 5,336,708 | 8/1994 | Chen | 524/474 |
| 5,352,023 | 10/1994 | Jay et al. | 297/452.21 |
| 5,360,653 | 11/1994 | Ackley | 428/71 |
| 5,362,734 | 11/1994 | Schapel et al. | 528/58 |
| 5,369,828 | 12/1994 | Graebe | 5/654 |
| 5,403,642 | 4/1995 | Landi et al. | 428/116 |
| 5,421,874 | 6/1995 | Pearce | 106/122 |
| 5,429,852 | 7/1995 | Quinn | 428/71 |
| 5,444,881 | 8/1995 | Landi et al. | 5/653 |
| 5,445,861 | 8/1995 | Newton et al. | 428/116 |
| 5,456,072 | 10/1995 | Stern | 54/44.5 |
| 5,490,299 | 2/1996 | Dinsmoor, III et al. | 5/654 |
| 5,496,610 | 3/1996 | Landi et al. | 428/116 |
| 5,508,334 | 4/1996 | Chen | 524/474 |
| 5,549,743 | 8/1996 | Pearce | 106/122 |
| 5,592,706 | 1/1997 | Pearce | 5/654 |
| 5,617,595 | 4/1997 | Landi et al. | 5/428 |
| 5,626,657 | 5/1997 | Pearce | 106/122 |
| 5,633,286 | 5/1997 | Chen | 5/636 |
| 5,636,395 | 6/1997 | Serda | 5/691 |
| 5,689,845 | 11/1997 | Sobieralski et al. | 5/654 |

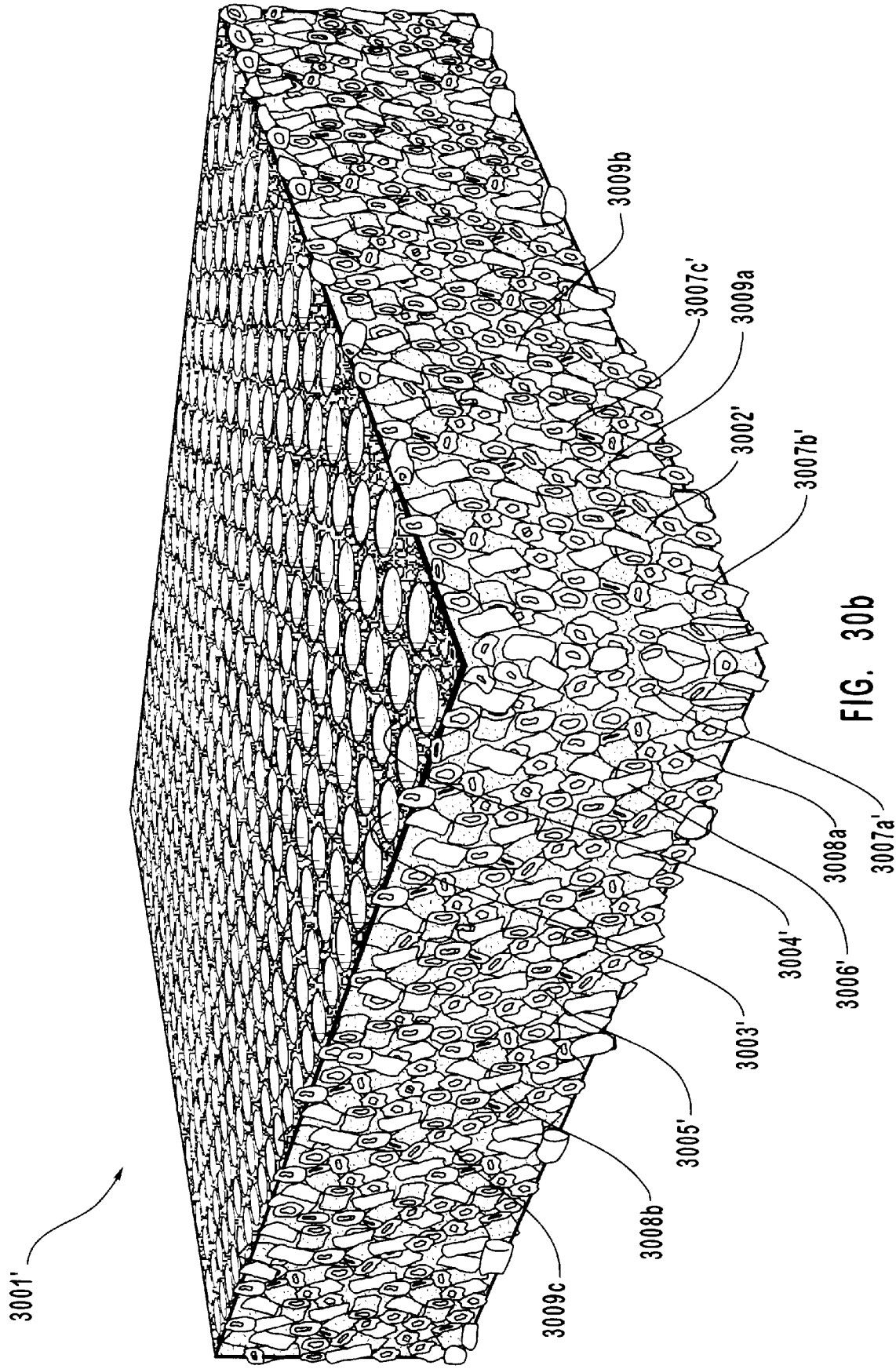

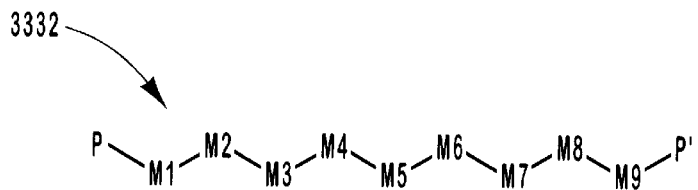
FIG. 34a
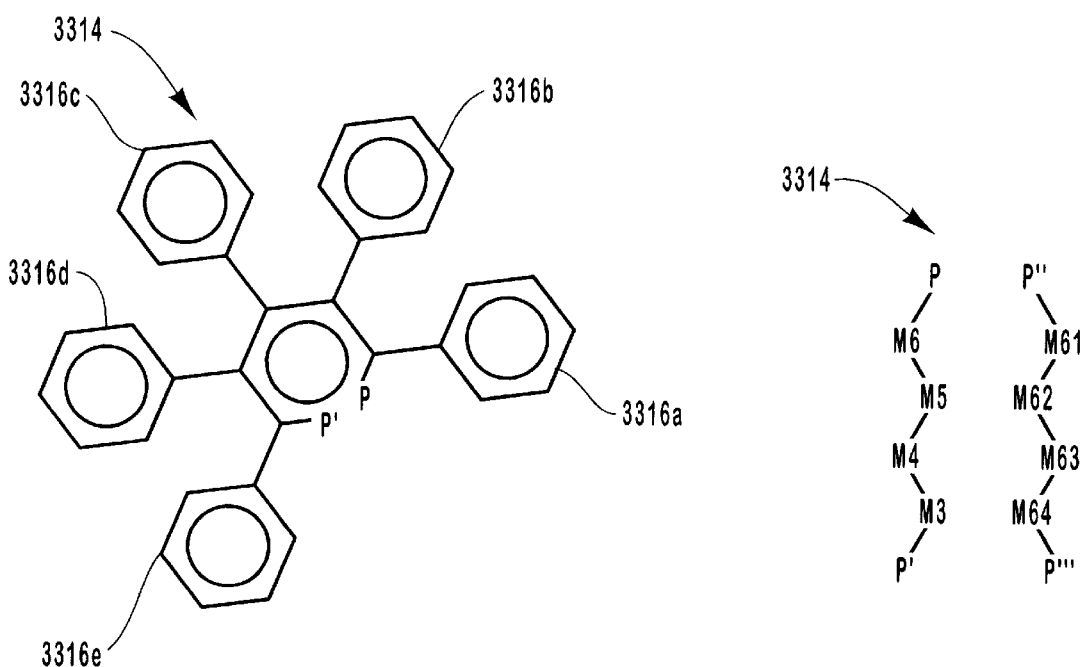
FIG. 34b
FIG. 34c
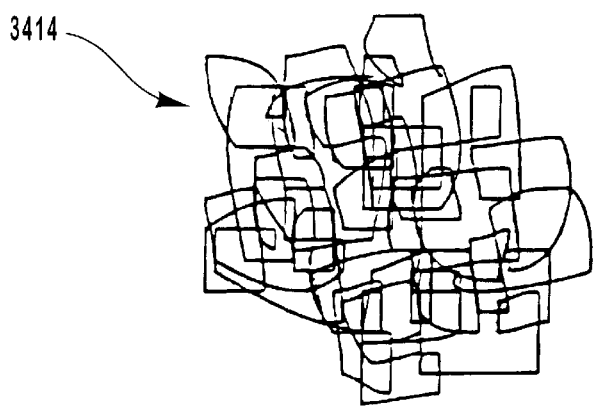
FIG. 34d

GELATINOUS CUSHIONS WITH BUCKLING COLUMNS

This patent application is a continuation-in-part application of U.S. patent application Ser. No. 08/601,374, filed on Feb. 14, 1996, now U.S. Pat. No. 5,749,111 and priority is claimed thereto for all of the material disclosed either explicitly or inherently therein.

I. BACKGROUND OF THE INVENTION

A. Field of the Invention

This invention relates to the field of cushions. More particularly, this invention relates to a cushion made of gelatinous elastomer, gelatinous visco-elastomer, or materials with similar characteristics which has hollow columns that compress to provide cushioning and which buckle to relieve pressure peaks.

B. The Background Art

In the prior art, there have been numerous attempts to provide a cushion which achieves comfort by eliminating peak pressure areas and by evenly distributing the cushioning force over a broad surface area. The relevant prior art of which the inventor is aware is categorized and summarized below.

1. Foam Cushions: Foam cushions typically include open cell polyurethane foam because of its low cost and light weight. The open cells are, in effect, air bubbles within the polyurethane which can be compressed and from which air can escape when a force, such as the weight of a cushioned object, is placed on the foam. Alternatively, foam cushions may use closed cell foam, in which the cells contain air or another gas, but the cells are closed so that the air or gas cannot escape even when a compressive force is applied to the foam. Closed cell cushions tend to resist deformation more than similarly constructed open cell cushions. In function, foam cushions behave much the same as a spring, permitting the cushioned object to sink into the foam and to be supported by rebound pressure; the more the cushioned object sinks into the foam, the higher the rebound pressure. When the cushioned object is removed, the foam has a tendency to return to its original shape, a characteristic referred to as "shape memory."

A significant problem with foam cushions is that protruding portions of the object being cushioned are placed under the highest pressure due to the foam's spring-like behavior, resulting in pressure on the cushioned object not being equalized. "Pressure peaks," as defined herein, means areas of a cushioned object which are subject to the greatest amounts of pressure when placed upon a cushioning surface. Closed cell foam cushions tend to create even worse pressure peaks than open cell foam cushions due to their inability to permit gas to escape from their cells when the cushion is called on to support an object.

Examples of cushions that include foam are included in the following documents: U.S. Pat. No. 4,713,854 issued in the name of Graebe on Dec. 22, 1987; U.S. Pat. No. 4,709,431 issued in the name of Shaktman on Dec. 1, 1987; U.S. Pat. No. 4,628,557 issued in the name of Murphy on Dec. 16, 1986; U.S. Pat. No. 4,467,053 issued in the name of Markle on Aug. 21, 1984; U.S. Pat. No. 3,518,786 issued in the name of Holtvoigt on Jul. 7, 1970; and U.S. Pat. No. 5,335,907 issued in the name of Spector on Aug. 9, 1994, each of which is hereby incorporated in its entirety for the material disclosed therein.

The following patents include both foam and a gel or fluid (see discussion of gels below): U.S. Pat. No. 4,952,539 issued in the name of Hanson on Aug. 29, 1990; U.S. Pat. No. 5,147,685 issued in the name of Hanson on Sep. 15, 1992; U.S. Pat. No. 5,058,291 issued in the name of Hanson on Oct. 22, 1991; U.S. Pat. No. 5,255,404 issued in the name of Dinsmoor, III et al. on Oct. 26, 1993; U.S. Pat. No. 5,201,780 issued in the name of Dinsmoor, III et al. on Apr. 13, 1993; U.S. Pat. No. 4,842,330 issued in the name of Jay on Jun. 27, 1989; and U.S. Pat. No. 4,726,624 issued in the name of Jay on Feb. 23, 1988, each of which is hereby incorporated in its entirety for the material disclosed therein.

2. Fluid Cushions: Some in the prior art have attempted to design a comfortable cushion using some type of a flowable fluid (such as liquid, air, gas, emulsion, lubricated objects or particles, etc.) within one or more fluid-tight bladders. When an object is placed on the fluid cushion, or when an object resting on the cushion is re-positioned, the fluid flows within the bladder and the bladder correspondingly deforms to conform to the shape of the object being cushioned. This results in a cushion which tends to equally distribute a cushioning pressure across the entire contact surface of the object being cushioned, and maximizes the percentage of the surface area of the object which is under pressure. Correspondingly, this also eliminates or reduces pressure peaks on the cushioned object.

Prior art fluid cushions have a number of problems, however. First, when the object being cushioned is shifted or repositioned on the fluid cushion, instability may result. Second, depending upon the type of fluid used, the cushion may have a high thermal mass and a high rate of thermal transfer, resulting in a cushion which is cold to the touch and which tends to draw heat out of the object being cushioned. This can result in discomfort when the object being cushioned is a human being. Third, fluid cushions are typically very costly to manufacture. Fourth, due to the necessity of maintaining a fluid-tight bladder, fluid cushions may be unreliable due to the possibility of bladder puncture. Fifth, if a fluid cushion is not of sufficient thickness, the object being cushioned may displace enough of the cushioning fluid to bottom out against a base on which the fluid bladder is resting, resulting in little or no cushioning effect. Sixth, fluid cushions have little shape memory, so they do not return to their original shape when the cushioned object is removed. Consequently, fluid cushions do not have an aesthetically pleasing appearance and are typically not considered appropriate for furniture. Seventh, fluid cushions typically do not permit good air circulation between the cushioned object and the cushion, resulting in moisture building up between the cushioned object and the bladder (e.g., perspiration from a human body). And eighth, many (but not all) prior art fluid cushions tended to be very heavy. However, fluid cushions which use the composite mixture disclosed in U.S. Pat. Nos. 5,421,874, 5,549,743 and 5,626,657, each of which issued in the name of Pearce, tend to be lightweight.

Examples of fluid cushions include the following: United Kingdom Patent No. 1,261,475 which was published on Jan. 26, 1972; U.S. Pat. No. 5,369,828 issued in the name of Graebe on Dec. 6, 1994; U.S. Pat. No. 5,103,518 issued in the name of Gilroy et al. on Apr. 14, 1992; U.S. Pat. No. 4,945,588 issued in the name of Cassidy et al. on Aug. 7, 1990; U.S. Pat. No. 4,737,998 issued in the name of Johnson, Sr. on Apr. 19, 1988; U.S. Pat. No. 4,485,505 issued in the name of Paul on Dec. 4, 1984; U.S. Pat. No. 4,292,701 issued in the name of Woychick on Oct. 6, 1981; U.S. Pat. No. 3,462,778 issued in the name of Whitney on Aug. 26, 1969; U.S. Pat. No. 2,672,183 issued in the name of Forsyth on Mar. 16, 1954; U.S. Pat. No. 2,814,053 issued in the name of Sevcik on Nov. 26, 1957; U.S. Pat. No. 2,491,557 issued in the name of Goolsbee on Dec. 20, 1949; U.S. Pat. No. 5,100,712 issued in the name of Drew et al. on Mar. 31, 1992; U.S. Pat. No. 5,255,404 issued in the name of Dinsmoor, III et al. on Oct. 26, 1994; U.S. Pat. No. 5,204,154 issued in the name of Drew et al. on Apr. 20, 1993; U.S. Pat. No. 5,201,780 issued in the name of Dinsmoor, III et al. on Apr. 13, 1993; U.S. Pat. No. 5,147,685 issued in the name of Hanson on Sep. 15, 1992; U.S. Pat. No. 5,058,291 issued in the name of Hanson on Oct. 22, 1991; U.S. Pat. No. 5,020,176 issued in the name of Dotson on June 4, 1991; U.S. Pat. No. 5,018,790 issued in the name of Jay on May 28, 1991; U.S. Pat. No. 5,093,138 issued in the name of Drew et al. on Mar. 3, 1992; U.S. Pat. No. 4,842,330 issued in the name of Jay on Jun. 27, 1989; U.S. Pat. No. 4,761,843 issued in the name of Jay on Aug. 9, 1988; U.S. Pat. No. 4,728,551 issued in the name of Jay on Mar. 1, 1988; U.S. Pat. No. 4,726,624 issued in the name of Jay on Feb. 23, 1988; U.S. Pat. No. 4,660,238 issued in the name of Jay on Apr. 28, 1987; U.S. Pat. No. 4,588,229 issued in the name of Jay on May 13, 1986; U.S. Pat. No. 4,483,029 issued in the name of Paul on Nov. 20, 1984; U.S. Pat. No. 4,255,202 issued in the name of Swan, Jr. on Mar. 10, 1981; U.S. Pat. No. 4,247,963 issued in the name of Reddi on Feb. 3, 1981; U.S. Pat. No. 4,243,754 issued in the name of Swan, Jr. on Jan. 6, 1981; U.S. Pat. No. 4,229,546 issued in the name of Swan, Jr. on Oct. 21, 1980; U.S. Pat. No. 4,144,658 issued in the name of Swan, Jr. on Mar. 20, 1979; U.S. Pat. No. 4,083,127 issued in the name of Hanson on Apr. 11, 1978; U.S. Pat. No. 4,038,762 issued in the name of Swan, Jr. on Aug. 2, 1977; U.S. Pat. No. 3,968,213 issued in the name of Lynch on Oct. 19, 1976; and U.S. Pat. No. 3,748,669 issued in the name of Warner on Jul. 31, 1973, each of which is hereby incorporated by reference in its entirety for the material disclosed therein.

3. Gel Cushions: Another design which those in the prior art attempted to employ to create an effective cushion included the use of gelatinous materials ("gels"). Gelatinous materials are soft elastic or viscoelastic materials which easily deform but return to their original shape after the deforming force is removed. The prior art gel cushions had one or more of the following problems. First, gel cushions had a high thermal mass and a high coefficient of thermal transfer, making them cold to the touch and causing them to drain heat out of a cushioned object. Second, gel cushions tended to be costly to manufacture. Third, gel cushions had limited compressibility and therefore did not permit the cushioned object to sink deep into the gel. As a result, only a small surface area of the cushioned object is cushioned by a prior art gel cushion, resulting in a greater supporting force being applied on that small surface area than would be applied if a greater surface area of the cushioned object were to contact the gel cushion for support. This is because in order for the cushioned object to sink into prior art gel cushions, the cushions, which tended to be relatively incompressible, must expand in directions generally normal to the direction of the intended sinking, a behavior which cannot be accommodated in most cushioning applications.

Notwithstanding their problems in the prior art, gel cushions have some attractive features. For example, a gel cushion permits a near-hydrostatic pressure distribution across the surface area of the cushioned object if the cushioned object is allowed to sink into the gel and the overall dimensions of the cushion are not restricted so that such sinking in would be prevented. Also, many gel cushions have the aesthetic advantage, through their shape memory, of being capable of returning to their original shape after the cushioned object is removed.

Documents which disclose gel cushions include: U.S. Pat. No. 5,456,072 issued in the name of Stern on Oct. 10, 1995; U.S. Pat. No. 5,362,834 issued in the name of Schapel et al. on Nov. 8, 1994; U.S. Pat. Nos. 5,336,708, 5,334,646, 5,262,468, 4,618,213 and 4,369,284, each of which issued in the name of Chen; U.S. Pat. No. 5,191,752 issued in the name of Murphy on Mar. 9, 1993; and U.S. Pat. No. 4,913,755 issued in the name of Grim on Apr. 3, 1990, each of which is hereby incorporated by reference in its entirety.

4. Thermoplastic Film Honeycomb Cushions: Another type of cushion in the prior art is made from multiple perforated sheets of pliable thermoplastic film which are intermittently welded together and then expanded into a pliable plastic honeycomb. Honeycomb cushions may have problems such as a high cost of manufacture and an inability to equalize supporting pressure in order to avoid pressure peaks on the most protruding parts of the object being cushioned. This is because of the relatively rigid nature of the thermoplastic and thermoplastic elastomer films used in the honeycomb cushion construction. Honeycomb cushions also carry the risk that the cushioned object will bottom out through the cushion. This is because the films are thin and relatively rigid, so collapsed cells within the cushion offer no real cushioning effect.

The advantages of honeycomb cushions include their light weight. Most of the cushion consists of voids within the cells of the honeycomb, the voids being filled with air, resulting in a lightweight cushion. Another advantage is that honeycomb cushions provide good air circulation between the cushioned object and the cushion due to the perforations in the cell walls of the honeycomb and/or in the facing sheets above and below the honeycomb cells.

Examples of honeycomb or multilayer film cushions are as follows: U.S. Pat. No. 5,445,861 issued in the name of Newton et al. on Aug. 29, 1995; U.S. Pat. No. 5,444,881 issued in the name of Landi et al. on Aug. 29, 1995; U.S. Pat. No. 5,289,878 issued in the name of Landi on Mar. 1, 1994; U.S. Pat. No. 5,203,607 issued in the name of Landi on Apr. 20, 1993; U.S. Pat. No. 5,180,619 issued in the name of Landi et al. on Jan. 19, 1993; U.S. Pat. No. 5,015,313 issued in the name of Drew et al. on May 14, 1991; U.S. Pat. No. 5,010,608 issued in the name of Barnett et al. on Apr. 30, 1991; U.S. Pat. No. 4,959,059 issued in the name of Eilender et al. on Sep. 25, 1990; and U.S. Pat. No. 4,485,568 issued in the name of Landi et al. on Dec. 4, 1984, each of which is hereby incorporated by reference in its entirety.

5. Mattressing: In the prior art there has been work in the field of mattressing, which is considered to be related background against which the invention was made. For references with disclosure relevant to mattressing, the reader is directed to United Kingdom Patent No. 1,261,475 which was published on Jan. 26, 1972; U.S. Pat. No. 5,369,828 issued in the name of Graebe on Dec. 6, 1994; U.S. Pat. No. 5,103,518 issued in the name of Gilroy et al. on Apr. 14, 1992; U.S. Pat. No. 4,945,588 issued in the name of Cassidy et al. on Aug. 7, 1990; U.S. Pat. No. 4,737,998 issued in the name of Johnson, Sr. on Apr. 19, 1988; U.S. Pat. No. 4,485,505 issued in the name of Paul on Dec. 4, 1984; U.S. Pat. No. 4,292,701 issued in the name of Woychick on Oct. 6, 1981; U.S. Pat. No. 3,462,778 issued in the name of Whitney on Aug. 26, 1969; U.S. Pat. No. 2,672,183 issued in the name of Forsyth on Mar. 16, 1954; U.S. Pat. No. 2,814,053 issued in the name of Sevcik on Nov. 26, 1957; and U.S. Pat. No. 2,491,557 issued in the name of Goolsbee on Dec. 20, 1949, each of which is hereby incorporated by reference.

The reader will find that the prior art thus had numerous shortcomings which are addressed by the invented cushion, as outlined below.

II. SUMMARY OF THE INVENTION

It is an object of the invention to provide a cushion that distributes supporting pressure on an object being cushioned in a manner that is generally even and without pressure peaks. It is a feature of the invention that the cushion has a low surface tension and permits a cushioned object to sink deeply into it. This action is due to compressibility of the cushion. It is also a feature of the invented cushion that some of the columns present in the invented cushion tend to buckle under the weight of the object being cushioned. This buckling is especially useful in accommodating protrusions from the object being cushioned into the cushion. The ability to accommodate protrusions through buckling of the cushion columns eliminates pressure peaks. It is a consequent advantage of the invention that the invented cushion is comfortable and does not tend to constrict blood flow in the tissue of a human being on the cushion, thus being suitable for medical applications and other applications where the object being cushioned may be immobile for long periods of time, such as in automobile seats, furniture, mattresses, and other applications.

It is an object of the invention to provide a cushion that eliminates pressure peaks on an object being cushioned. It is a feature of the invention, as mentioned above, that the invented cushion includes columns which buckle under protuberances on a cushioned object. As a result, the cushioned object is not exposed to pressure peaks.

It is an object of the invention to maximize the surface area of the cushioned object that is in contact with the cushion by permitting the cushioned object to sink deeply into the cushion, without the prior art problem that exterior surfaces of the cushion that are not in the plane in contact with the cushioned object must expand. It is a feature of the invented cushion that the cushion is compressible and that the cushion includes columns within it that can buckle under the weight of the cushioned object. The bottom of the cushion and its outside periphery, not including the surface of the cushion in contact with the cushioned object, may, if desired, be restrained, but the compressibility and bucklability of the cushion will still permit the cushioned object to sink into the cushion. It is an advantage of the invention that a gel cushion is provided which can have a constrained periphery but which will still permit a cushioned object to sink deeply into it.

It is an object of the invention to provide a cushion that eliminates the head pressure found in some fluid cushions. In fluid cushions, the flowable media may be drawn by gravity so that it exerts pressure on some portions of the cushioned object as the cushioning media attempts to flow in response to the gravitational force. This pressure is referred to as "head pressure." Head pressure can cause discomfort and tissue damage to a human using the cushion. The gel from which the invented cushion is made does not develop head pressure.

It is an object of the invention to provide a cushion which is inexpensive to manufacture compared to prior art cushions. It is a feature of the invention that the invented cushion may be very quickly and cheaply injection molded or cast from suitable low cost gel materials. It is an advantage of the invention that a cushion which incorporates the features of the invention may be produced for substantially less cost than prior art cushions with comparable performance characteristics.

It is an object of the invention to provide a cushion that is stable as the center of gravity of the cushioned object is shifted. It is a feature of the invention that a cushioned object may sink deeply into the cushion. It is also a feature of the invention that the gel of the invented cushion does not allow flow of the cushioning media as in fluid cushions. It is another feature of the invented cushion that it is adapted to accommodate the sinking in of an object but tends to be relatively rigid in a horizontal direction and thus resist horizontal displacing forces. Consequently, an object being cushioned by the invented cushion can be shifted on the cushion without a tendency of the cushion to move unpredictably underneath the cushioned object. As a result, the invented cushion displays a high degree of stability.

It is an object of the invention to provide a cushion that will not lose its structural integrity or cushioning effect if punctured. It is a feature of one preferred embodiment of the invention that the gel used to make the cushion is a solid (although a flexible, resilient solid) at ordinary room temperatures (i.e. below 130° Fahrenheit). Thus, even if the cushion is punctured, there is no escape of cushioning media, as would occur if a prior art fluid cushion were punctured. It is thus an advantage of the invention that superior durability is provided in the cushion.

It is an object of the invention to provide a cushion that has shape memory. It is a feature of the invented cushion that a gel is used to make the cushion that tends to return to its original shape after a displacing force (such as the gravitational force exerted on a cushioned object) is removed. It is an advantage of the invention that attractive cushions suitable for devices such as furniture, automobile seats, theatre seats, etc. are provided. Prior art fluid cushions were not desirable for such applications because they tended to retain the shape of the cushioned object after the cushioned object was removed. This was considered unsightly. The invented cushion, in contrast, returns to its orignal, as-new shape after the cushioned object is removed.

It is an object of the invention to provide a cushion which provides a superior amount of air circulation between the cushion and the cushioned object in comparison to the prior art. It is a feature of the invention that hollow columns are provided in one preferred embodiment of the invention through which air may circulate. The surface area of the cushioned object that is in contact with the cushion is therefore in contact only with the perimeter rims of the hollow columns. Thus, most of the surface area of the cushioned object within the perimeter of the outermost points of contact between the cushioned object and the cushion is exposed to air circulation through the hollow columns. It is thus an advantage of this structure that heat buildup between the cushioned object and the cushion is lessened in comparison with the prior art cushions. If the cushioned object is a human being, this structure provides the human being with far greater comfort than prior art cushions because the invented cushion will facilitate rapid evaporation of sweat rather than causing a sweat buildup as in prior art cushions.

It is an object of the invention to provide a cushion that is lightweight. This is an important object for all applications of the invention, but particularly important for medical applications. It is a feature of the invention that the invented cushion includes a number of hollow columns so that the predominant volume of space occupied by the cushion is actually occupied by a gas such as air. Consequently, the total weight of the cushion is low.

It is an object of the invention to provide a cushion that has a low rate of thermal transfer and a low thermal mass. Many prior art cushions, such as fluid cushions, felt cold to the touch and tended to draw heat out of a human being resting on the cushion. This caused discomfort to the human being. The invented cushion occupies a volume of space predominantly with a gas such as air which has a low thermal mass. It is an advantage of the invention that the cushion has a substantially reduced tendency to feel cold to the touch, compared to the prior art, and that the cushion does not tend to draw heat from the object being cushioned. The result is a comfortable cushion.

It is an object of the invention to provide a cushion that will offer cushioning protection to a cushioned object even if the cushioned object has bottomed out within the cushion. A cushioned object is considered to have bottomed out within a cushion if it has sunk into the cushion beyond the point where the normal cushioning mechanism is effective. An alternative way of stating this is that the cushioned object has sunk into the cushion to the extent that a portion of the cushion has been compressed to an extent that is not further compressible. The invented cushion, due to the elastic nature of the gel used, tends to have more give and resiliency than a hard surface, such as a wooden chair, would, even when the cushioned object has bottomed out in the cushion. If bottoming out were to occur, the cushion has comparable cushioning to many gel cushions in the prior art. Thus, the cushion continues to provide some cushioning effect beneath the portion of the cushioned object that has bottomed out. Additionally, the cushion will continue to cushion effectively beneath the portion of the cushioned object that has not bottomed out within the cushion.

It is an object of the invention to provide a cushion that has a great range of compressibility. The invented cushion, in its preferred embodiments, has a substantial depth measurement along its vertical columns. The cushioned object sinks into the cushion some portion of that depth measurement. The preferred cushion has enough depth and compressibility that the cushioned object can be of a very wide range of weights and still receive effective cushioning from the invented cushion.

It is an object of the invention to provide a cushion that achieves near hydrostatic pressure distribution across the contact area of the object being cushioned. The compressibility of the gel columns provides good overall cushioning, and the buckling of columns beneath the most protruding points relieves pressure at the points where pressure tends to be highest in prior art foam or solid gel cushions.

These and other objects, features and advantages of the invention will become apparent to persons of ordinary skill in the art upon reading the specification in conjunction with the accompanying drawings.

III. BRIEF DESCRIPTION OF THE DRAWINGS

FIG. 23b is a cross section taken along line 23b—23b of FIG. 23a.

FIG. 23c is a frontal perspective view of an alternate configuration of the embodiment shown in FIG. 23a.

FIG. 24b is a cross section taken along line 24b—24b of FIG. 24a.

FIG. 25b is a cross section taken along line 25b—25b of FIG. 25a.

FIG. 25c is a cross section taken along line 25c—25c of FIG. 25a.

FIG. 27b is a cross section taken along line 27b—27b of FIG. 27a.

FIG. 27c is a cross section taken along line 27c—27c of FIG. 27a.

FIG. 30b is a frontal perspective view of an alternative configuration of the cushioning element shown in FIG. 30a, wherein the column walls include voids created by extracting space consuming objects therefrom following molding of the cushioning medium.

FIG. 34a depicts a midblock (B) of the triblock copolymer of FIG. 32a.

FIG. 34b depicts an endblock (A) of the triblock copolymer of FIG. 32a.

FIG. 34c depicts the weak bonding between the monomer unites of one or more midblocks (B) of the triblock copolymer of FIG. 32a.

FIG. 34d depicts an endblock (A) of the triblock copolymer of FIG. 32a, showning the endblock (A) in a relaxed state.

III. DESCRIPTION OF THE PREFERRED EMBODIMENT

A. Configuration of the Cushions

Figure 1:
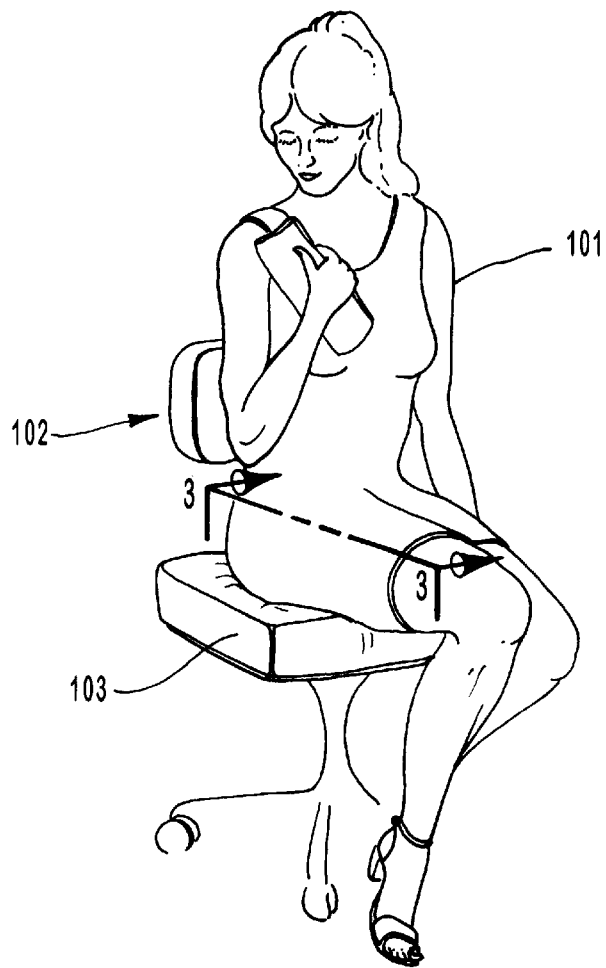
FIG. 1 depicts the invented cushion as part of an office chair.

FIG. 1 depicts a cushioned object 101, in this instance a human being, atop of a piece of furniture 102, in this instance a chair, which includes the invented cushion 103. Although in this embodiment, the invented cushion 103 is depicted as part of an office chair, the invented cushion may be used with many types of products, including furniture such as sofas, love seats, kitchen chairs, mattresses, lawn furniture, automobile seats, theatre seats, padding found beneath carpet, padded walls for isolation rooms, padding for exercise equipment, wheelchair cushions, bed mattresses, and others.

Figure 2:
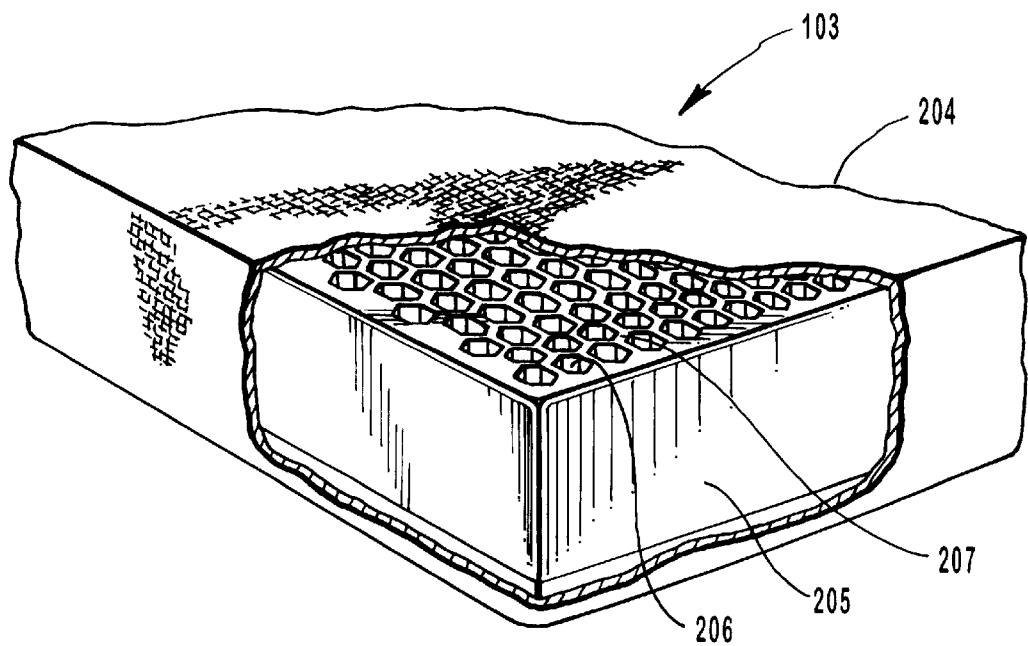
FIG. 2 depicts the invented cushion including its cushioning element and cover.

Referring to FIG. 2, the cushion 103 of FIG. 1 is depicted in greater detail. The cushion 103 includes a cover 204. The preferred cover is a durable and attractive fabric, such as nylon, cotton, fleece, synthetic polyester or another suitable material which is preferably stretchable and elastic and which readily permits the flow of air through it to enhance ventilation of a cushioned object. Within the cover 204, a cushioning element 205 is to be found. As can be seen from FIG. 2, the cushioning element 205 comprises a cushioning media of a desired shape. In the embodiment depicted, the cushioning element 205 includes gel cushioning media formed generally into a rectangle with four sides, a top and a bottom, with the top and bottom being oriented toward the top and bottom of the page, respectively. The cushioning element has within its structure a plurality of hollow columns 206. As depicted, the hollow columns 206 contain only air. The hollow columns 206 are open to the atmosphere and therefore readily permit air circulation through them, through the cover 204 fabric, and to the cushioned object. The columns 206 have column walls 207 which in the embodiment depicted are hexagonal in configuration. It is preferred that the total volume of the cushioning element will be occupied by not more than about 50% gel cushioning media, and that the rest of the volume of the cushioning element will be gas or air. More preferably, the total volume of the cushioning element will be occupied by as little as about 9% cushioning media, and the rest of the volume of the cushion will be gas or air. This yields a lightweight cushion with a low overall rate of thermal transfer and a low overall thermal mass. It is not necessary that this percentage be complied with in every instance that the inventive concept is practiced, however.

Figure 3:
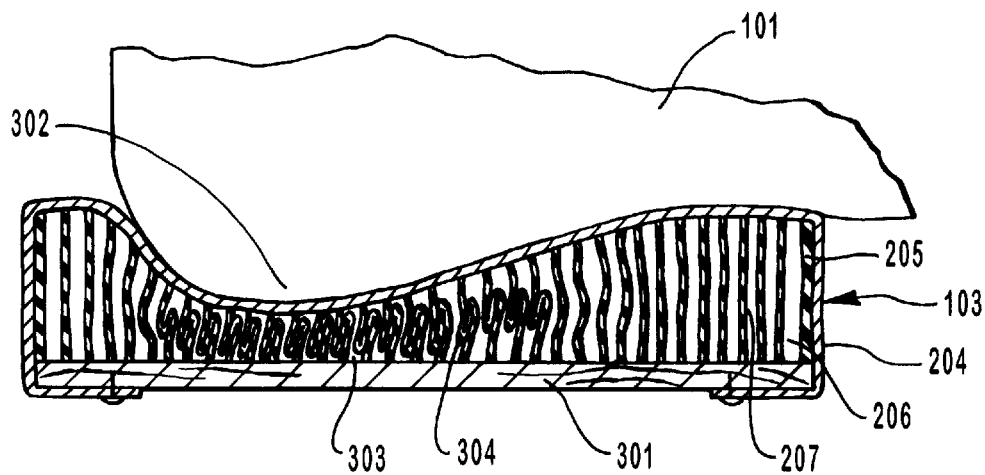
FIG. 3 depicts a cutaway of the invented cushion of FIG. 1 at 3—3.

Referring to FIG. 3, a cushioned object 101, in this instance a human being, is depicted being cushioned by the invented cushion 103 which includes cushioning element 205 within cover 204. Also visible is a cushion base 301 of a rigid material such as wood, metal, plastic on which the cushioning element 205 rests. The cushioning element 206 includes hollow columns 206 with walls 207. It can be seen that beneath the most protruding portion of the cushioned object, in this instance a hip bone 302, the hollow columns 303 have walls 304 which have partially or completely buckled in order to accommodate the protuberance 302 and avoid creating a high pressure point below the protuberance 302 in response to the compressive force exerted by the cushioned object. Buckled columns offer little resistance to deformation, thus removing pressure from the hip bone area. It can also be seen that in portions of the cushioning element 205 which are not under the protuberance 302, the cushioning media which forms the walls 304 of the hollow columns 303 has compressed but the columns 303 have not buckled, thus loading the cushioned object across the broad surface area of its non-protruding portions. The cushion is yieldable as a result of the compressibility of the cushioning media and the bucklability of the columns (or column walls). The cushion 103 is depicted as having been manufactured using the mold depicted in FIG. 4. It can be seen from this cushion's response to a compressive force exerted by the cushioned object that the cushion and the cushioning element are adapted to have a cushioned object placed on top of them.

Figure 5:
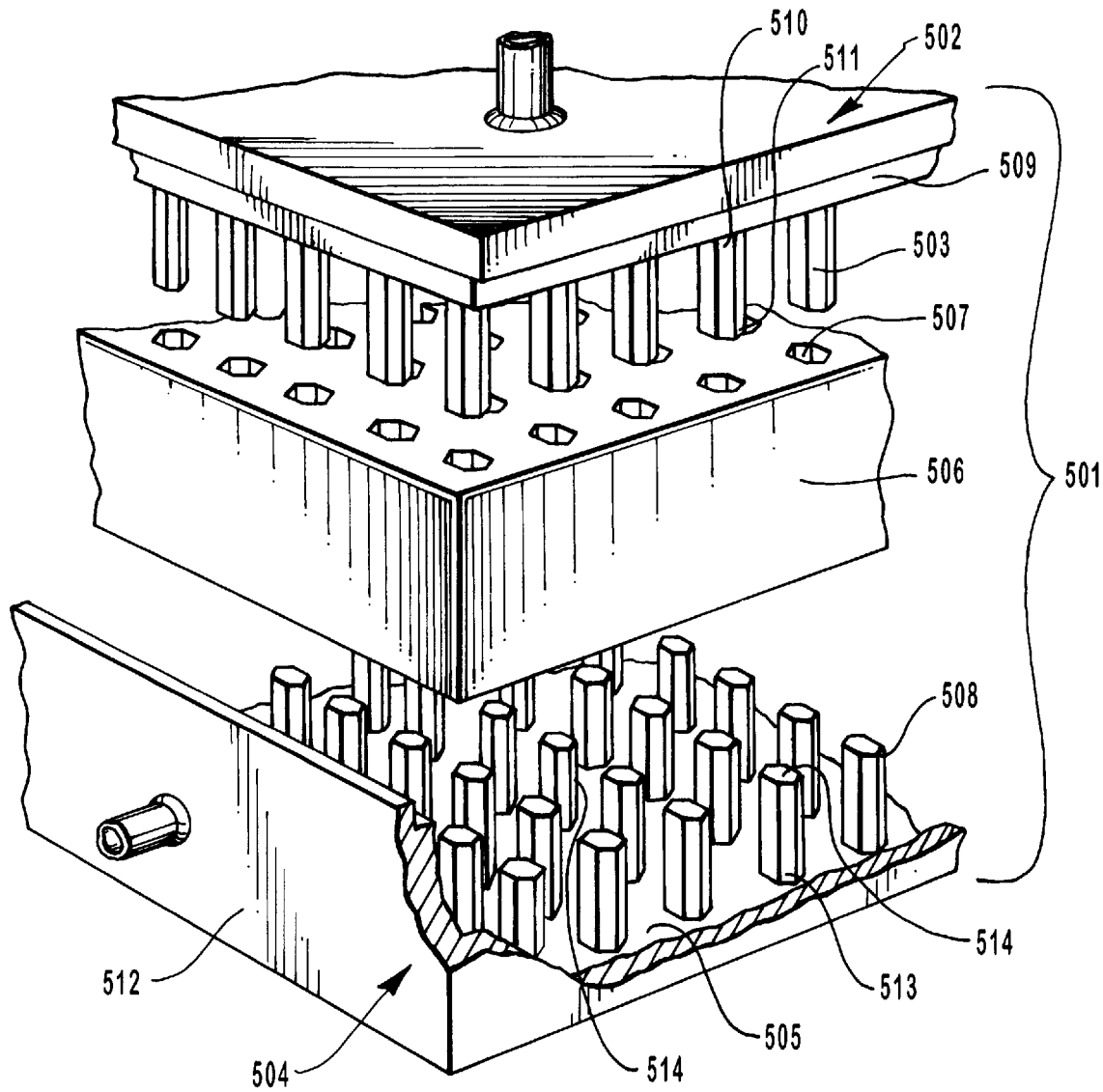
FIG. 5 depicts an alternative mold for manufacturing the invented cushion.
Figure 6:
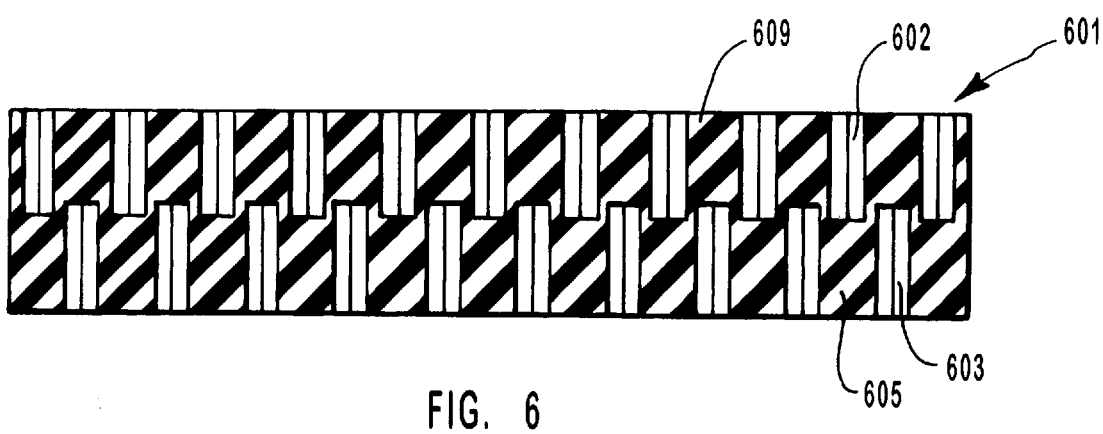
FIG. 6 depicts a cross sectional view of a cushion manufactured using the mold of FIG. 5.

Referring to FIG. 6, a cross section of an alternative embodiment of the invention is depicted. The cushioning element 601 includes cushioning media 604 (which is preferred to be a gel cushioning media) which form walls 605 for columns 602, 603. It can be seen that the columns 602 and 603 are oriented into a group protruding from the top of the cushioning element 601 down into the cushioning media 604 but not reaching the bottom of the cushioning element of which column 602 is a member, and a group protruding from the bottom of the cushioning element 601 into the cushioning element 601 but not reaching the top of the cushioning element 601 of which column 602 is a member. This yields a generally firmer cushion than that shown in some other figures. This cushion would be manufactured by the mold depicted in FIG. 5.

Figure 7:
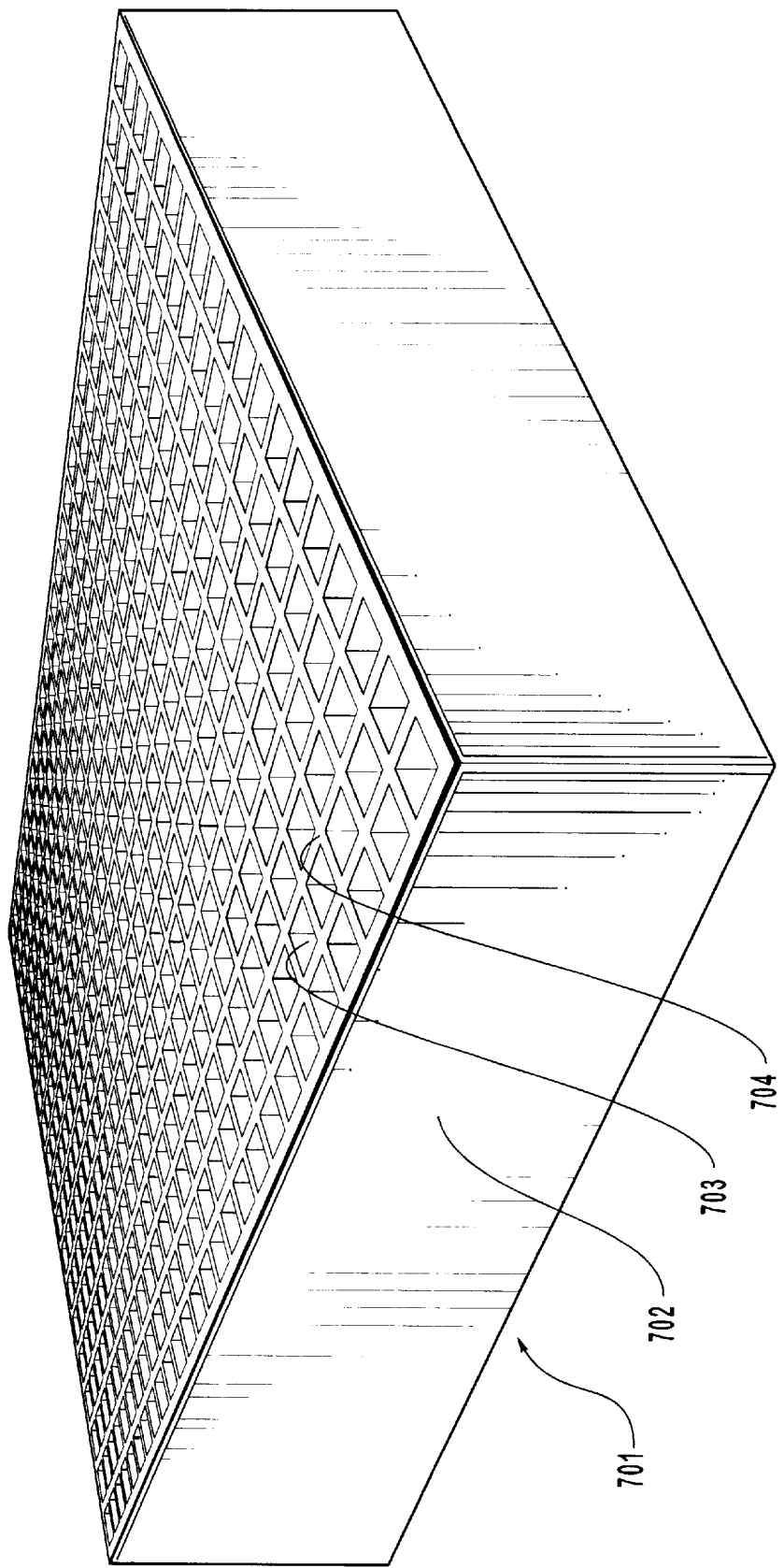
FIG. 7 depicts an isometric view of an alternative embodiment of the invented cushion.

Referring to FIG. 7, an alternative embodiment of a cushioning element 701 is depicted. The cushioning element includes cushioning media 702, columns 703 and column walls 704. The columns depicted in FIG. 7 are square in a cross section taken orthogonal to their longitudinal axis, in contrast to the columns of FIG. 2 which are hexagonal in a cross section taken orthogonal to their longitudinal axis. It is also of note that in FIG. 7, the columns 703 are arranged as an n×m matrix with each row and each column of columns in the matrix being aligned perfectly adjacent to its neighbor, with no offsetting. Examplary sizing and spacing of columns in the invention would include columns which have a cross sectional diameter taken orthogonal to the longitudinal axis of about 0.9 inch and a column wall thickness of about 0.1 inch at the thinnest point on a column wall. Many other dimensions, shapes and spacing of columns and column walls may be employed while practicing the inventive concept.

Figure 8:
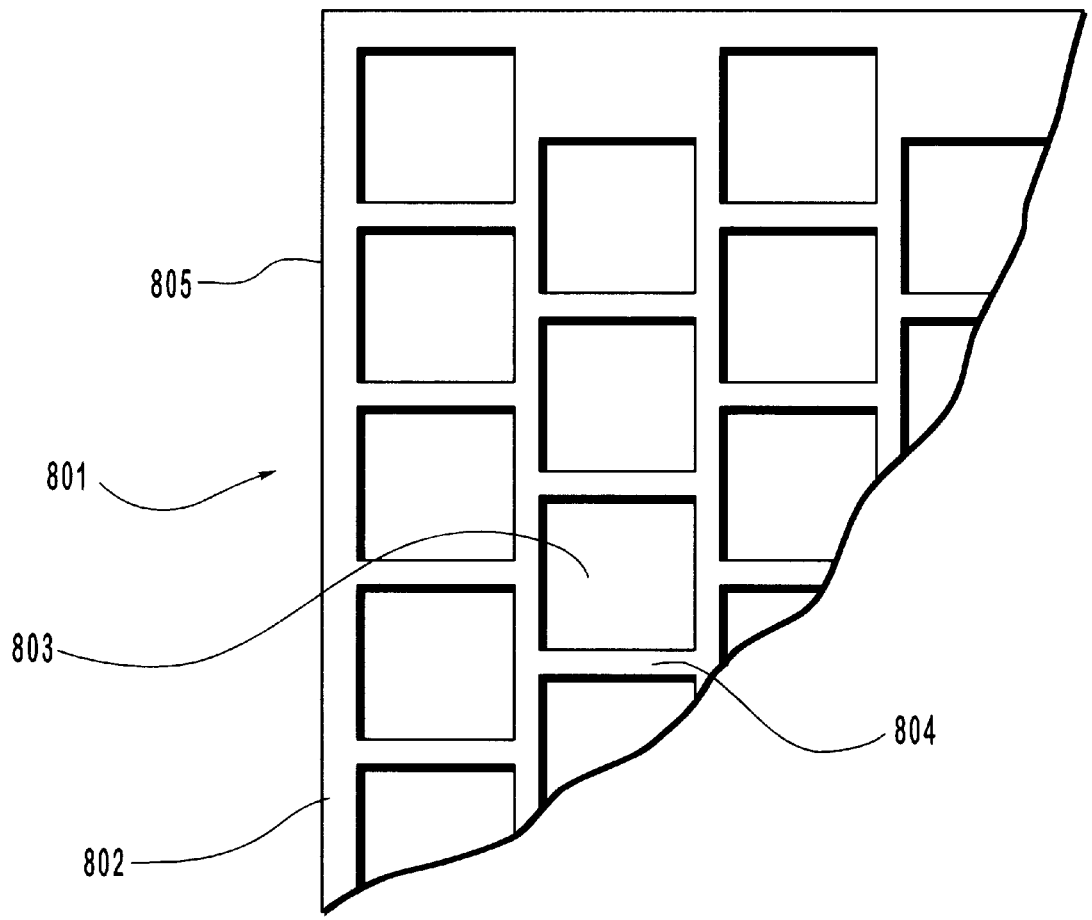
FIG. 8 depicts a top view of an alternative embodiment of the invented cushion.

Referring to FIG. 8, a top view of an alternative cushioning element 801 is depicted. The cushioning element 801 includes cushioning media 802 which forms column walls 804, columns 803 and an exterior cushioning element periphery 805. It can be seen that the columns 803 of FIG. 8 are arranged in offset fashion with respect to some of the columns to which they are adjacent. A myriad of column arrangements are possible, from well-organized arrangements of the columns to a random columnar arrangement. It is preferred that the columns be arranged so that the total volume of gel cushioning media 802 within the volume of space occupied by the cushioning element 801 is minimized. This results in a lightweight cushion. To that end, the columns 803 may be arranged in close proximity to each other in order to minimize the thickness of the column walls 804. This will result in a lighter cushion and a cushion that will yield to a greater extent under a cushioned object of a given weight than a similar cushion with thicker column walls 804.

Figure 9:
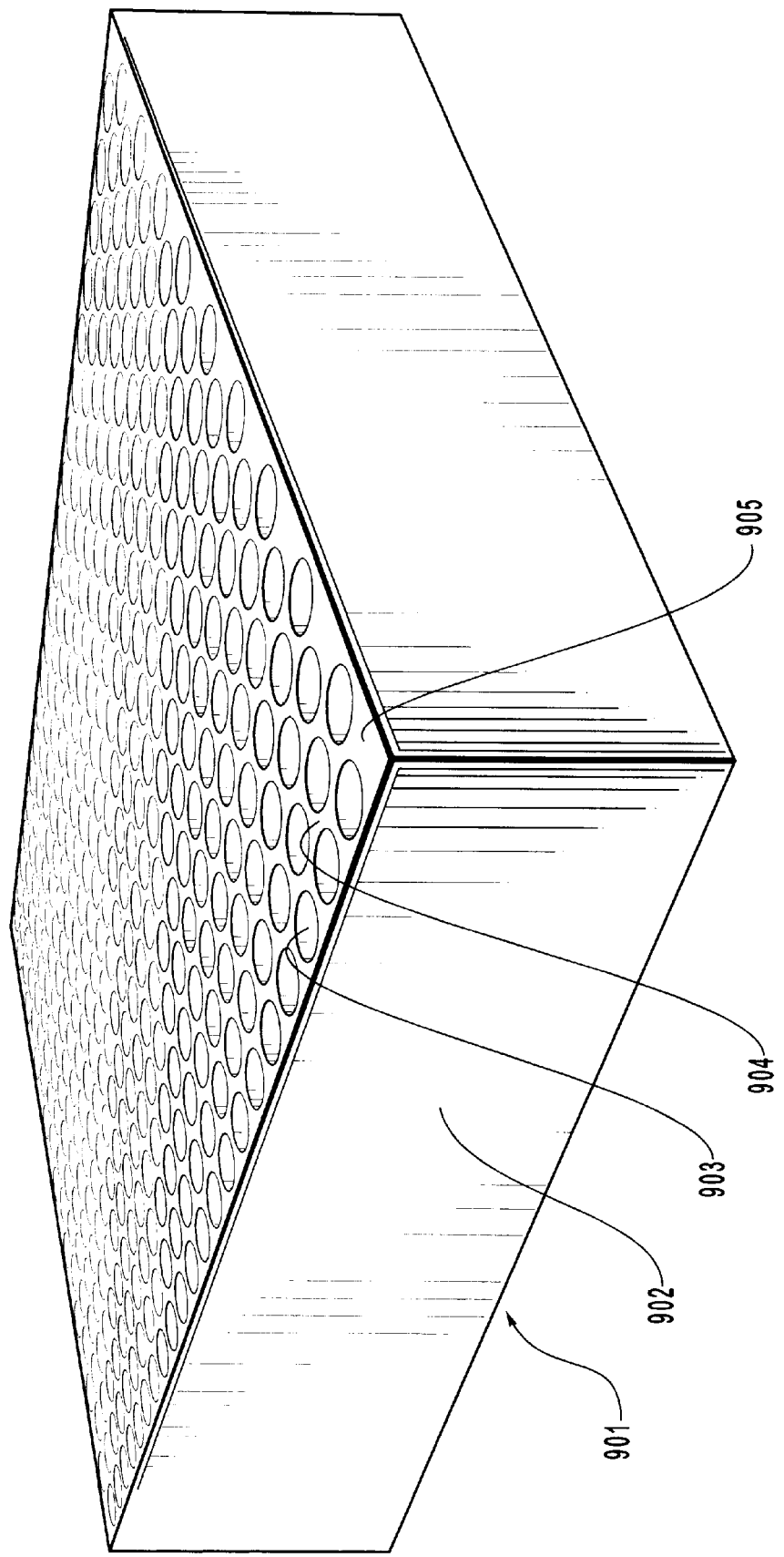
FIG. 9 depicts an isometric view of an alternative embodiment of the invented cushion.
Figure 13:
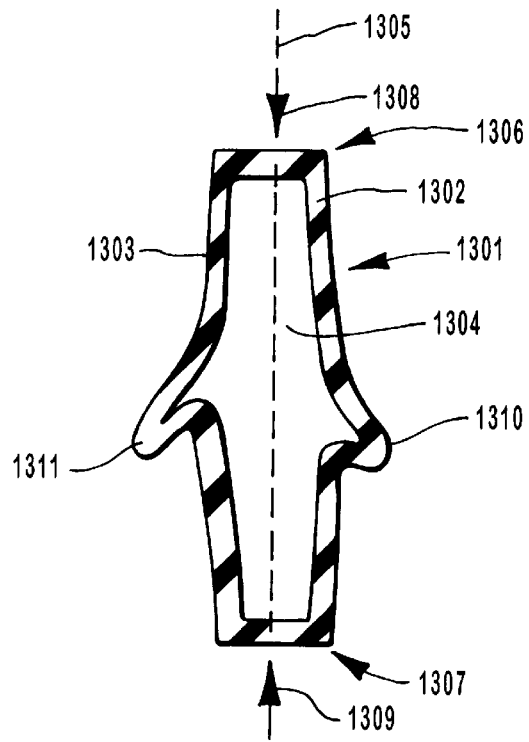
FIG. 13 depicts forces in play as a column buckles.
Figure 14:
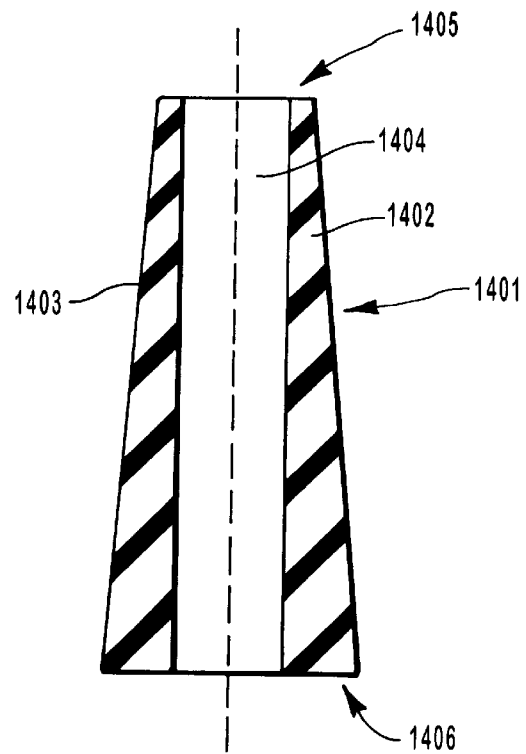
FIG. 14 depicts an alternative structure for a column and its walls.

Referring to FIG. 9, an alternative cushioning element 901 is depicted with cushioning media 902, columns 903, column walls 904 and outer periphery 905 of the cushioning element 901 being shown. The columns 902 depicted are round in a cross section taken orthogonal to their longitudinal axes. The reader should note that it may be desirable to include a container or side walls which will contain the outer periphery 905 of the cushioning element. For example, in FIG. 9, a rectangular box with interior dimensions just slightly larger than the exterior dimensions of the cushioning element 901 could be employed. Or, as shown in FIG. 1, the side walls of the cover 204 could be rigid, such as by the use of plastic inserts. The effect of rigid side walls or a rigid container for a cushioning element is that when a cushioned object is placed on the cushioning element, the cushioning media will not be permitted to bulge outward at the cushioning element outer periphery. By preventing such outward bulging, greater cushion stability is achieved and a more direct (i.e. in a direction parallel to the longitudinal axis of a column, which in most of the figures, such as FIG. 3, is assumed to be in the direction of the Earth's gravity but which may not always be so) movement or descent of the cushioned object into the cushion is achieved. A direct movement or descent of a cushioned object into the cushion (i.e. parallel to the longitudinal axes of the columns) is desired because the column walls are configured to absorb weight and cushion the cushioned object, or, if the load under a protuberance gets high enough, by buckling of the columns. If a cushioned object travels a substantial distance sideways in the cushion, the hollow portion of the columns may be eliminated by opposing column walls collapsing to meet each other rather than either substantially compressing the cushioning media or by buckling as depicted in FIGS. 13 and 14. This would not provide the desired cushioning effect as it would result in collapsed columns within the cushion (rather than buckled columns), and the cushion would have little more cushioning effect than a solid block of the cushioning media without the columns.

Figure 10:
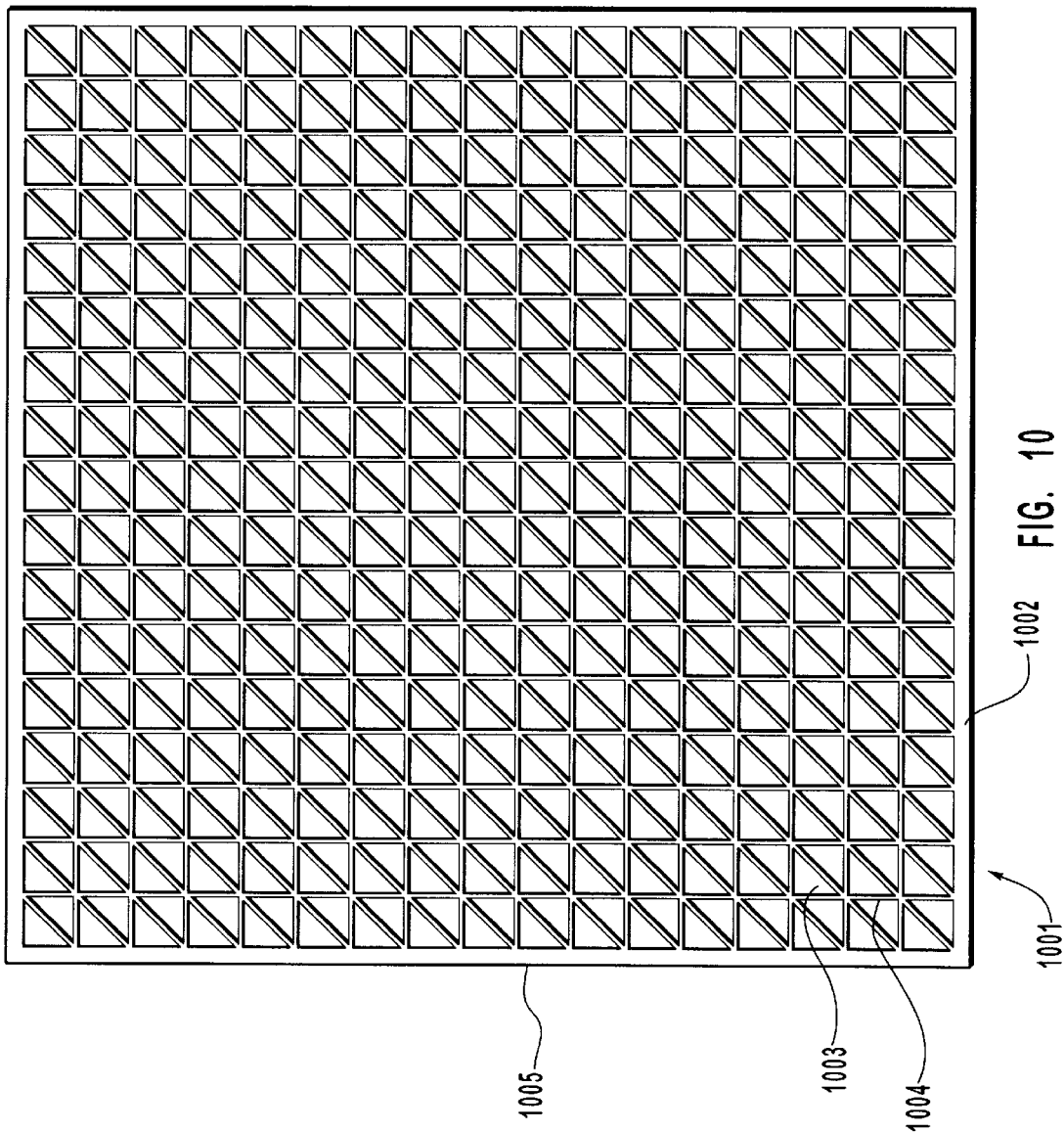
FIG. 10 depicts a top view of an alternative embodiment of the invented cushion.

Referring to FIG. 10, an alternative embodiment of the invented cushion 1001 is depicted. The cushion 1001 includes gel cushioning media 1002 in the form of an outer cushion periphery 1003, and column walls 1004 which form triangular hollow columns 1005. The reader should note that the columns of the various figures are merely illustrative, and in practice, the columns could be triangular, rectangular, square, pentagonal, hexagonal, heptagonal, octagonal, round, oval, n-sided or any other shape in a cross section taken orthogonal to the longitudinal axis of a column. The periphery of the cushioning element may also be triangular, rectangular, square, pentagonal, hexagonal, heptagonal, octagonal, round, oval, heart-shaped, kidney-shaped, elliptical, oval, egg-shaped, n-sided or any other shape.

Figure 11:
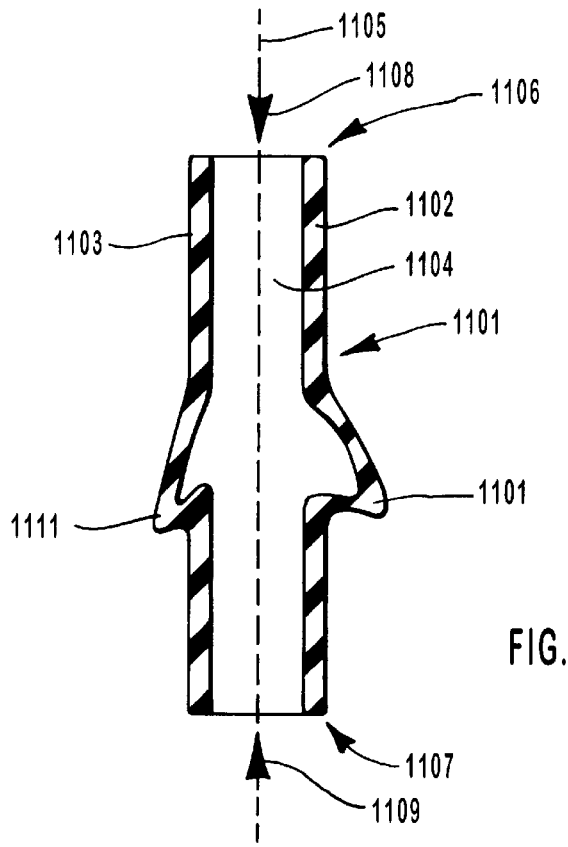
FIG. 11 depicts a cross sectional view of a column of the invention during one mode of buckling.

FIG. 11 depicts a column 1101 of the invention including column walls 1102 and 1103 and column interior 1104. The column 1101 has a longitudinal axis 1105 which is preferred to be oriented in the invented cushion parallel to the direction of the longitudinal axis of a column which should be the direction that the cushioned object sinks into the cushion. Thus, the column top 1106 is at the side of the cushion that contacts the cushioned object, and the column bottom 1107 is at the side of the cushion that typically faces the ground and will rest on some sort of a base. Another way of describing this with respect to the longitudinal axis of each column is that the column top is at one end of the longitudinal axis of a column and the column bottom is at the other end of the longitudinal axis of a column. When an object to be cushioned is placed onto a cushion which contains many such columns 1101, such as is shown in FIG. 3, a depressive force 1108 is applied to the cushion and to the column 1101 by the cushioned object. Because the cushion is expected to rest on some type of supporting surface, such as a base, a reaction force 1109 is provided by the supporting surface. The cushion, including the column 1101, yields under the weight of the cushioned object. This yielding is a result of compression of the cushioning media and, if the load under a protruding portion of the cushioned object is high enough, by buckling or partial buckling of the columns 1101. From FIG. 11, it can be seen that the depicted column 1101 buckles because the flexible cushion walls 1102 and 1103 buckle outward around the periphery of the column, as depicted by cross-sectional points 1110 and 1111. In other words, the column walls buckle radially outward orthogonally from the longitudinal axis of the column. This permits the column 1101 to decrease in total length along its longitudinal axis 1108 and thereby conform to the shape of protuberances on a cushioned object. Since buckled columns carry comparatively little load, this results in a cushion that avoids pressure peaks on the cushioned object.

Figure 12:
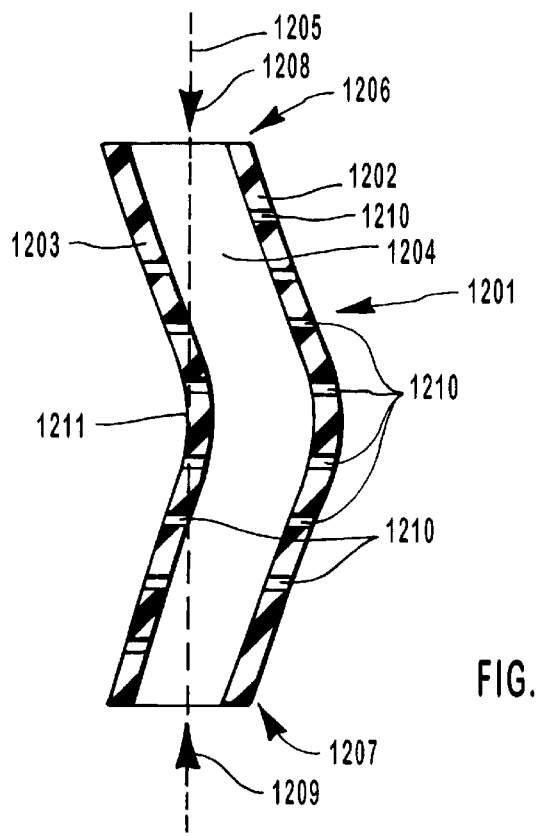
FIG. 12 depicts a cross sectional view of a column of the invention during another mode of buckling.

FIG. 12 depicts a column 1201 of the invention including column walls 1202 and 1203 and column interior 1204. The column 1201 has a longitudinal axis 1205 which is preferred to be oriented in the invented cushion parallel to the direction of movement of a cushioned object sinking into the cushion. Thus, the column top end 1206 is at the side of the cushion that contacts the cushioned object, and the column bottom end 1207 is at the side of the cushion that typically will rest on some sort of a base. When an object to be cushioned is placed against a cushion which contains numerous columns 1201, such as is shown in FIG. 3, a depressive force 1208 is applied to the cushion and to the column 1201 by the cushioned object. Because the cushion is expected to rest on some type of supporting surface, such as a base, a reaction force 1209 is provided by the supporting surface. The cushion, including the column 1201, yields under the weight of the cushioned object. This yielding is a result of compression of the cushioning media and, if the load under a protruding portion of the cushioned object is high enough, by buckling or partial buckling of the columns. From FIG. 12, it can be seen that the depicted column 1201 buckles because the flexible cushion wall 1202 buckles outward from the column center or orthogonal away from the longitudinal axis of the column at point 1210, while cushion wall 1203 buckles inward toward the column center or orthogonal toward the longitudinal axis of the column at points 1211. This buckling action causes the column 1201 to decrease in total length along its longitudinal axis 1208 and thereby conform to the shape of protuberances on a cushioned object. Point 1210 is depicted buckling outward (away from the center of the column) and point 1211 is depicted as buckling inward (toward the center of the column). Alternatively, both points 1210 and 1211 could buckle inward toward the center of the column or both could buckle outward. Since buckled columns carry comparatively little load, this results in a cushion that avoids pressure peaks on the cushioned object. Buckling of a column permits the column to decrease in total length along its longitudinal axis and thereby conform to the shape of protuberances on a cushioned object. This results in a cushion that avoids pressure peaks on the cushioned object. It should be noted by the reader that the columns 1101 and 1201 depicted in FIGS. 11 and 12 are hollow columns which have interiors completely open to the atmosphere and which permit air to travel through the columns to enhance ventilation under the cushioned object. It is also of note that the column 1201 of FIG. 12 has column walls 1202 and 1203 that include fenestrations 1210 (which may be holes or apertures in the column walls) that permit the flow of air between adjacent columns, providing an enhanced ventilation effect. Fenestrations are also useful for reducing the weight of the cushioning element. The greater the size and/or number of fenstrations in column walls, the less the cushion weighs. The fenestrations or holes 1210 in the column walls could be formed by punching or drilling, or they could be formed during molding of the cushioning element.

FIG. 13 depicts an alternative column 1301 of the invention including column walls 1302 and 1303 and a column interior 1304. The column 1301 has a longitudinal axis 1305 which, in the invented cushion, is preferably oriented parallel to the direction in which the cushioned object is expected to sink into the cushion. Thus, the column top end 1306 is at the side of the cushion that contacts the cushioned object, and the column bottom end 1307 is at the side of the cushion that typically faces some sort of a base. When an object to be cushioned is placed onto a cushion which contains column 1301, such as is shown in FIG. 3, a depressive force 1308 is applied to the cushion and to the column 1301 by the cushioned object. Because the cushion is expected to rest on some type of supporting surface, such as a base, a reaction force 1309 is provided by the supporting surface. The cushion, including the column 1301, yields under the weight of the cushioned object. This yielding is a result of compression of the cushioning media and, if the load under a protruding portion of the cushioned object is high enough, by buckling or partial buckling of the columns. From FIG. 13, it can be seen that the depicted column 1301 buckles because the flexible cushion walls 1302 and 1303 buckle outward from the column center or orthogonal away from the longitudinal axis 1305 of the column at points 1311 and 1310. This buckling action allows the column 1301 to decrease in total length along its longitudinal axis 1305 and thereby conform to the shape of protuberances on a cushioned object.

In the embodiment depicted, the column 1301 is a sealed column containing air or an inert gas within its interior 1304. Thus, as the column 1301 decreases in length along its longitudinal axis, the gas within the column interior 1304 tends to support the column top end 1306 and resist the downward movement of the cushioned object. This yields a firmer cushion. Alternatively, open or closed cell (or other) foam or fluid cushioning media could be provided within the interior of the columns or within some of them in order to increase the firmness of the cushion.

FIG. 14 depicts an alternative embodiment of the column of the invention. The column 1401 depicted has column walls 1402 and 1403 and a column interior 1404. The column interior 1404 is open at column top end 1405 and at column bottom end 1406 to permit air to pass through the column 1401. Column 1401 has walls 1402 and 1403 which are thicker at their bottom end 1406 than at their top end 1405, imparting cushions which include such columns with a soft cushioning effect when cushioning an object that sinks into the cushion to only a shallow depth, but progressively providing firmer cushioning the deeper the cushioned object sinks. This configuration of column 1401 permits the construction of a cushion which accommodates cushioned objects of a very wide variety of weight ranges. Alternatively, the column walls could be thicker at the top than at the bottom, the column walls could be stepped, or the column walls could have annular or helical grooves in them to facilitate buckling under the load of a cushioned object. Additionally, the column interior could be of a greater interior dimension orthogonal to its longitudinal axis at one end than at the other. Or the columns could be of varying dimension and shape along their longitudinal axes.

Figure 15:
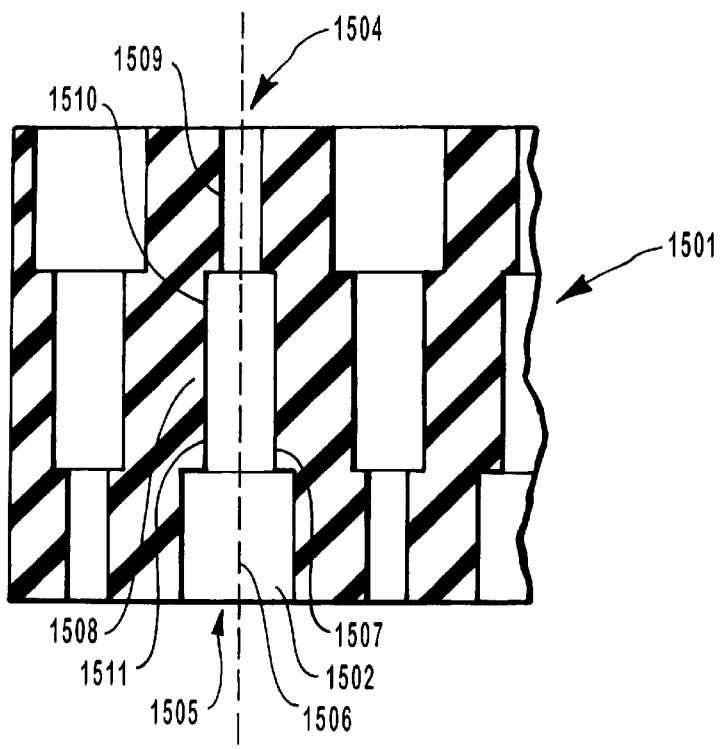
FIG. 15 depicts a cross section of a cushion using alternating stepped columns.

FIG. 15 depicts a cross section of a cushioning element using alternating stepped columns. The cushioning element 1501 has a plurality of columns 1502 each having a longitudinal axis 1503, a column top 1504 and a column bottom 1505. The column top 1504 and column bottom 1505 are open in the embodiment depicted, and the column interior or column passage 1506 is unrestricted to permit air flow through the column 1502. The column 1502 depicted has side walls 1507 and 1508, each of which has three distinct steps 1509, 1510 and 1511. The columns are arranged so that the internal taper of a column due to the step on its walls is opposite to the taper of the next adjacent column. This type of cushioning element could be made using a mold similar to that depicted in FIG. 4.

Figure 16:
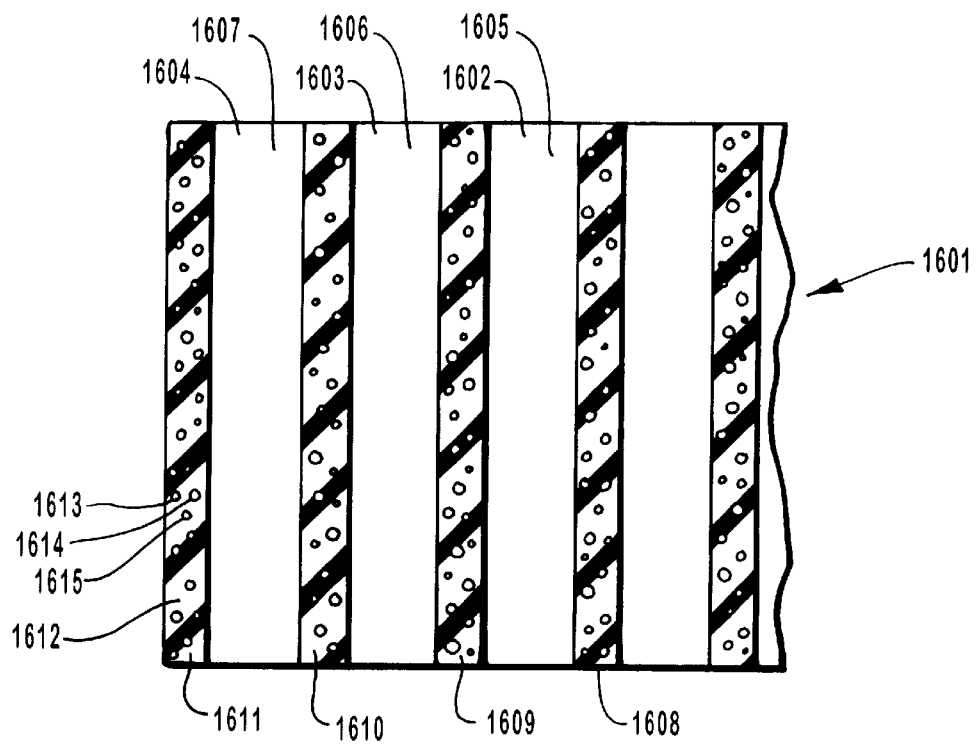
FIG. 16 depicts an alternative embodiment of the invented cushioning element having gas bubbles within the cushioning media.

FIG. 16 depicts an alternative embodiment of a cushioning element 1601. The cushioning element 1601 has a plurality of columns 1602, 1603 and 1604, each having a column interior 1605, 1606 and 1607, and column walls 1608, 1609, 1610 and 1611. The column walls are made from cushioning media, such as the preferred soft gel. In the embodiment of the invented cushioning element 1601 depicted, the cushioning media 1612 has trapped within it a plurality of gas bubbles 1613, 1614 and 1615. When the preferred soft gel cushioning medium is used, since the gel is not flowable at the temperatures to which the cushion is expected to be exposed during use, the bubbles remain trapped within the cushioning medium. The use of bubbles within the cushioning medium reduces the weight of the cushion and softens the cushion to a degree which might not otherwise be available. Bubbles may be introduced into the cushioning medium by injecting air, another appropriate gas, or vapor into the cushioning medium before manufacturing the cushioning element, by vigorously stirring the heated, flowable cushioning medium before it is formed into the shape of a cushion, or by utilizing a cushioning medium of a composition that creates gas or boils at the temperatures to which it is subjected during the manufacture of a cushioning element. Blowing agents, some of the uses of which are described in detail below in connection with the disclosure of the preferred gel material, are also useful for introducing gas bubbles into the cushioning medium. Microspheres, which are also discussed in greater detail below, are also useful for introducing gas pockets into the cushioning medium.

Figure 17:
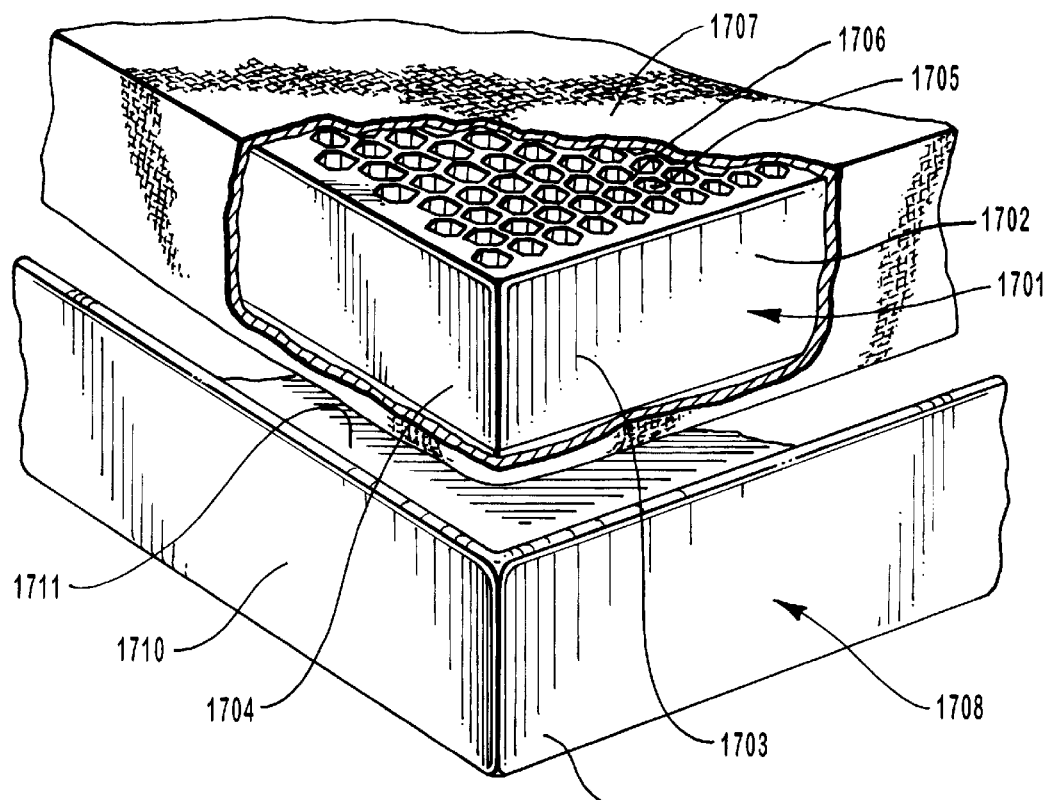
FIG. 17 depicts a cushion of the invention in use with a combination base and container.

FIG. 17 depicts an embodiment of the invented cushioning element which has cushioning medium, solid exterior walls 1703 and 1704, a plurality of columns 1705 and column walls 1706 forming the columns. Note that although FIG. 17 shows a cushioning element 1701 with solid walls 1703 and 1704, it is possible to make a cushioning element 1701 that has columns on its outer walls. The cushioning element is disposed within an optional cover 1707. A container 1708 with relatively stiff or rigid walls 1709 and 1710 of approximately the same size and shape as the cushioning element walls 1703 and 1704 is shown. The container 1708 has a bottom or base 1711 on which the cushioning element is expected to rest. The container 1708 walls 1709 and 1710 serve to restrict the outward movement of the cushioning element 1701 when a cushioned object is placed on it. When the preferred soft gel is used as a cushioning medium, the cushioning element 1701 would tend to be displaced by the object being cushioned were the side walls 1709 and 1710 of the container 1711 not provided. In lieu of a container, any type of appropriate restraining means may be used to prevent side displacement of the cushioning element in response to the deforming force of a cushioned object. For example, individual plastic plates could be placed against the side walls 1703 and 1704 of the cushioning element 1701. Those plates could be held in place with any appropriate holder, such as the cover 1707. As another example, an appropriate strap or girdle could be wrapped around all exterior side walls 1703 and 1704 of the cushioning element 1701. Such a strap or girdle would serve to restrain the cushioning element 1701 against radial outward displacement in response to a cushioned object resting on the cushioning element.

Figure 18:
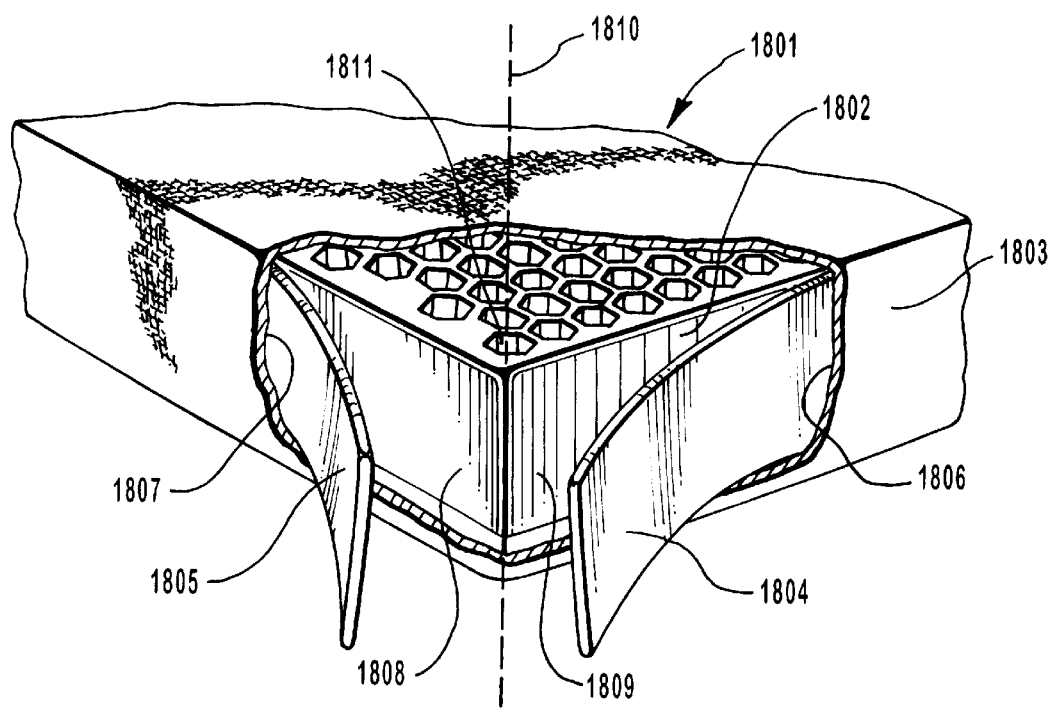
FIG. 18 depicts a cushion of the invention having side wall reinforcements to support the cushioning element.

FIG. 18 depicts an alternative embodiment of a cushion 1801 that includes a cushioning element 1802 and a cover 1803. The cushioning element 1802 has side walls 1808 and 1809 about its periphery, the side walls 1808 and 1809 in this embodiment being generally parallel with the longitudinal axis 1810 of a hollow column 1811 of the cushioning element 1802. A gap 1806 exists between the cover 1803 and the side wall 1809 of the cushioning element. This gap 1806 accommodates the insertion of a stiff or rigid reinforcing side wall support 1804 which may be made of a suitable material such as plastic, wood, metal or composite material such as resin and a reinforcing fiber. Similarly, gap 1807 between side wall 1808 and the cover 1803 may have side wall support 1805 inserted into it. The side wall supports are configured to restrict the cushioning element from being substantially displaced in an outward or radial direction (a direction orthogonal to the longitudinal axis of one of the columns of the cushioning element) so that the cushioning element's columns will buckle to accommodate the shape of a cushioned object, rather than permitting the cushioning element to squirm out from under the cushioned object.

Figure 19:
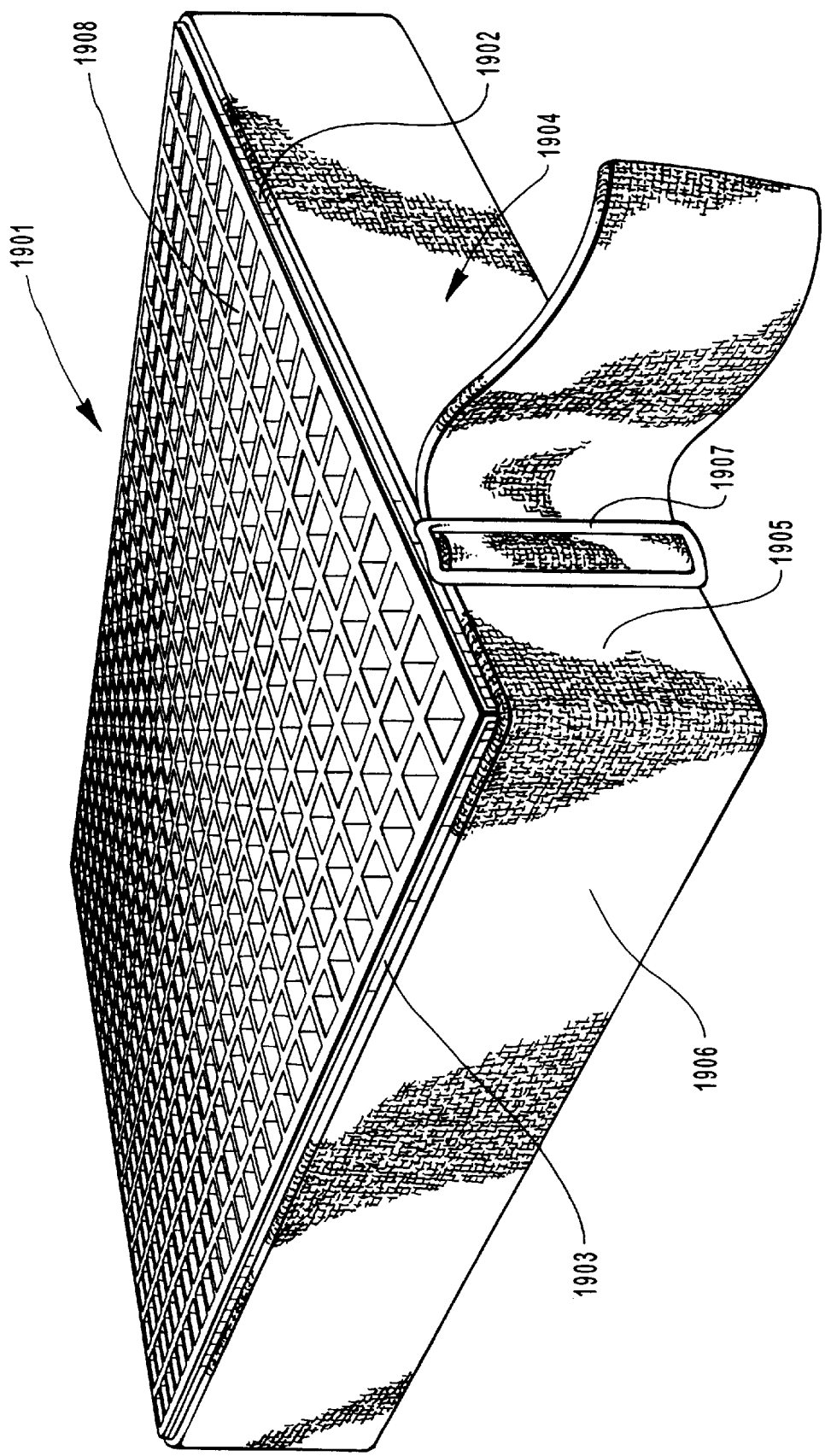
FIG. 19 depicts a cushioning element of the invention having a girdle or strap about its periphery to support the cushioning element.

FIG. 19 depicts an alternative embodiment of a cushioning element 1901 including square columns 1908. The cushioning element has outer side walls 1902 and 1903 about its periphery. The reader should note that although the outer periphery of the cushioning element in FIG. 19 is depicted as rectangular, the outer periphery could be of any desired configuration, such as triangular, square, pentagonal, hexagonal, heptagonal, octagonal, any n-sided polygon shape, round, oval, elliptical, heart-shaped, kidney-shaped, quarter moon shaped, n-sided polygonal where n is an integer, or of any other desired shape. The side walls 1902 and 1903 of the cushioning element 1901 have a peripheral strap or girdle 1904 about them. The girdle 1904 has reinforcing side walls 1905 and 1906 which reinforce the structural stability of side walls 1902 and 1903 respectively of the cushioning element 1901. The embodiment of the girdle 1904 depicted in FIG. 19 has a fastening mechanism 1907 so that it may be fastened about the periphery of the cushioning element 1901 much as a person puts on a belt. The girdle 1904 serves to confine the cushioning element 1901 so that when a cushioned object is placed on the cushioning element 1901, the cushioning element will not tend to squirm out from beneath the girdle 1904. Thus, the cushioning element 1901 will tend to yield and conform to the cushioned object as needed by having its cushioning medium compress and its columns buckle.

Figure 20:
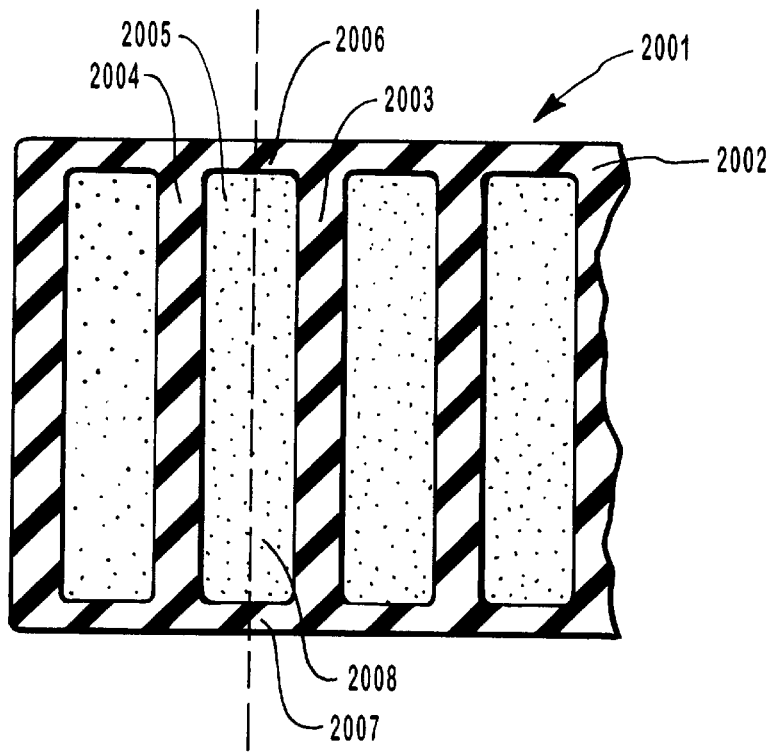
FIG. 20 depicts a cushioning element of the invention with closed column tops and bottoms and fluid cushioning media contained within the column interiors.

FIG. 20 depicts an alternative embodiment of a cushioning element 2001. The cushioning element 2001 includes cushioning medium 2002 such as the preferred gel formed into column walls 2003 and 2004 to form a column 2005. The column 2005 depicted has a sealed column top 2006 and a sealed column bottom 2007 in order to contain a column filler 2008. The column filler 2008 could be open or closed cell foam, any known fluid cushioning medium such as lubricated spherical objects, or any other desired column filler. The cushioning element 2001 depicted has an advantage of greater firmness compared to similar cushioning elements which either omit the sealed column top and column bottom or which omit the column filler.

Figure 21:
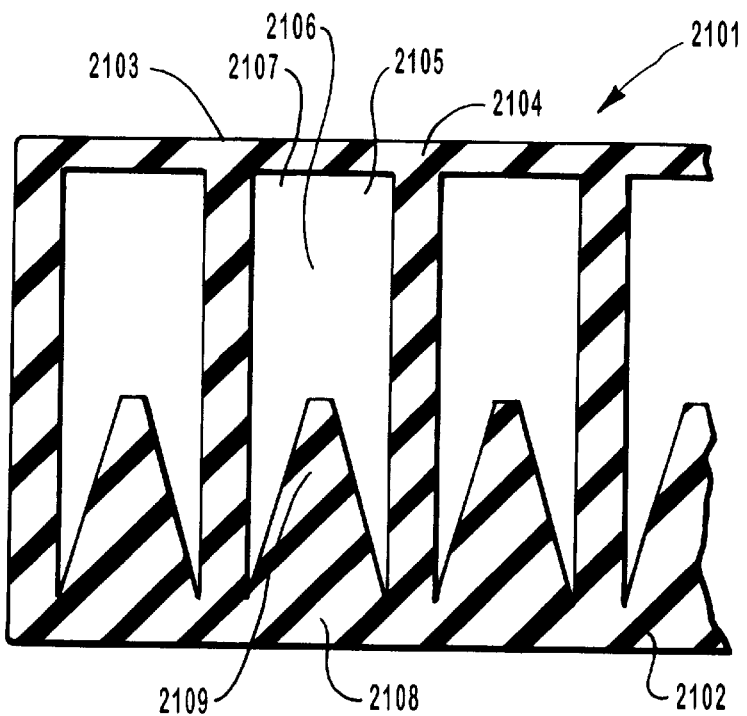
FIG. 21 depicts a cushioning element of the invention with firmness protrusions placed within the column interiors.

FIG. 21 depicts an alternative embodiment of a cushioning element 2101 of the invention. The cushioning element 2101 has cushioning medium 2102 formed into column walls 2103 and 2104. The column walls 2103 and 2104 form a column interior 2105. The column 2106 has an open column top 2107 and a closed column bottom 2108. In the embodiment depicted, the column 2107 has a firmness protrusion 2109 protruding into the column interior 2105 from the column bottom 2108. The firmness protrusion 2109 depicted is wedge or cone shaped, but a firmness protrusion could be of an desired shape, such as cylindrical, square, or otherwise in cross section along its longitudinal axis. The purpose of the firmness protrusion 2109 is to provide additional support within a buckled column for the portion of a cushioned object that is causing the buckling. When a column of this embodiment of the invention buckles, the cushioning element will readily yield until the cushioned object begins to compress the firmness protrusion. At that point, further movement of the cushioned object into the cushion is slowed, as the cushioning medium of the firmness support needs to be compressed or the firmness support itself needs to be caused to buckle in order to achieve further movement of the cushioned object into the cushioning medium.

Figure 22:
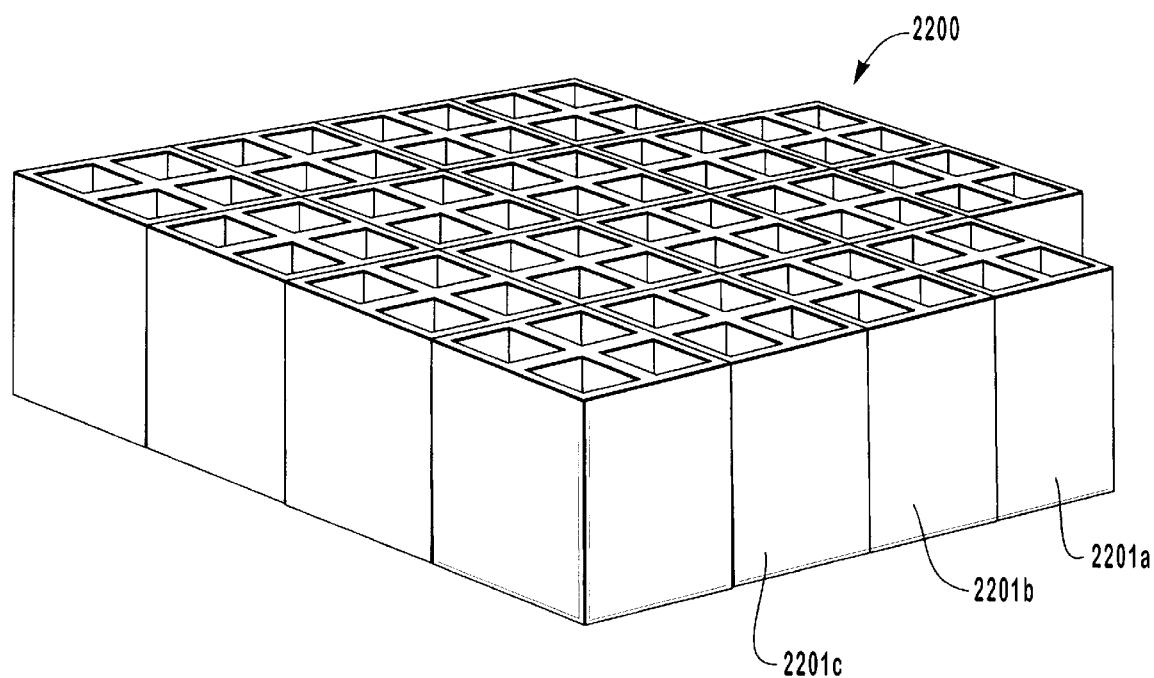
FIG. 22 is a frontal perspective view of an embodiment of the cushioning element of the invention which include multiple individual cushioning units.

Referring now to FIG. 22, in another embodiment of the cushion, multiple individual cushioning elements 2201a, 2201b, 2201c, etc. are provided within a single cushion 2200. In such embodiments, the cushions of the present invention are positioned side-to-side, with or without other materials between the individual cushions, and with or without connecting the individual cushions to one another. For example, sixty-four cushions, each having a thickness of four inches, and four sides each two inches in length, can be placed in an eight-by-eight arrangement to form a four inch thick square cushion having sixteen inch sides. Such cushions may be useful where different cushioning characteristics are desired on different portions of a cushion. Different cushioning characteristics are achieved through varying the materials and/or configurations of the individual cushions.

With reference to FIGS. 23a, 23b, 23c and 23d, another embodiment of a cushion 2301 according to the present invention is shown. Embodiment 2301 includes a first cushioning medium 2302 which forms a cover and a second cushioning medium 2303 which fills the cover. First cushioning medium 2302 is preferably the preferred elastomeric gel material, which is disclosed in detail below. Preferably, second cushioning medium 2303 is the visco-elastomeric material that is disclosed in detail below.

Figure 23A:
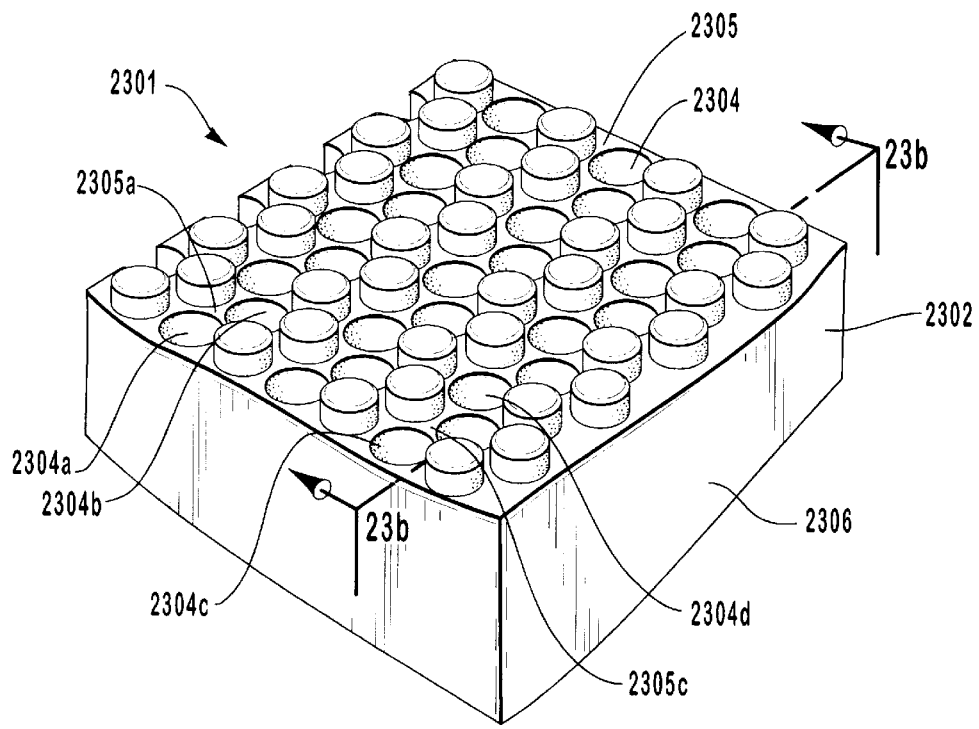
FIG. 23a is a frontal perspective view of an embodiment of the cushioning element of the invention in which a first cushioning medium is contained within a second cushioning medium.
Figure 23B:
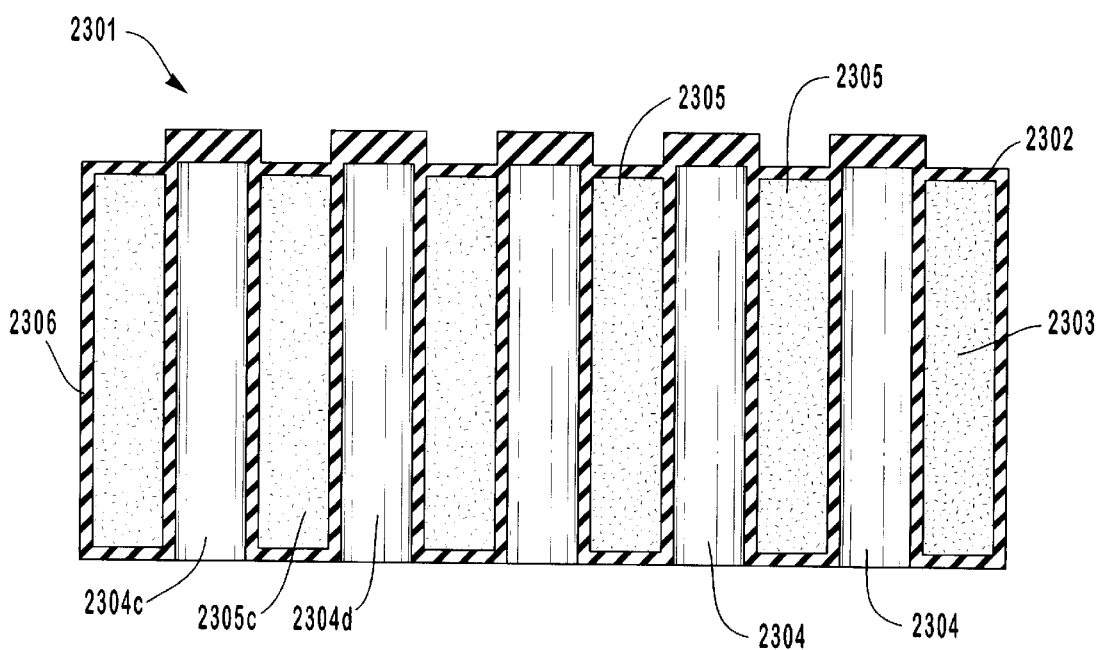
Figure 23C:
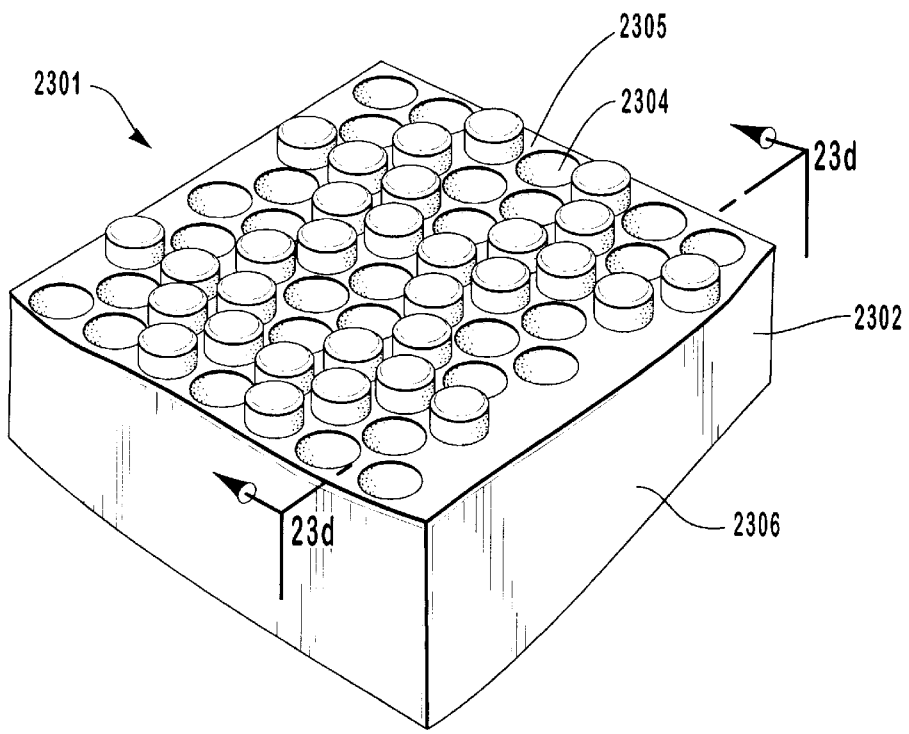
Figure 23D:
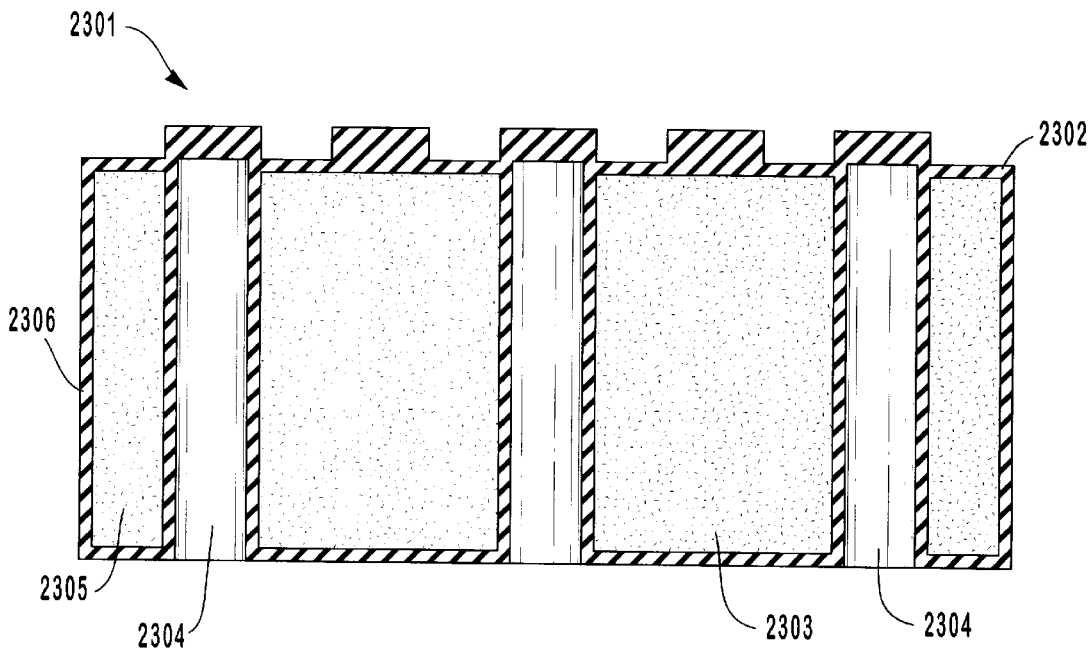
FIG. 23d is a cross section taken along line 23d—23d of FIG. 23c.

Embodiment 2301 also includes columns 2304, column walls 2305 and an outer periphery 2306. Columns 2304 are formed through cover 2302 and lined with cushioning medium 2302. With reference to FIGS. 23a and 23b, where two adjacent columns 2304a and 2304b are separated only by a thin column wall 2305a (e.g., a column wall having a thickness of only about 0.1 inch or less), the column wall is preferably made from cushioning medium 2302. Where two adjacent columns 2304c and 2304d are separated by a thicker column wall 2305c, the column wall preferably includes a cover 2302 of the first cushioning medium and is filled with second cushioning medium 2303.

The use of multiple cushioning media in cushion 2301 facilitates tailoring of the rebound, pressure absorption, and flow characteristics of the cushion. Compressibility of cushion 2301 also depends upon the amount of spacing between columns and the formulations of the first second cushioning media 2302 and 2303, respectively.

Figure 24A:
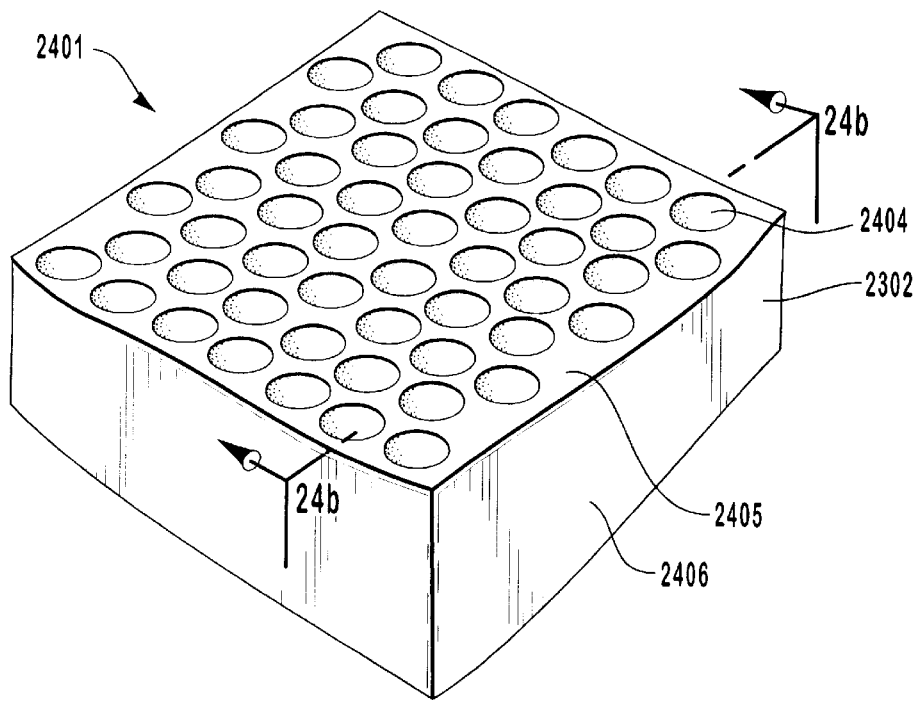
FIG. 24a is a frontal perspective view of an embodiment of the cushioning element of the invention in which the outer surfaces of the cushioning medium are covered with a coating.
Figure 24B:
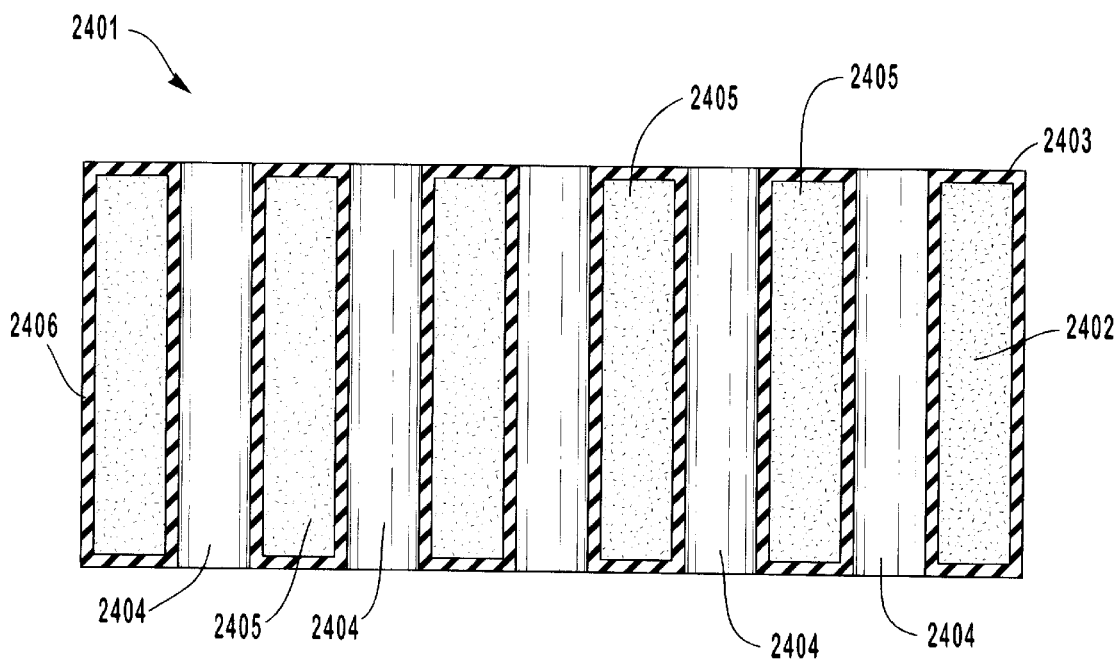

FIGS. 24a and 24b illustrate another embodiment of the cushioning element 2401 according to the present invention. Referring to FIG. 24b, embodiment 2401 includes a cushioning medium 2402, a coating 2403 adhered to the cushioning medium, columns 2404, column walls 2405 that separate the columns, and an outer periphery 2406. Preferably, cushioning medium 2402 of embodiment 2401 is tacky, which facilitates adhesion of coating 2403 thereto. A preferred cushioning medium 2402 for use in embodiment 2401 is the preferred visco-elastomeric gel material, which is disclosed in detail below. Coating 2403 is preferably a particulate material, including without limitation lint, short fabric threads, talc, ground cork, microspheres, and others. However, coating 2403 may me made from any material that will form a thin, pliable layer over cushioning medium 2402, including but not limited to fabrics, stretchable fabrics, long fibers, papers, films, and others.

Figure 25A:
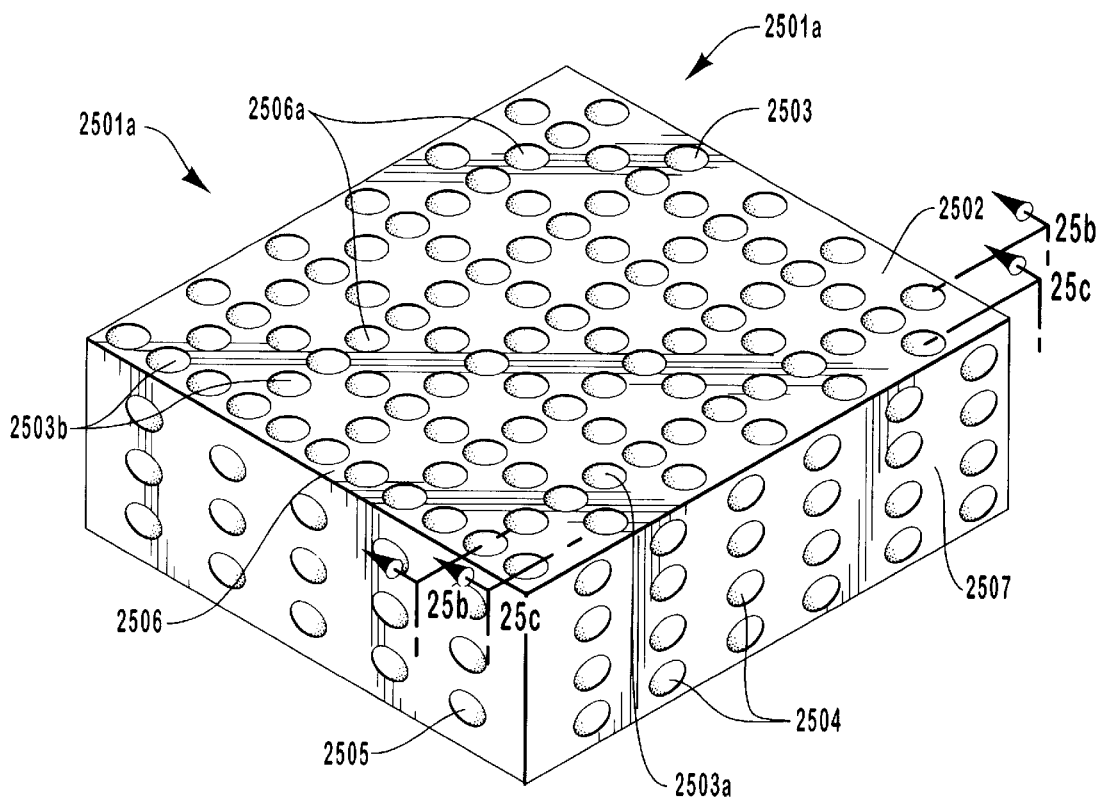
FIG. 25a is a perspective view of an embodiment of the cushioning element of the present invention, wherein the cushion includes multiple sets of parallel columns and wherein each column intersects no columns of another parallel column set or columns of only one other set.
Figure 25B:
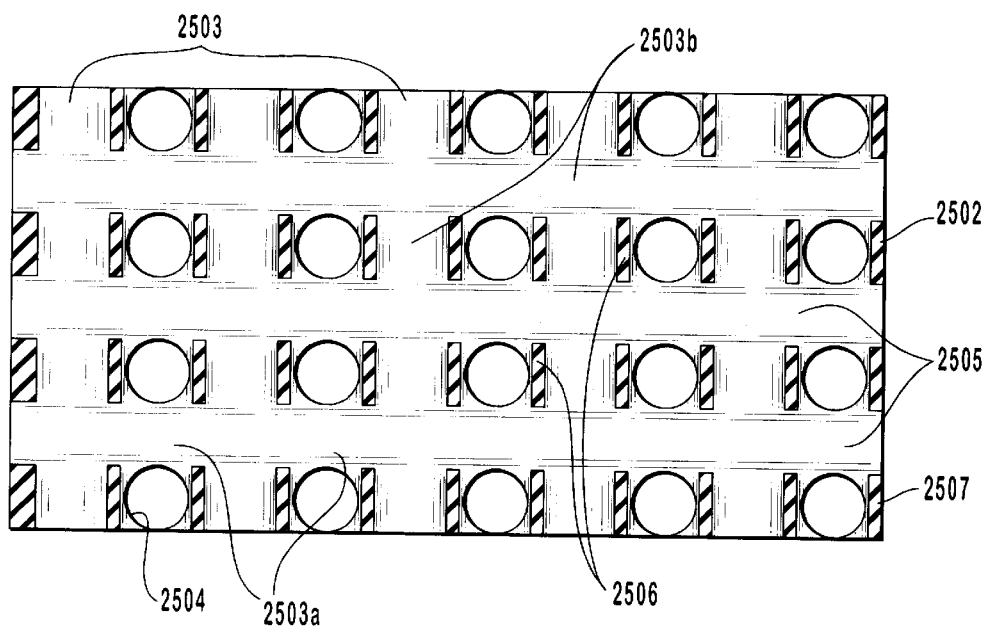
Figure 25C:
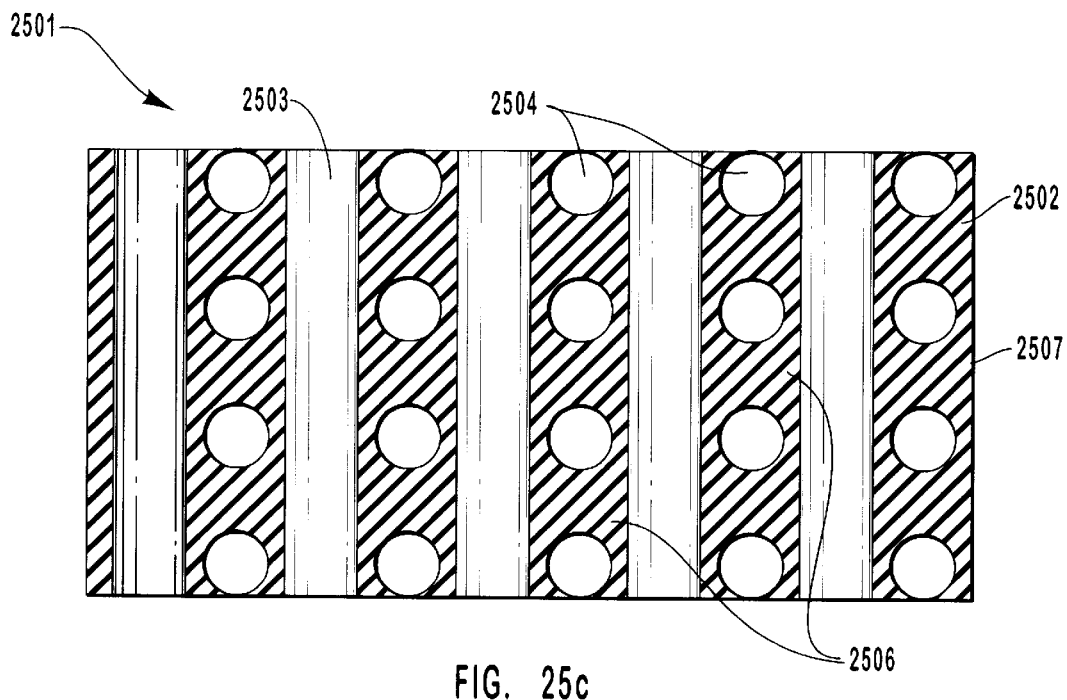
Figure 25D:
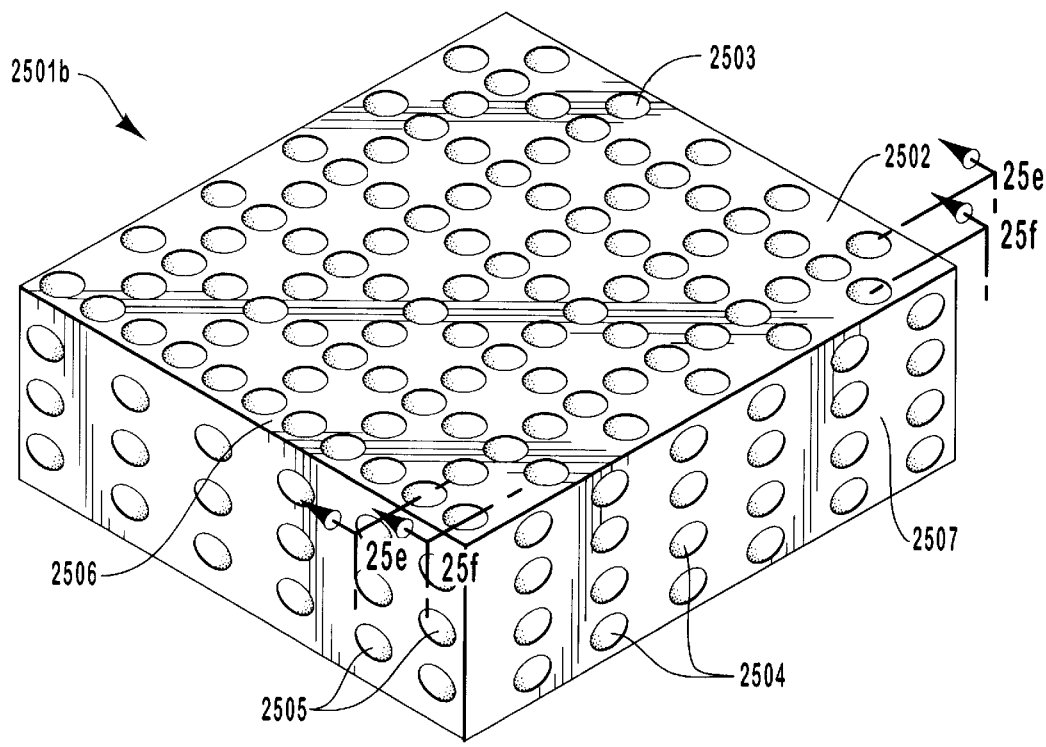
FIG. 25d is a perspective view of an alternative configuration of the embodiment shown in FIG. 25a, wherein each column may intersect columns of any number of the other parallel column sets.
Figure 25E:
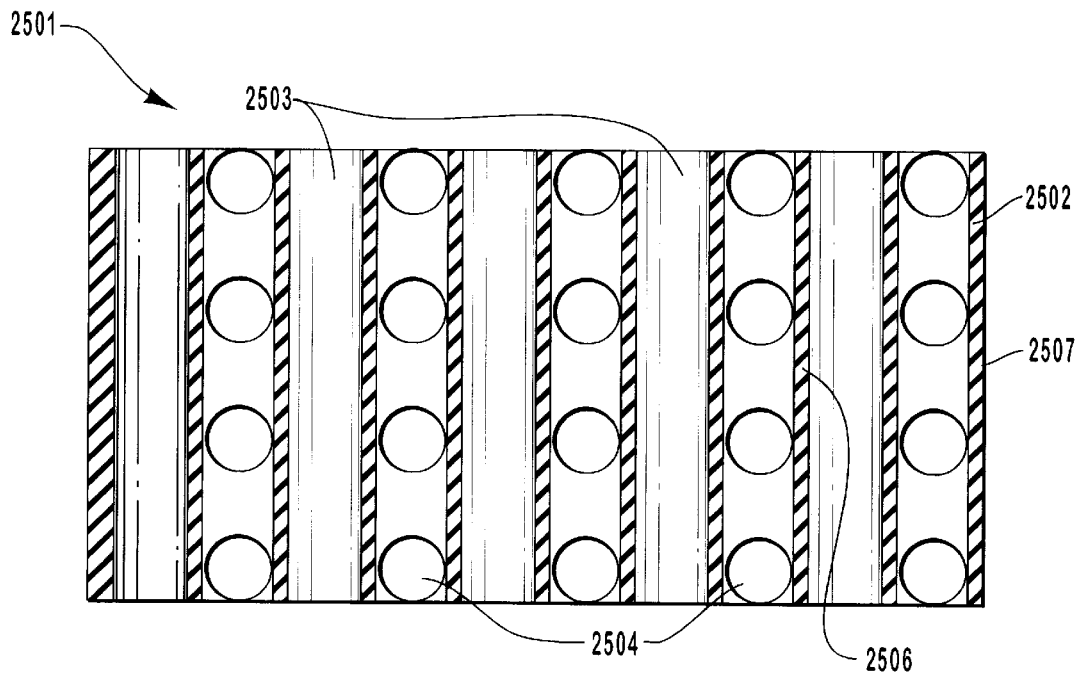
FIG. 25e is a cross section taken along line 25e—25e of FIG. 25d.
Figure 25F:
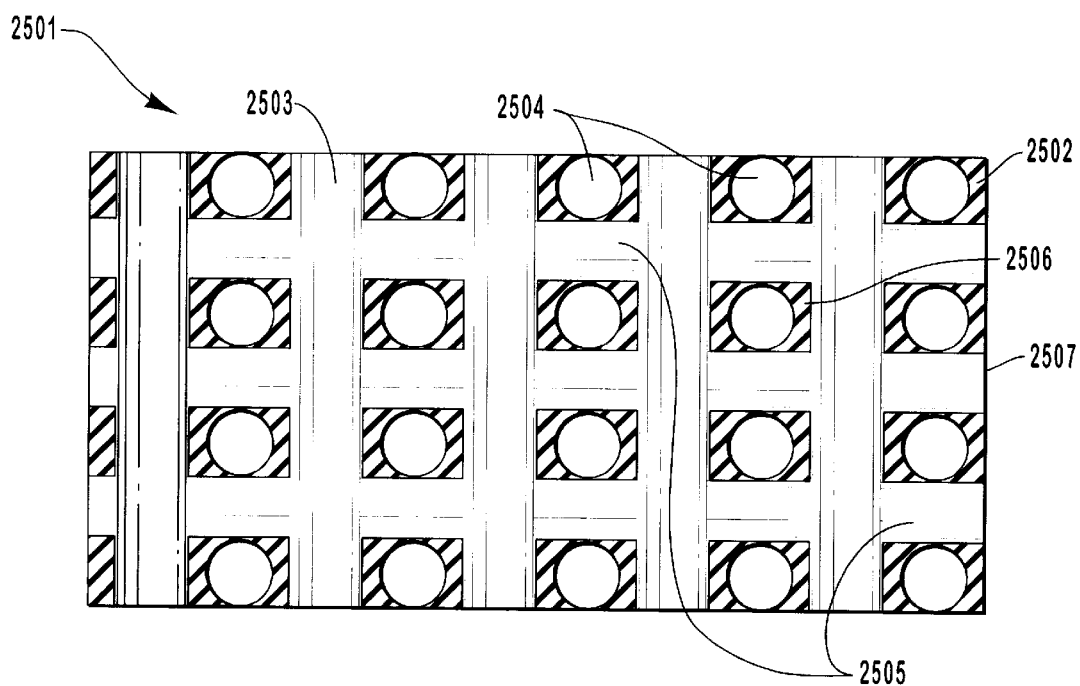
FIG. 25f is a cross section taken along line 25f—25f of FIG. 25d.

FIGS. 25a, 25b, 25c, 25d, 25e and 25f show another embodiment of a cushioning element 2501 according to the present invention. Embodiment 2501 includes cushioning medium 2502, a first set of columns 2503 which are oriented along a first axis x, a second set of columns 2504 which are oriented along a second axis y, a third set of columns 2505 which are oriented along a third axis z, column walls 2506 located between the columns, and an outer periphery 2507. Preferably, axis x is perpendicular to both axis y and axis z and axis y is perpendicular to axis z. Columns 2503 and 2504, 2503 and 2505, and/or 2504 and 2505 may intersect each other. FIGS. 25a, 25b and 25c illustrate a cushion 2501a wherein columns 2503a intersect columns 2504 and columns 2503b intersect columns 2505. FIGS. 25d, 25e and 25f depict a cushion 2501b wherein each of columns 2503 intersect both columns 2504 and columns 2505. Alternatively, none of the columns may intersect any other columns. Other variations of intersection and/or non-intersecting columns are also within the scope of the present invention.

The spacing and pattern with which each set of columns is positioned determines the total volume of cushioning medium 2502 within the volume of space occupied by the cushioning element 2501. As the volume of cushioning medium 2502 within the volume of space occupied by the cushioning element 2501 decreases, the cushion becomes lighter and easier to compress. Thus, the spacing and pattern of each set of columns may be varied to provide a cushion of desired weight and compressibility. Cushioning elements which have only two sets of columns or more than three sets of columns are also within the scope of embodiment 2501.

Figure 26:
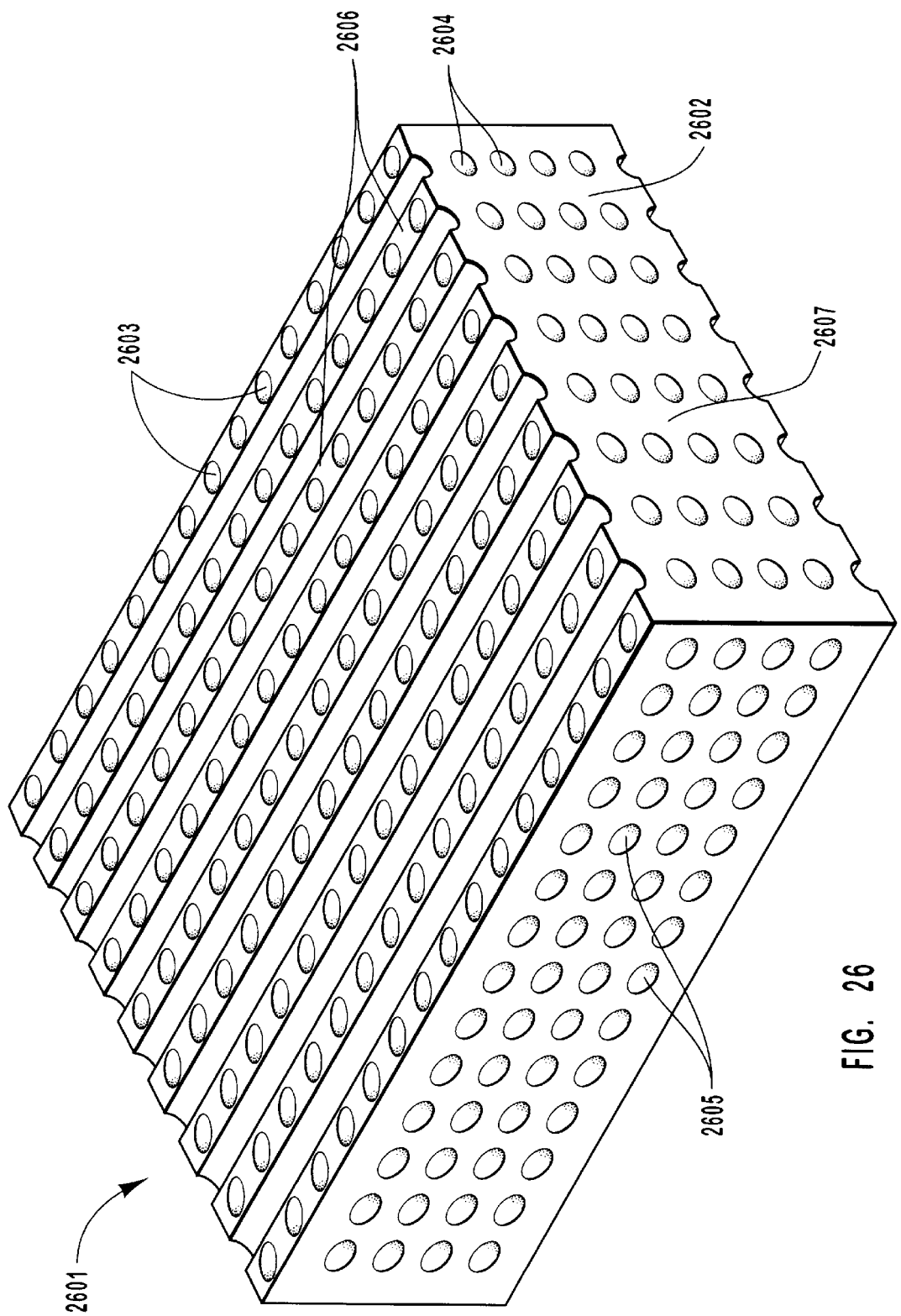
FIG. 26 is a frontal perspective view of an embodiment of the cushioning element of the present invention wherein the cushion has multiple sets of parallel narrow columns.

With reference to FIG. 26, another embodiment of cushioning element 2601 is shown which includes a first set of columns 2603 which are oriented along a first axis x, a second set of columns 2604 which are oriented along a second axis y, and a third set of columns 2605 which are oriented along a third axis z. As can be seen in FIG. 26, columns 2603, 2604 and 2605 are preferably thin. Column walls 2606, which are made from a cushioning medium 2602, surround each of the columns. The cushion 2601 shape is defined in part by an outer periphery 2607. Preferably, axis x is perpendicular to both axis y and axis z and axis y is perpendicular to axis z. Similar to the cushion of embodiment 2501, columns 2603, 2604 and 2605 may or may not intersect any other columns. Likewise, the spacing between adjacent columns and the arrangement of each of the columns determine the total volume of cushioning medium 2602 within the volume of space occupied by the cushioning element 2601. As the volume of cushioning medium 2602 within the volume of space occupied by the cushioning element 2601 decreases, the cushion becomes lighter and easier to compress. Thus, the spacing and arrangement of columns may be varied to provide a cushion of desired weight and compressibility. Cushions with only two sets of columns or more than three sets of columns are also within the scope of embodiment 2601.

Figure 27A:
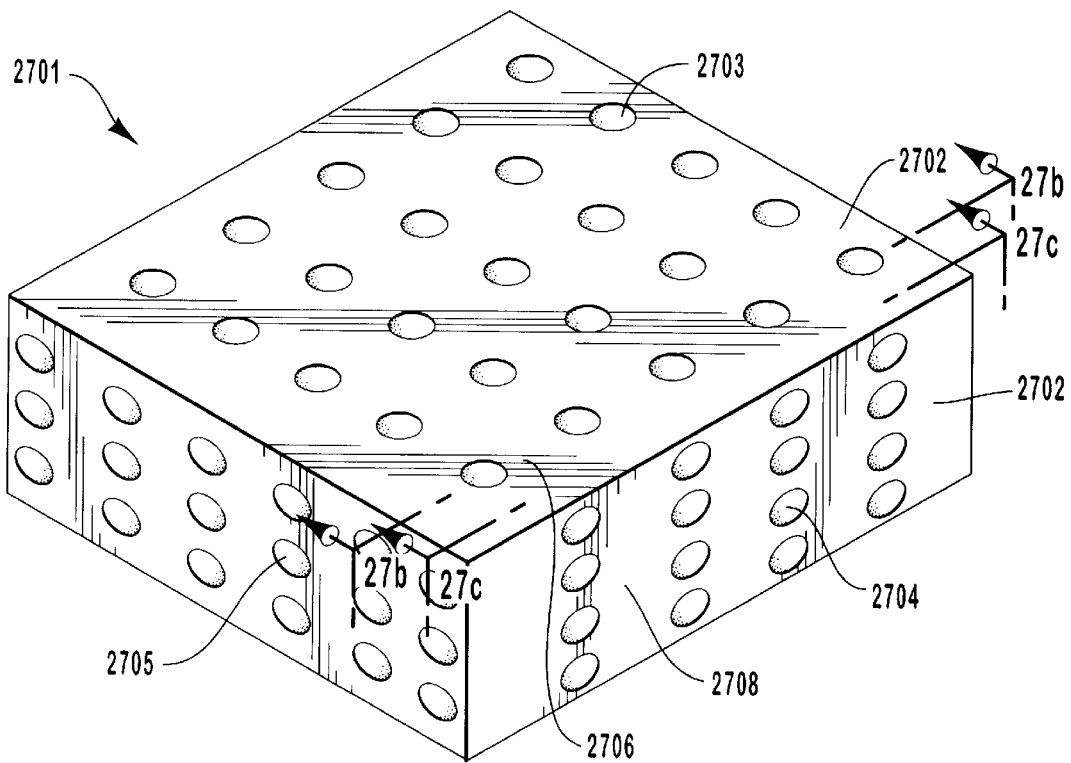
FIG. 27a is a frontal perspective view of an embodiment of the cushioning element of the present invention which includes multiple sets of parallel columns and cavities formed in the column walls.
Figure 27B:
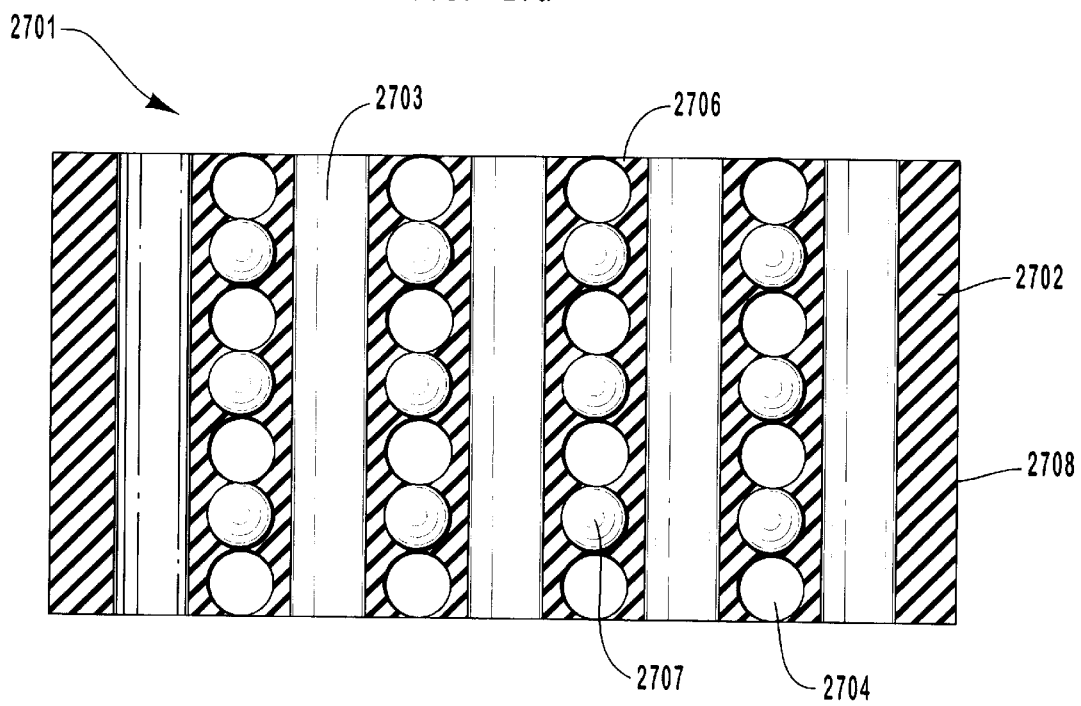
Figure 27C:
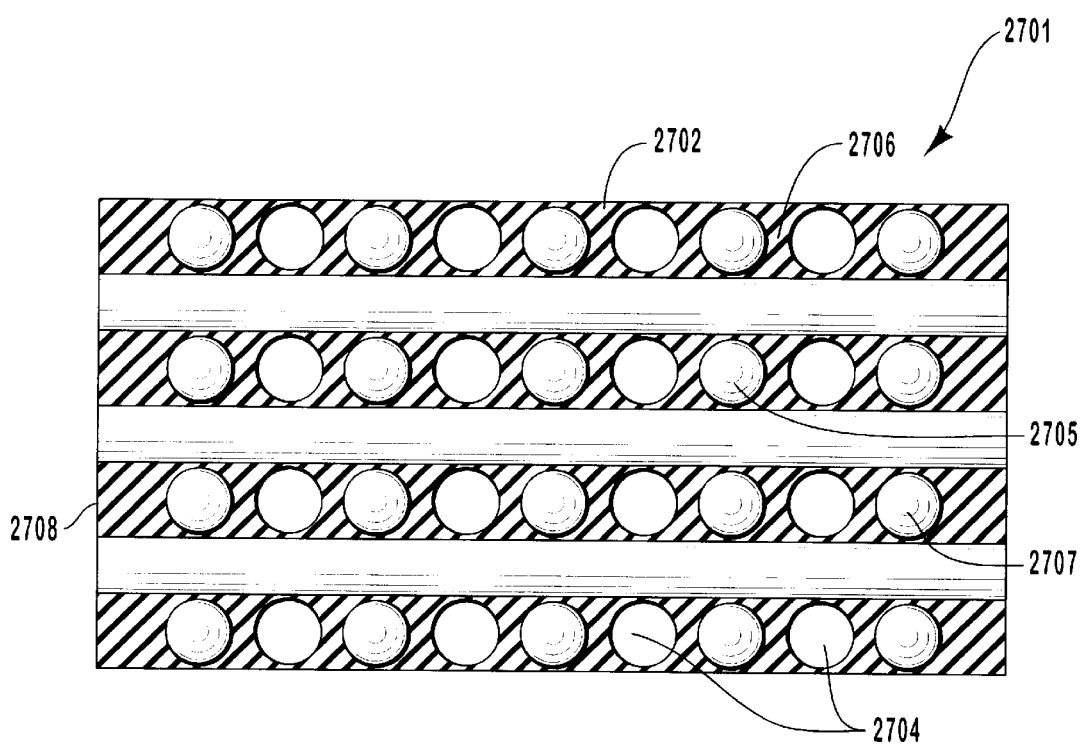

Referring now to FIGS. 27a, 27b and 27c, another embodiment of a cushioning element 2701 according to the present invention is shown. Embodiment 2701 includes cushioning medium 2702, a first set of columns 2703 which are oriented along a first axis x, a second set of columns 2704 which are oriented along a second axis y, a third set of columns 2705 which are oriented along a third axis z, column walls 2706 located between the columns, cavities 2707 formed within the column walls and an outer periphery 2708. Preferably, axis x is perpendicular to both axis y and axis z and axis y is perpendicular to axis z. Columns 2703 and 2704, 2703 and 2705, and/or 2704 and 2705 may intersect each other, as in embodiments 2501 and 2601. Alternatively, none of the columns may intersect any other column. The spacing and pattern with which each set of columns is positioned and the number of cavities 2706 formed within the column walls 2707 determine the total volume of cushioning medium 2702 within the volume of space occupied by the cushioning element 2701. As the volume of cushioning medium 2702 within the volume of space occupied by the cushioning element 2701 decreases, the cushion becomes lighter and easier to compress. Thus, the spacing and pattern of each set of columns may be varied to provide a cushion of desired weight and compressibility. Similarly, the size and spacing of the cavities 2706 within the column walls 2707 may also be varied to provide a cushion of desired weight and compressibility. Cushioning elements which have only two sets of columns are also within the scope of embodiment 2701.

Figure 28:
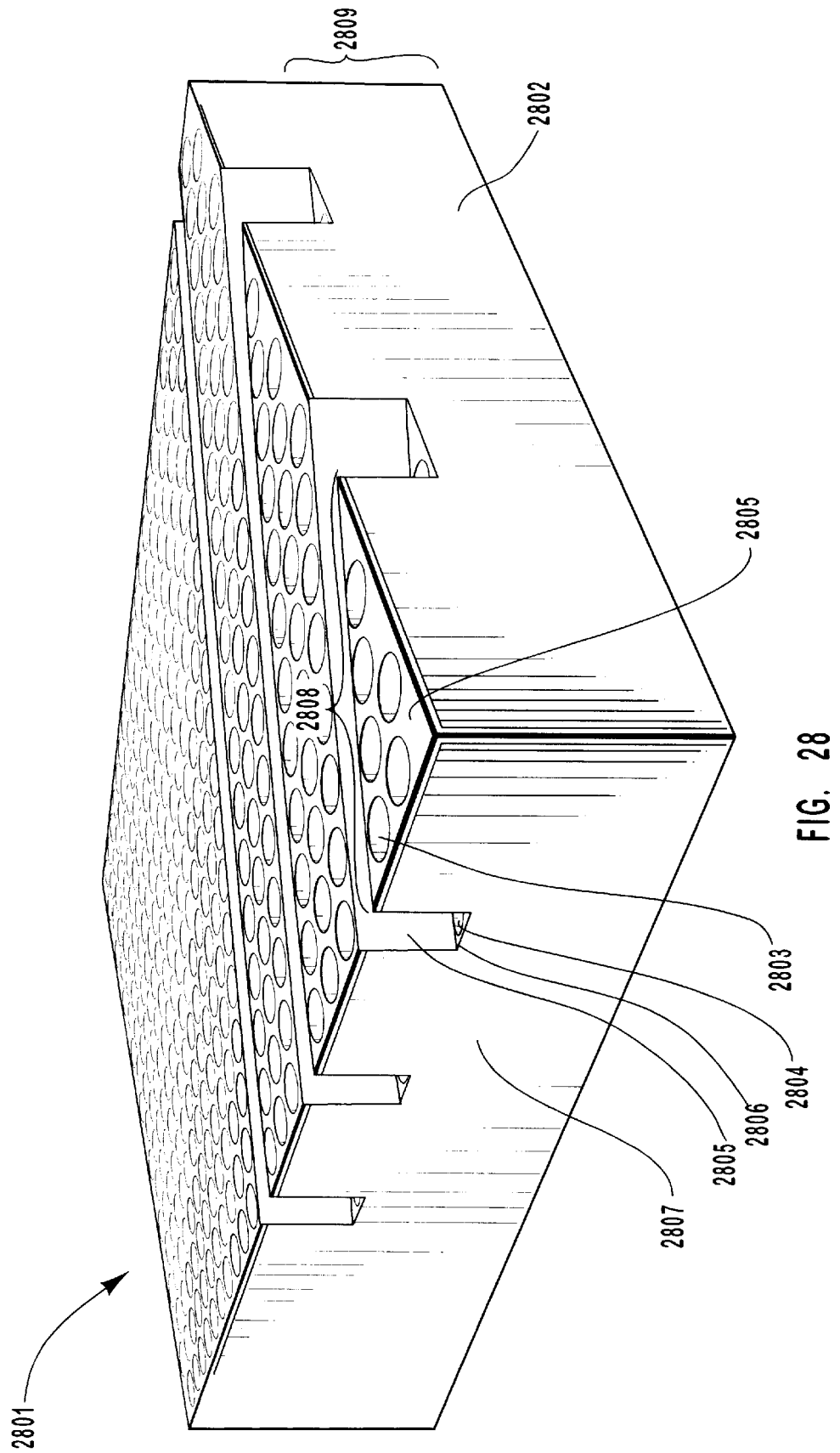
FIG. 28 is a frontal perspective view of an embodiment of the cushioning element according to the present invention which has a contoured surface and includes columns of more than one height.

FIG. 28 illustrates yet another embodiment of a cushioning element 2801 of the present invention, which has a contoured upper surface. The cushion 2801 shown in FIG. 28 has columns 2803 and 2804 of different heights and column walls 2805 and 2806 of different heights. However, a contoured cushion according to embodiment 2801 could include columns and column walls having any number of different heights. Embodiment 2801 also includes cushioning medium 2802 and an outer periphery 2807. The variability of column and column wall height in embodiment 2801 imparts the cushion with areas having different compressibility and firmness characteristics.

As seen in FIG. 28, cushion 2801 has two distinct levels of columns. The adjacent longer columns 2803 are grouped together, referred to as a set of isolated columns 2808. The shorter columns 2804, which are located between sets 2808, tie cushion 2801 together and form a cushion base 2809.

As an example of the use of cushion 2801, a cushioned object which comes into contact with the top surface thereof will first compress columns 2803, causing the column walls 2805 to buckle. The free area between isolated column sets 2808 enhances the bucklability of columns 2803. In other words, columns 2803 buckle more easily than would columns of the same size, separated by column walls of the same thickness and made from the same material in a cushion having columns of only one general height. If the load of the cushioned object causes complete buckling of columns 2803, columns 2804, which have a greater resistance to buckling than the long columns, provide a secondary cushioning effect, which is more like that of a cushion with columns of one general length.

Figure 29:
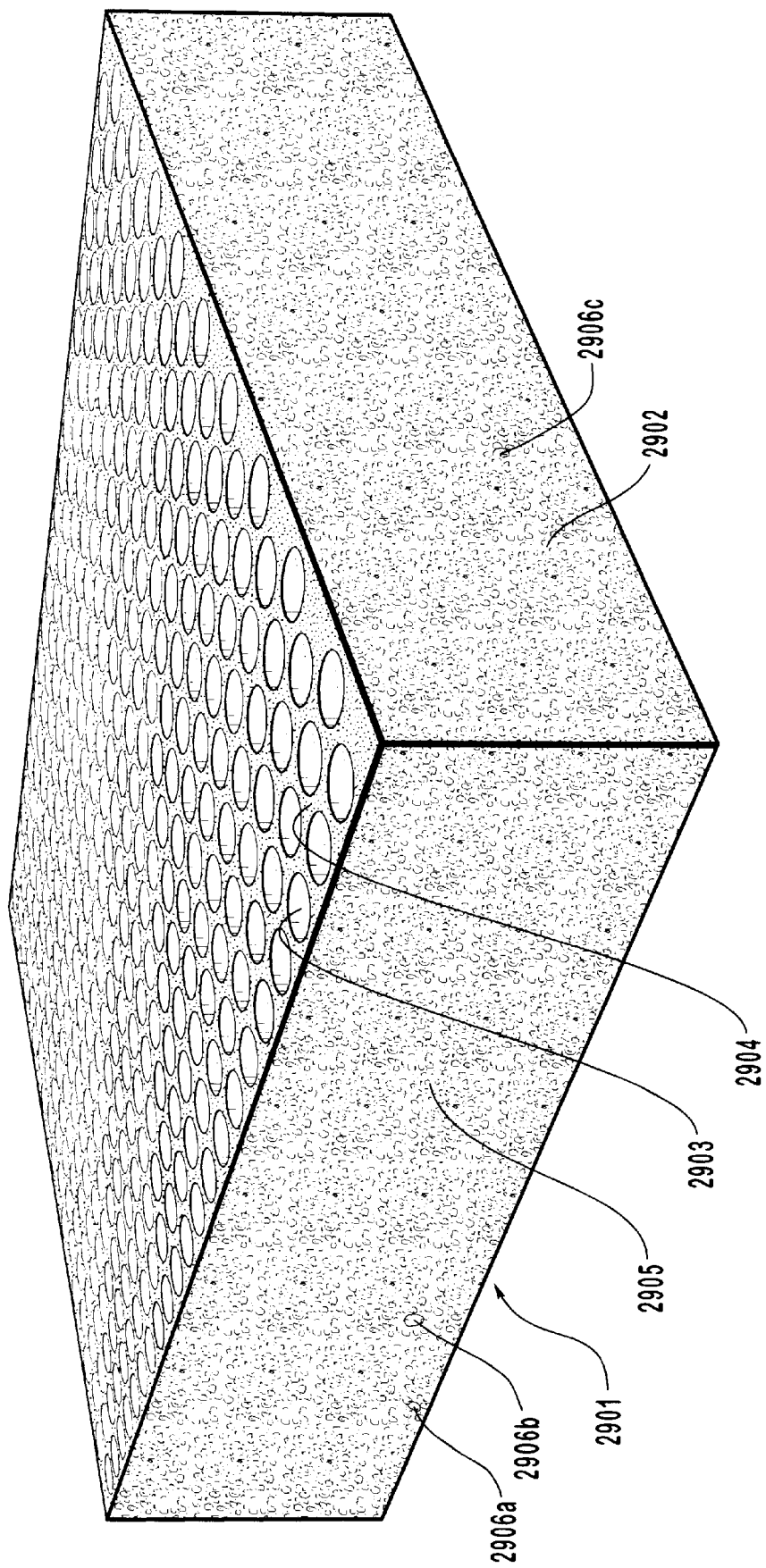
FIG. 29 is a frontal perspective view of an embodiment of the cushioning element of the present invention wherein the cushioning medium is foamed.

Referring now to FIG. 29, a cushion 2901 is shown which includes a cushioning medium 2902, columns 2903, column walls 2904, and an outer periphery 2905. Cushioning medium includes a plurality of cells 2906a, 2906b, 2906c, etc. which are filled with gas or another cushioning medium. The cushion 2901 depicted in FIG. 29 has open cells 2906. Alternatively, cushion 2901 may have only closed cells or a combination of open and closed cells. Cells 2906a, 2906b, 2906c, etc. may be of any size and may be dispersed throughout cushioning medium at any density or concentration that will provide the desired cushioning and weight characteristics.

Figure 30A:
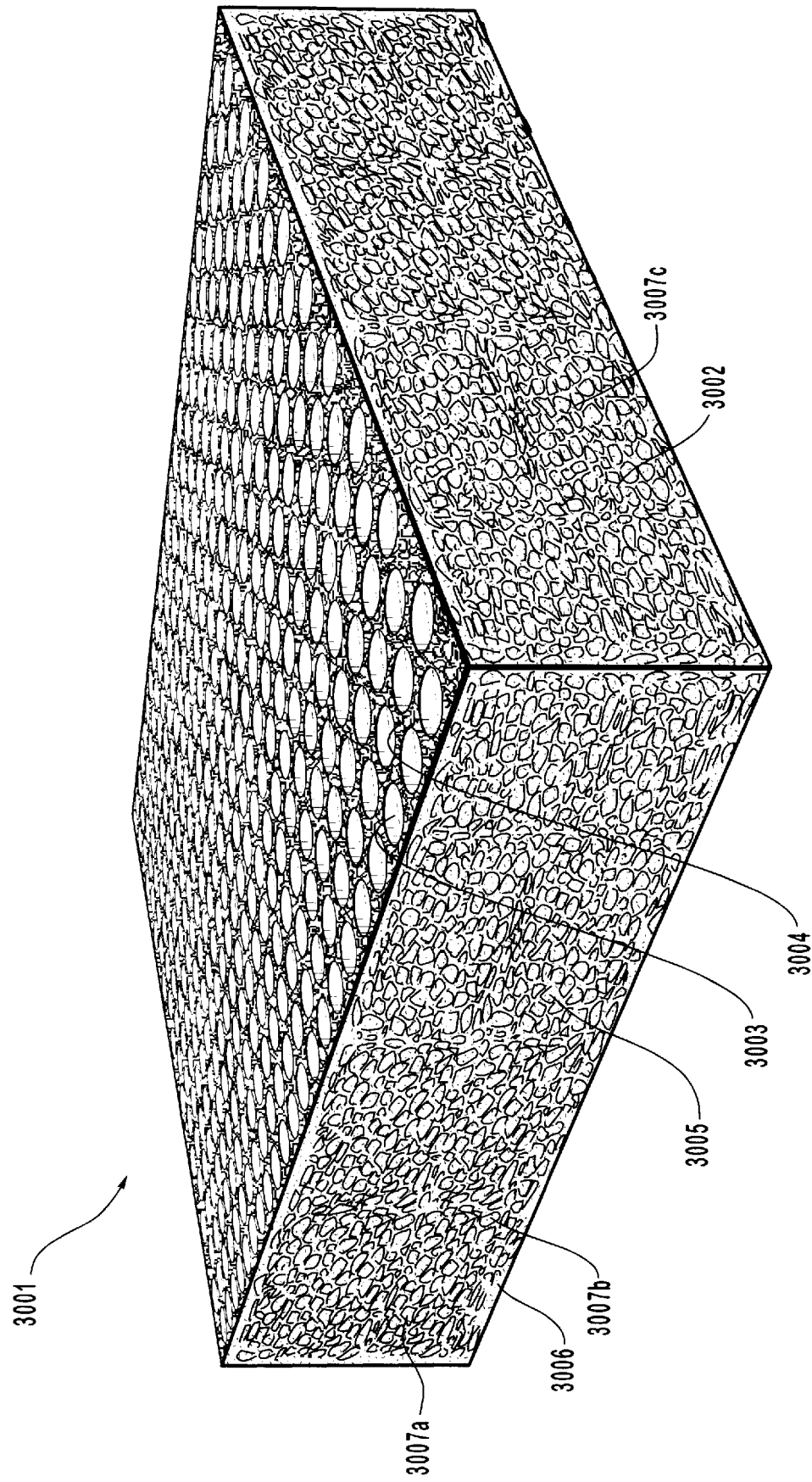
FIG. 30a is a frontal perspective view of an embodiment of the cushioning element of the present invention wherein the column walls are formed from numerous short tubular pieces, which create voids in the column walls.

Referring now to FIGS. 30a and 30b, alternative embodiments of the cushions 3001 and 3001' of the present invention which have light weight column walls 3004 and 3004', respectively, are shown. Cushions 3001 and 3001' also include a cushioning medium 3002 and 3002', columns 3003 and 3003' and an outer periphery 3005 and 3005', respectively. Column walls 3004 and 3004' each include a matrix 3006 and 3006', respectively, within which are located several voids 3007a, 3007b, 3007c, etc. and 3007a', 3007b', 3007c', etc. and 3008a, 3008b, etc., respectively. Matrix 3006 is made from cushioning medium 3002, 3002'. Voids 3007, 3007', 3008 are hollow areas formed within matrix 3006 which lighten column walls 3004, 3004'. Preferably, voids 3007, 3007' are filled with gas or any other substance which has a density (i.e., specific gravity) less than that of cushioning medium 3002, 3002'. More preferably, voids 3007, 3007' are open celled (i.e., continuous with the outer surface of cushion 3001, 3001' and exposed to the atmosphere).

FIG. 30a shows cushion 3001, the column walls 3004 of which include a matrix 3006 which forms voids 3007a, 3007b, 3007c, etc. having a multi-sided irregular shape. Column walls which have matrices and pits of other configurations are also within the scope of the cushioning elements of the present invention. Embodiment 3001 is preferably formed by removal or destruction of volume occupying objects which are dispersed throughout the cushioning medium as cushion 3001 is formed. This process is described in greater detail in the U.S. Provisional Patent Application filed on the same date as this patent application, entitled "SUBSTANCE REMOVAL METHOD FOR FORMING CELLS IN A MATERIAL" by Tony M. Pearce.

FIG. 30b shows cushion 3001' having a matrix 3006' formed from randomly oriented short tubes 3009a, 3009b, 3009c, etc. which forms voids 3007' and 3008. Voids 3007a', 3007b', 3007c', etc. are formed within short tubes 3009a, 3009b, 3009c, etc. and are generally cylindrical in shape. Matrix 3006' also includes irregularly shaped secondary voids 3008a, 3008b, 3008c, etc. which are formed by the exterior surfaces of tubes 3009 between adjacent tubes.

It is contemplated in the invention that the hollow portion of the column will typically be of uniform cross section throughout its length, but this is not necessary for all embodiments of the invention. For example, in a column having a circular cross section orthogonal to its longitudinal axis, the diameter of the circle could increase along its length, and adjacent columns could correspondingly decrease along their length (i.e. the columns would be formed as opposing cones). As another example, the column walls could all thicken from one cushion surface to another to facilitate the use of tapered cores (which create the hollow portion of the columns) in the manufacturing tool, which tapering facilitates the removal of the cores from the gel.

It is also preferred that the columns of the preferred cushioning element be open at their top and bottom. However, the columns can be bonded to or integral with a face sheet on the top or bottom or both, over all or a portion of the cushion. Or the columns can be interrupted by a sheet of gel or other material at their midsection which is like a face sheet except that it cuts through the interior of a cushioning element.

In the preferred embodiment of the cushioning element the column walls are not perforated. However, perforated walls and/or face sheets are within the scope of this invention. The perforation size and density can be varied by design to control column stiffness, buckling resistance, and weight, as well as to enhance air circulation.

It is also preferred that the wall thickness of the columns be approximately equal throughout the cushioning element for uniformity, but in special applications of the invented cushion, wall thickness may be varied to facilitate manufacturing or to account for differing expected weight loads across the cushion or for other reasons.

Typical cushions in the art are ordinarily one piece, but the invented cushion can be constructed from more than one discontinuous cushioning element of the invention. For example, three one-inch thick cushions of this invention can be stacked to make a three-inch thick cushion of this invention, with or without other materials between the layers, and with or without connecting the three layers to one another.

The cushioning element of this invention can be used alone or with a cover. A cover can be desirable when used to cushion a human body to mask the small pressure peaks at the edges of the column walls. This is not necessary if the gel used is soft enough to eliminate these effects, but may be desirable if firmer gels are used. Covers can also be desirable to keep the gel (which can tend to be sticky) clean. If used, a cover should be pliable or stretchable so as not to overly reduce the gross cushioning effects of the columns compressing and/or buckling. The preferred cover would also permit air to pass through it to facilitate air circulation under the cushioned object.

While it is envisioned that the immediate application of the invented cushion is to cushion human beings (e.g., seat cushions, mattresses, wheelchairs cushions, stadium seats, operating table pads, etc.), Applicant also anticipates that other objects, including without limitation, animals (e.g. between a saddle and a horse), manufactured products (e.g., padding between a manufactured product and a shipping container), and other objects may also be efficiently cushioned using the invention.

Preferably, the columns in the invented cushion are oriented with their longitudinal axis generally parallel to the direction of gravity so that they will buckle under load from a cushioned object rather than collapse from side pressure. It is also preferred that some type of wall or reinforcement be provided about the periphery of the cushioning element in order to add stability to the cushioning element and in order to ensure that the buckling occurs in order to decrease column length under a cushioned object.

The invented cushioning element may be described as a gelatinous elastomeric or gelatinous visco-elastomeric material (i.e. gel) configured as laterally connected hollow vertical columns which elastically sustain a load up to a limit, and then buckle beyond that limit. This produces localized buckling in a cushioning element beneath a cushioned object depending upon the force placed upon the cushioning element in a particular location. As a result, protruding portions of the cushioned object can protrude into the cushion without being subjected to pressure peaks. As a result, the cushioning element distributes its supportive pressure evenly across the contact area of the cushioned object. This also maximizes the percentage of the surface area of the cushioned object that is in contact with the cushion.

In the preferred embodiments, each individual column wall can buckle, markedly reducing the load carried by that column and causing each column to be able to conform to protuberances of the cushioned object. Buckling may be described as the localized crumpling of a portion of a column, or the change in primary loading of a portion of a column from compression to bending. In designing structural columns, such as concrete or steel columns for buildings or bridges, the designer seeks to avoid buckling because once a column has buckled, it carries far less load than when not buckled. In the columns of this cushion, however, buckling works to advantage in accomplishing the objects of the invention. The most protruding parts of the cushioned object cause the load on the columns beneath those protruding parts to have a higher than average load as the object initially sinks into the cushion. This higher load causes the column walls immediately beneath the protruding portion of the cushioned object to buckle, which markedly reduces the load on the protruding portion. The surrounding columns, which have not exceeded the buckling threshold, take up the load which is no longer carried by the column(s) beneath the most protruding portion of the cushioned object.

As an example of the desirability of the buckling provided by the cushioning element of the invention, consider the dynamics of a seat cushion. The area of a seated person which experiences the highest level of discomfort when seated without a cushion (such as on a wooden bench) or on a foam cushion is the tissue that is compressed beneath the most protruding bones (typically the ischial tuberosities). When the invented cushioning element is employed, the area beneath the protruding portions will have columns that buckle, but the remainder of the cushioning element should have columns (which are beneath the broad, fleshy non-bony portion of the person's posterior) which will withstand the load placed on them and not buckle. Since the broad fleshy area over which the pressure is substantially equal is approximately 95% of the portion of the person subjected to sitting pressure, and the area beneath the ischial tuberosity is subjected to less than average pressure due to the locally buckled gel columns (in approximately 5% of that area), the person is well supported and the cushion is very comfortable to sit on.

As another example, the cushioning element of the invention is useful in a bed mattress. The shoulders and hips of a person lying on his/her side would buckle the columns in the cushioning element beneath them, allowing the load to be picked up in the less protruding areas of the person's body such as the legs and abdomen. A major problem in prior art mattress cushions is that the shoulders and hips experience too much pressure and the back is unsupported because the abdomen receives too little pressure. The cushion of this invention offers a solution to this problem by tending to equalize the pressure load through local buckling under protruding body parts.

The square columns of FIGS. 7 or 8 in the invented cushion are believed by Applicant to have the best balance between lateral stability (resistance to collapse from side loads) and light weight (which also corresponds to good air circulation and low thermal transfer). Some other types of columns, such those depicted in the other figures or mentioned elsewhere herein, have more cushioning media (typically gel) per cubic inch of cushion for a given level of cushioning support. Thus, the resulting cushions are heavier and have a higher rate of thermal transfer. They are also more costly to manufacture due to the increased amount of cushioning media required. However, columns with oval, circular or triangular cross sections are preferred for some cushioning applications because they have a greater degree of lateral stability than square or honeycomb columns since triangles form a braced structure and circles and ovals form structurally sound arches when considered from a lateral perspective. Honeycomb columns such as those shown in FIGS. 2, 4, 5, 7, 8, 9 and 10 generally have the least gel per cubic inch of cushion for a given level of support, but have little lateral stability. However, they can be the preferred embodiment in any cushioning application which has need for lightest weight and does not require substantial lateral stability.

The cushions of this invention differ from prior art gel cushions in that, while prior art gel cushions come in a variety of shapes, many are essentially a solid mass. When a cushioned object attempts to sink into a prior art gel cushion, the cushion either will not allow the sinking in because the non-contact portions of the cushion are constrained from expanding, or the cushion expands undesirably by pushing gel away from the most protruding parts of the cushioned object in a manner which tends to increase the reactive force exerted by the gel against areas of the cushioned object which surround the protrusions. In the cushion of this invention, the gel has enough hollow space to allow sinking in without expanding the borders of the cushion, so the problem is alleviated.

Another problem with many prior art gel cushions is their weight. For example, a wheelchair cushion made of prior art gel with dimensions of 18"×16"×3.5" would weigh 35–40 pounds, which is unacceptable to many wheelchair users. A cushion according to this invention having the same dimensions would weigh approximately seven pounds or less. To be an acceptable weight for wheelchairs, a typical prior art wheelchair gel cushion is made only 1" thick. To prevent bottoming out through such a thin cushion, the makers increase the rigidity of the gel, which decreases the gel's semi-hydrostatic characteristics, ruining the gel's ability to equalize pressure. Thus, many thin gel cushions relieve pressure no better than a foam cushion. The cushion of this invention can be the preferred full 3.5 inches thick needed to allow sinking in for a human user which is in turn needed to equalize pressure and increase the surface area under pressure, while still being light weight.

The cushions of this invention differ from prior art honeycomb cushions in part in that gel is used instead of thermoplastic film or thermoplastic elastomer film. Also, a comparatively thick gel is used for the walls of the columns, as compared to very thin films made of comparatively much more rigid thermoplastic film or thermoplastic elastomer film. If thick walls were used in prior art honeycomb cushions, the rigidity of available thermoplastics and available thermoplastic elastomers would cause the cushion to be far too stiff for typical applications. Also, the use of comparatively hard, thin walls puts the cushioned object at increased risk. When the load on a prior art honeycomb cushion exceeds the load carrying capability of virtually all of the columns (i.e., they all buckle), the cushioned object bottoms out onto a relatively hard, rigid, thin pile of thermoplastic film layers. In that condition, the cushioned object is subjected to pressures similar to the pressures it would experience with no cushion at all. The cushioned object is thus at risk of damaging pressures on its most protruding portions.

In comparison, if the same bottoming out occurs on the cushion of this invention, the most protruding portions of the cushioned object would be pressed into a pile of relatively thick, soft gel layers, which would add up to typically 20% of the original thickness of the cushion. Thus, the risk of bottoming out is substantially lowered.

Another difference between prior art thermoplastic honeycomb cushions and the cushion of this invention is that the configuration of the invented cushion is not limited to honeycomb columns, but can take advantage of the varying properties offered by columns of virtually any cross sectional shape. The prior art thermoplastic honeycomb cushions are so laterally unstable that at least one face sheet must be bonded across the open cells. This restricts the air circulation, which is only somewhat restored if small perforations are made in the face sheet or cells. While face sheets and perforations are an option on the cushions of this invention, the alternative cross sectional shapes of the columns (e.g., squares or triangles) make face sheets unnecessary due to increased lateral stability and thus perforations are unnecessary since both ends of the preferred configuration of the column are open to the atmosphere.

The maximum thickness of the walls of the columns of the cushion of this invention should be such that the bulk density of the cushion is less than 50% of the bulk density if the cushion were completely solid gel. Thus, at least 50% of the volume of space occupied by the invented cushioning element is occupied by a gas such as air and the remainder is occupied by gel. The minimum thickness of the walls of the columns is controlled by three factors: (1) manufacturability; (2) the amount of gel needed for protection of the cushioned object in the event of all columns buckling; and (3) the ability to support the cushioned object without buckling the majority of the columns. The preferred thickness would be such that the columns under the most protruding parts of the cushioned object are buckled, and the remaining columns are compressed in proportion to the degree of protrusion of the cushioned object immediately above them but are not buckled.

B. Cushion Materials

It is preferred that the cushioning media used to manufacture the invented cushioning element be a soft gel. This assures that the invented cushion will yield under a cushioned object by having buckling columns and by the cushioning medium itself compressing under the weight of the cushioned object. The soft gel will provide additional cushioning and will accommodate uneven surfaces of the cushioned object. Nevertheless, firmer gels are also useful in the cushioning element of the invention, provided that the gel is soft enough to provide acceptable cushioning for the object in the event that all of the columns buckle. Since, with a given type of gel, there is typically a correlation between softness and Young's modulus (stiffness)(i.e., a softer gel is less stiff), and since there is a correlation between Young's modulus and the load carrying capability of a column before buckling, there is typically a need for firmer gels in cushions which will carry a higher load. However, there are other alternatives for increasing a cushion's load carrying capability, such as increasing the column wall thickness, so that the softness of the gel can be selected for its cushioning characteristics and not solely for its load bearing characteristics, particularly in cases where cushion weight is not a factor. Any gelatinous elastomer or gelatinous visco-elastomer with a hardness on the Shore A scale of less than about 15 is useful in the cushioning element of the present invention. Preferably, the cushioning medium has a Shore A hardness of about 3 or less. More preferred are materials which have a hardness of less than about 800 gram bloom. Such materials are too soft to measure on the Shore A scale. Gram Bloom is defined as the gram weight required to depress a gel a distance of four millimeters (4 mm) with a piston having a cross-sectional area of one square centimeter (1 $cm^2$) at a temperature of about 23° C. The preferred gel is cohesive at the normal useable temperatures of a cushioning element. The preferred gel will not escape from the cushioning element if the cushioning element is punctured. The preferred gel has shape memory so that it tends to return to its original shape after deformation.

The cushioning media or preferred gel must also be strong enough to withstand the loads and deformations that are ordinarily expected during the use of a cushion. For a given type of gel, there is typically a correlation between softness and strength (i.e., softer gels are not as strong as harder gels).

Because of their high strength even in soft formulations, their low cost, their ease of manufacture, the variety of manufacturing methods which can be used, and the wide range of Young's modulus which can be formulated while maintaining the hydrostatic characteristics of a gel, the gel formulations which follow are the most preferred gels to be used in the cushions of this invention.

Applicant believes that the reader might benefit from a general background discussion of the chemistry underlying the preferred gels prior to reading about the preferred formulations of the preferred gels.

1. Chemistry of Plasticizer-Extended Elastomers

A basic discussion of the chemical principles underlying the characteristics and performance of plasticizer-extended elastomers is provided below to orient the reader for the later discussion of the particular chemical aspects of the preferred material for use in the cushions of the present invention.

The preferred gel cushioning medium is a composition primarily of triblock copolymers and plasticizers, both of which are commonly referred to as hydrocarbons. Hydrocarbons are elements which are made up mainly of Carbon (C) and Hydrogen (H) atoms. Examples of hydrocarbons include gasoline, oil, plastic and other petroleum derivatives.

Figure 31A:
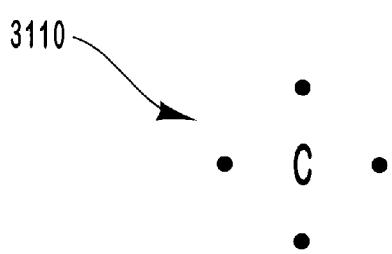
FIG. 31a depicts a carbon atom and its covalent bonding sites.
Figure 31B:
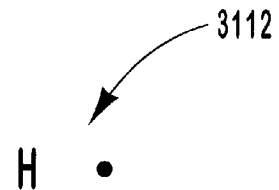
FIG. 31b depicts a hydrogen atom and its covalent bonding site.
Figure 31C:
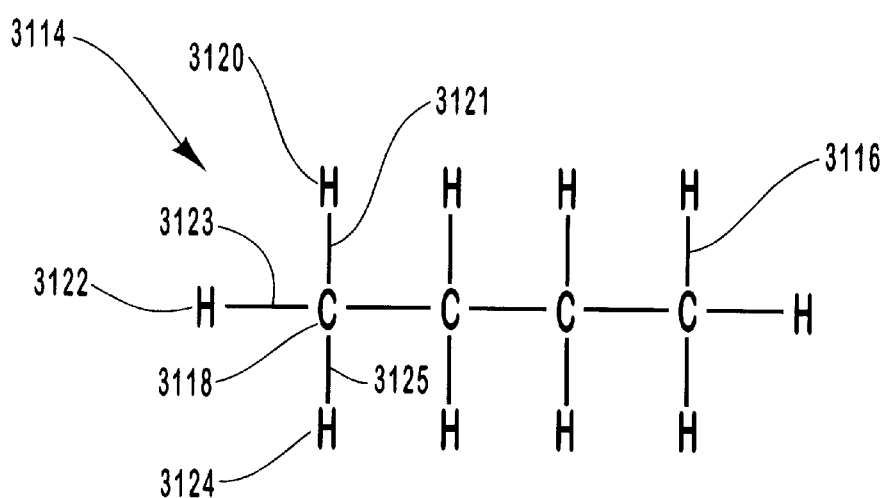
FIG. 31c depicts a four carbon hydrocarbon molecule known as butate.

Referring to FIG. 31a, it can be seen that a carbon atom 3110 typically has four covalent bonding sites "●". FIG. 31b shows a hydrogen atom 3112, which has only one covalent bonding site ●. With reference to FIG. 31c, which represents a four-carbon molecule called butane, a "covalent" bond, represented at 3116 as "-", is basically a very strong attraction between adjacent atoms. More specifically, a covalent bond is the linkage of two atoms by the sharing of two electrons, one contributed by each of the atoms. For example, the first carbon atom 3118 of a butane molecule 3114 shares an electron with each of three hydrogen atoms 3120, 3122 and 3124, represented as covalent bonds 3121, 3123 and 3125, respectively, accounting for three of carbon atom 3118's available electrons. The final electron is shared with the second carbon atom 3126, forming covalent bond 3127. When atoms are covalently bound to one another, the atom-to-atom covalent bond combination makes up a molecule such as butane 3114. An understanding of hydrocarbons, the atoms that make hydrocarbons and the bonds that connect those atoms is important because it provides a basis for understanding the structure and interaction of each of the components of the preferred gel material.

Figure 32A:
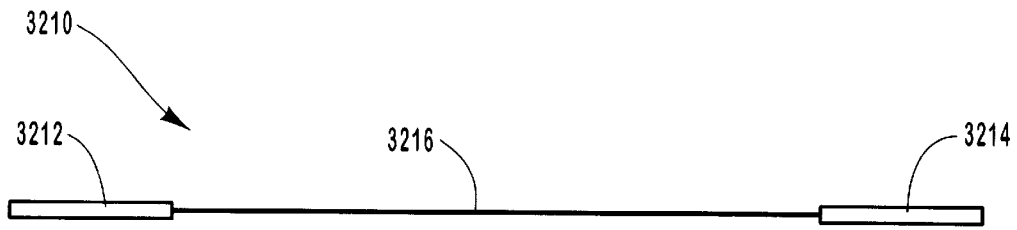
FIG. 32a depicts a triblock copolymer useful in the preferred cushioning medium.
Figure 32B:
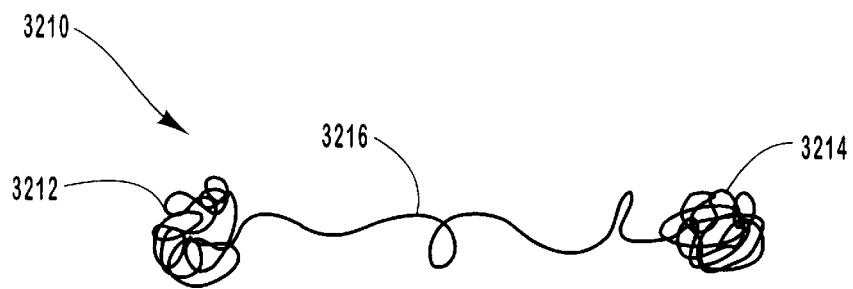
FIG. 32b depicts the triblock copolymer of FIG. 32a in a relaxed state.

As mentioned above, the preferred gel cushioning material utilizes triblock copolymers. With reference to FIGS. 32a and 32b, a triblock copolymer is shown. Triblock copolymers 3210 are so named because they each have three blocks—two endblocks 3212 and 3214 and a midblock 3216. If it were possible to grasp the ends of a triblock copolymer molecule and stretch them apart, each triblock copolymer would have a string-like appearance (as in FIG. 32a), with an endblock being located at each end and the midblock between the two endblocks.

Figure 33A:
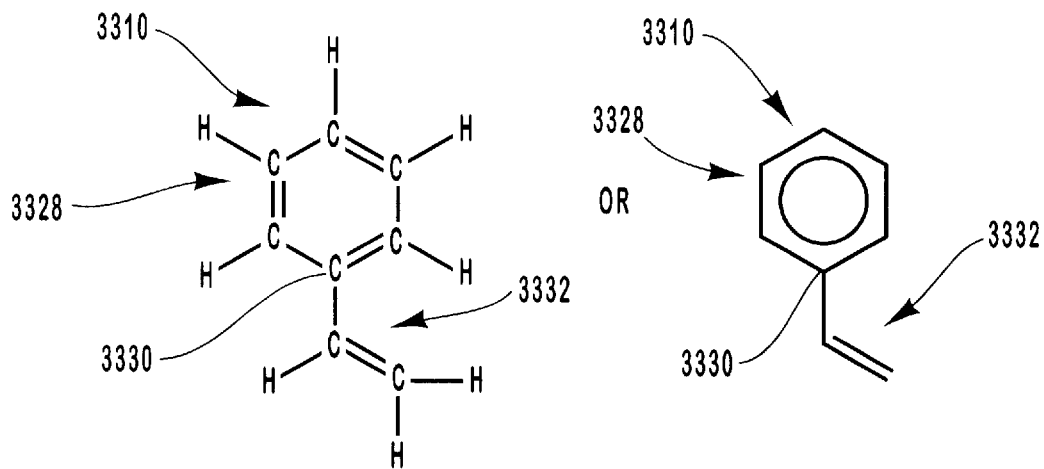
FIG. 33a depicts the chemical structure of a styrene molecule.
Figure 33B:
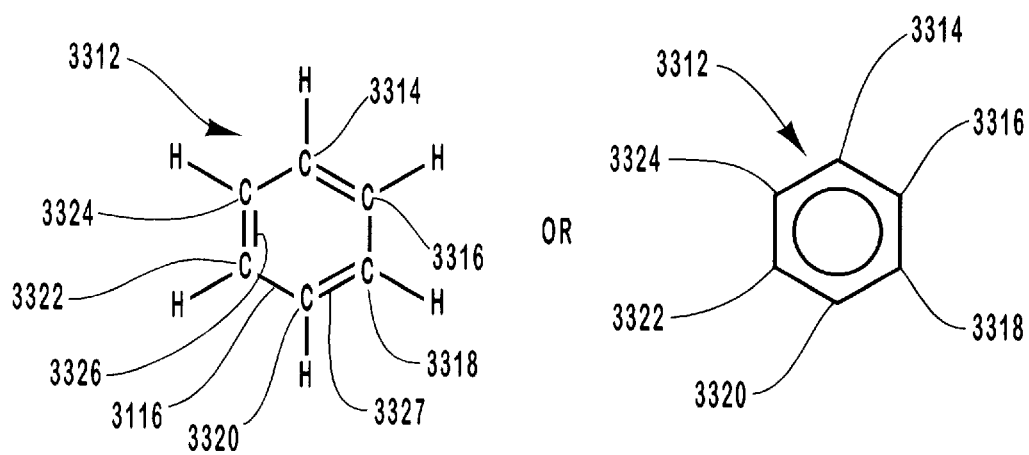
FIG. 33b depicts the chemical structure of a benzene molecule.
Figure 33C:
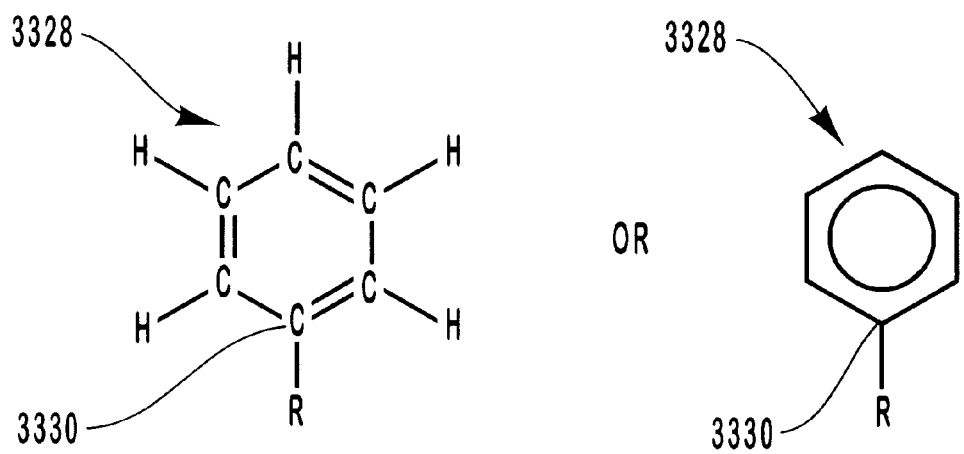
FIG. 33c depicts the chemical structure of an aryl group.

FIG. 33a depicts the preferred endblocks of the copolymer most preferred for use in the preferred gel material, which are known as monoalkenylarene polymers 3310. Breaking the term "monoalkenylarene" into its component parts is helpful in understanding the structure and function of the endblocks. "Aryl" refers to what is known as an aromatic ring bonded to another hydrocarbon group. Referring now to FIG. 33b, benzene 3312, one type of aromatic ring, is made up of six carbon molecules 3314, 3316, 3318, 3320, 3322 and 3324 bound together in a ring-like formation. Due to the ring structure, each of the carbon atoms is bound to two adjacent carbon atoms. This is possible because each carbon atom has four bonding sites. In addition, each carbon atom C of a benzene molecule is bound to only one hydrogen atom H. The remaining bonding site on each carbon atom C is used up in a double covalent bond 3326, 3327, which is referred to as a double bond. Because each carbon atom has only four bonding sites, double bonding in an aromatic ring occurs between a first carbon and only one of the two adjacent carbons. Thus, single bonds 3116 and double bonds 3326 alternate around the benzene molecule 3312. With reference to FIG. 33c, in an aryl group 3328, one of the carbons 3330 is not bound to a hydrogen atom, which frees up a bonding site R for the aryl group to bond to an atom or group other than a hydrogen atom.

Figure 33D:
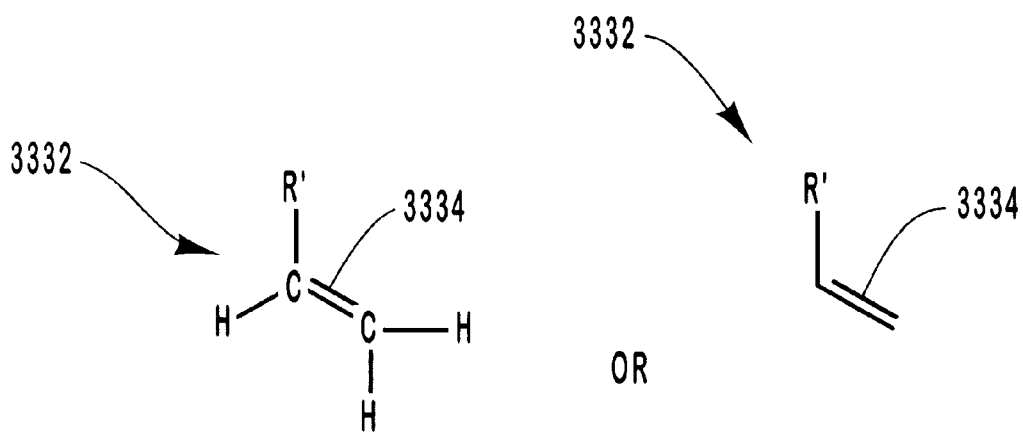
FIG. 33d depicts the chemical structure of an -enyl group.
Figure 33E:
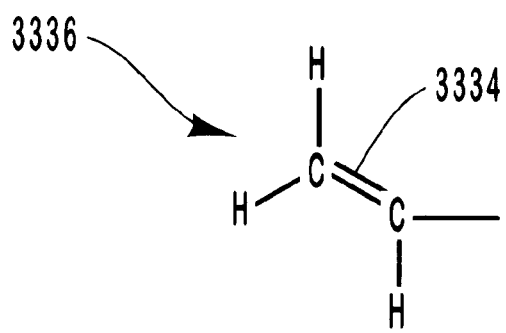
FIG. 33e depicts the chemical structure of an ethenyl group.
Figure 33F:
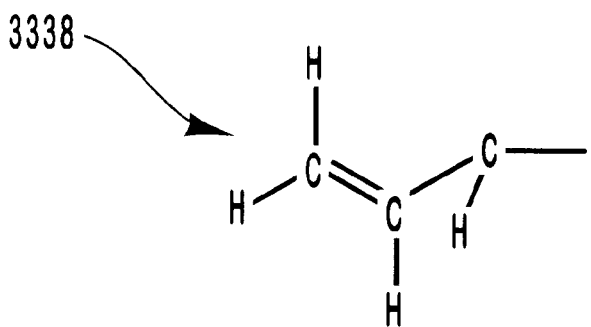
FIG. 33f depicts the chemical structure of a propenyl group.

Turning now to FIG. 33d, "alkenyl" 3332 refers to a hydrocarbon group made up of only carbon and hydrogen atoms, wherein at least one of the carbon-to-carbon bonds is a double bond 3334 and the hydrocarbon group is connected to another group of atoms R', where R' represents the remainder of the hydrocarbon molecule and can include a single hydrogen atom. Specifically, the "en" signifies that a double bond is present between at least one pair of carbons. The "yl" means that the hydrocarbon is attached to another group of atoms. For example, FIG. 33e shows a two carbon group having a double bond between the carbons, which is called ethenyl 3336. Similarly, FIG. 3f illustrates a three carbon group having a double bond between two of the carbons, which is called propenyl 3338. Referring again to FIG. 33a, in a monoalkenylarene such as styrene, a carbon 3340 with a free bonding site of an alkenyl group 3332 is bonded to the aryl group 3328 at carbon atom 3330, which also has a free bonding site. In reference to FIG. 33c, aryl group 3328 is part of a monoalkenylarene molecule when R is an alkenyl group. The "mono" of monoalkenylarene explains that only one alkenyl group is bonded to the aryl group.

The monoalkenylarene end blocks of a triblock copolymer are polymerized. Polymerization is the process whereby monomers are connected in a chain-like fashion to form a polymer. FIG. 34a depicts a polymer 3410, which is basically a large chain-like molecule formed from many repeating smaller molecules, called monomers, M1, M2, M3, etc., that are bonded together. P and P' represent the ends of the polymer, which are also made up of monomers FIG. 34b illustrates a monoalkenylarene end block polymer 3414, which is a chain of monoalkenylarene molecules 3416a, 3416b, 3416c, etc. The chain of FIG. 34b is spiral, or helical, in shape due to the bonding angles between styrene molecules. P represents an extension of the endblock polymer helix in one direction, while P' represents an extension of the endblock polymer helix in the opposite direction.

As FIG. 34c shows, monoalkenylarene molecules are attracted to one another by a force that is weaker than covalent bonding. The primary weak attraction between monoalkenylarene molecules is known as hydrophobic attraction. An example of hydrophobic attraction is the attraction of oil droplets to each other when dispersed in water. Therefore, in its natural, relaxed state at room temperature, a monoalkenylarene polymer resembles a mass of entangled string 3414, as depicted in FIG. 34d. The attraction of monoalkenylarene molecules to one another creates a tendency for the endblocks to remain in an entangled state. Similarly, different monoalkenylarene polymers are attracted to each other. The importance of this phenomenon will become apparent later in this discussion.

Figure 35A:
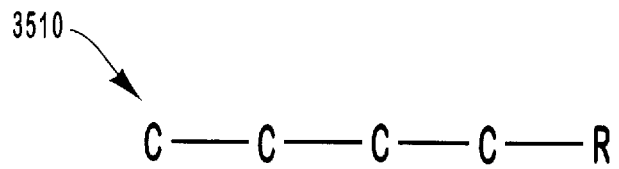
FIG. 35a depicts the chemical structure of hydrocarbon molecules known as alkanes.
Figure 35B:
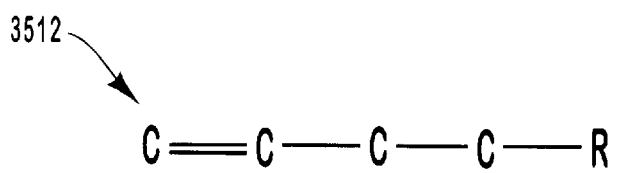
FIG. 35b depicts the chemical structure of hydrocarbon molecules known as alkenes.
Figure 35C:
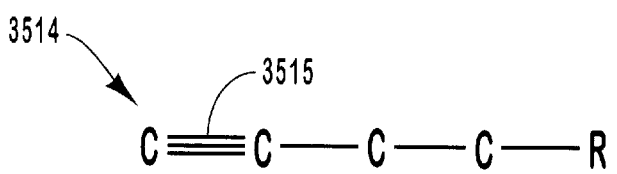
FIG. 35c depicts the chemical structure of hydrocarbon molecules known as alkynes.

Like the end blocks of a triblock copolymer, the midblock is also a polymer. The preferred triblock copolymer for use in the elastomer component of the preferred cushioning medium includes is an aliphatic hydrocarbon midblock polymer. Traditionally, "aliphatic" meant that a hydrocarbon was "fat like" in its chemical behavior. Referring to FIGS. 35a through 35c, which, for simplicity, do not show the hydrogen atoms, an "aliphatic compound" is now defined as a hydrocarbon compound which reacts like an alkane 3510 (a hydrocarbon molecule having only single bonds between the carbon atoms), an alkene 3512 (a hydrocarbon molecule wherein at least one of the carbon-to-carbon bonds is a double bond) 3514, an alkyne (a hydrocarbon molecule having a triple covalent bond 3515 between at least one pair of carbon atoms), or a derivative of one or a combination of the above.

Figure 35D:
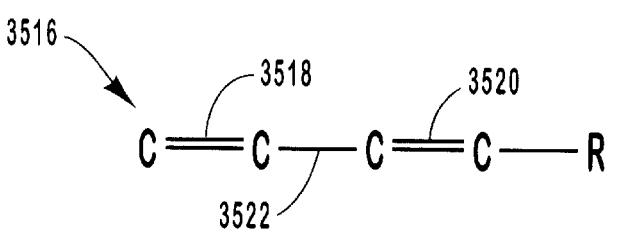
FIG. 35d depicts the chemical structure of a hydrocarbon molecule known as a conjugated diene.
Figure 35E:
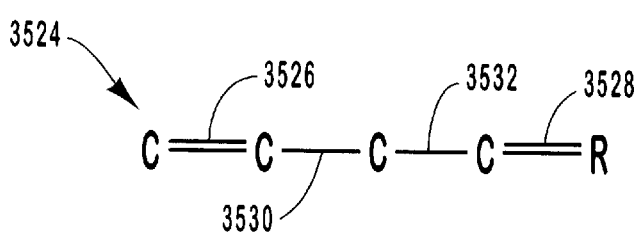
FIG. 35e depicts the chemical structure of a hydrocarbon molecule known as an isolated diene.

Referring now to FIG. 35d, which omits the bound hydrogen atoms for simplicity, aliphatic hydrocarbons known as conjugated dienes 3516 are depicted. These are the preferred midblock monomers used in the triblock copolymers of the preferred gel material for use in the present invention. A "diene" is a hydrocarbon molecule having two ("di") double bonds ("ene"). "Conjugated" means that the double bonds 3518 and 3520 are separated by only one single carbon-to-carbon bond 3522. In comparison, FIG. 35e shows a hydrocarbon molecule having two double carbon-to-carbon bonds that are separated by two or more single bonds, 3530, 3532, etc., which is referred to as an "isolated diene" 3524. When double bonds are conjugated, they interact with each other, providing greater stability to a hydrocarbon molecule than would the two double bonds of an isolated diene.

FIGS. 36a through 36d illustrate examples of various monomers useful in the midblock of the triblock copolymers preferred for use in the elastomer component of the preferred gel cushioning medium, including molecules (monomers) such as ethylene-butylene (EB) 3612, ethylene-propylene (EP) 3614, butadiene (B) 3616 (either hydrogenated or non-hydrogenated) and isoprene (I) 3618 (either hydrogenated or non-hydrogenated). The different structures of these molecules provide them with different physical characteristics, such as differing strengths of covalent bonds between adjacent monomers. The various structures of monomer molecules also provides for different types of interaction between distant monomers on the same chain (e.g., when the midblock chain folds back on itself, distant monomers may be attracted to one another by a force weaker than covalent bonding, such as hydrophobic interaction, hydrophilic interaction, polar forces or Vander Waals forces).

Figure 36A:
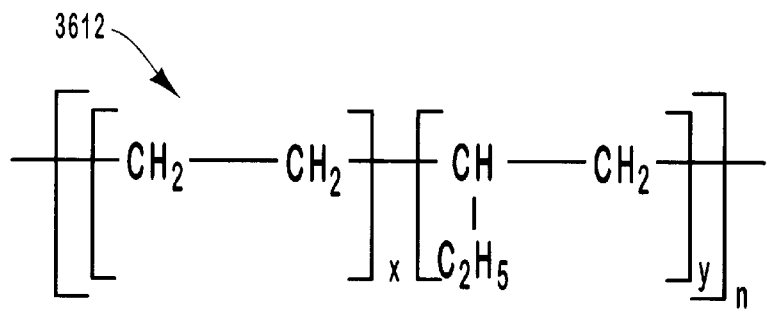
FIG. 36a depicts the chamical structure of a poly (ethylene/butylene) molecule.
Figure 36B:
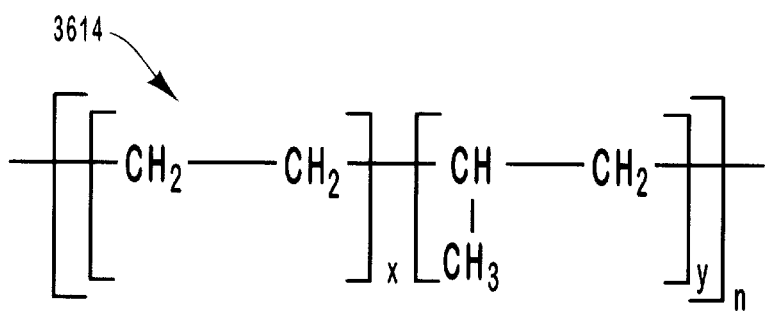
FIG. 36b depicts the chemical structure of a poly (ethylene/propylene) molecule.
Figure 36C:
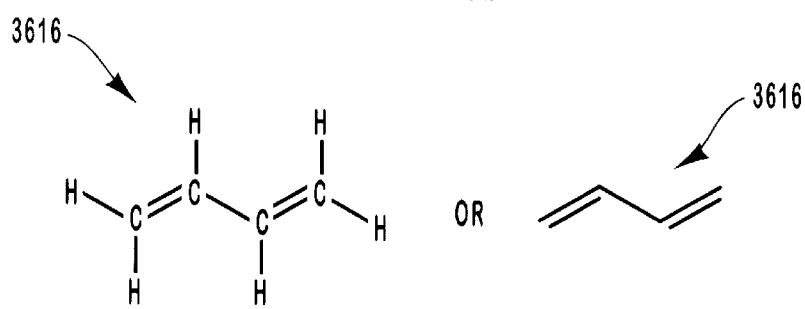
FIG. 36c depicts the chemical structure of a 1,3-butadiene molecule.
Figure 36D:
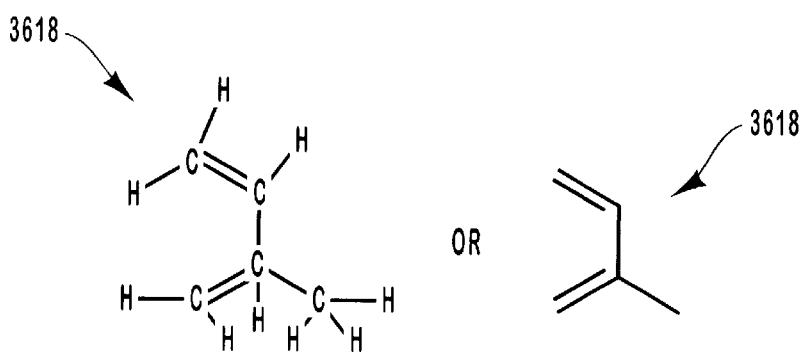
FIG. 36d depicts the chemical structure of an isoprene molecule.

Referring to FIGS. 36a and 36b, x, y and n each represent an integral number of each bracketed unit: "x" is the number of repeating ethylene (—CH2—CH2—) units, "y" is the number of repeating butylene (in FIG. 36a) or propylene (in FIG. 36b) units, and "n" is the number of repeating poly (ethylene/butylene) units. Numerous configurations are possible.

Figure 37A:
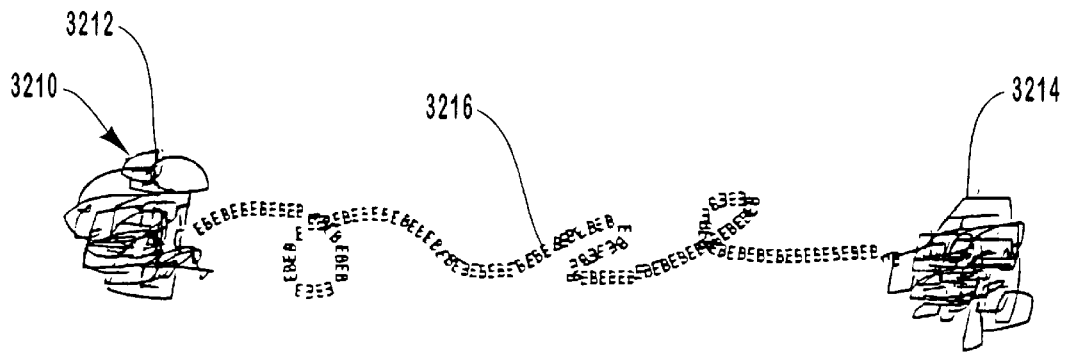
FIG. 37a depicts polystyrene-poly(ethylene/butylene)-polystyrene.
Figure 37B:
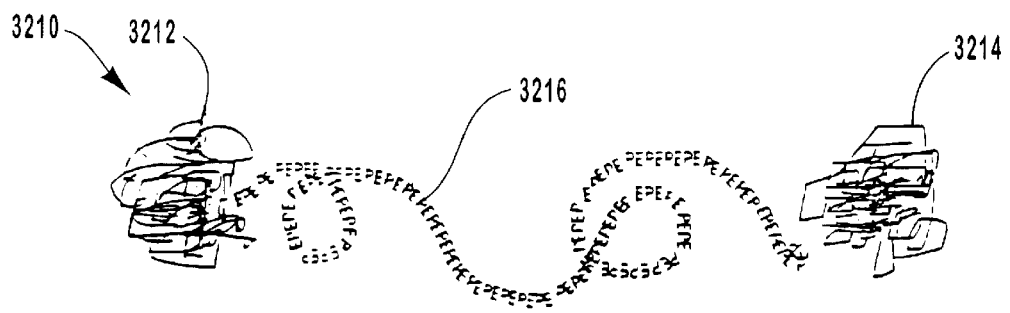
FIG. 37b depicts polystyrene-poly(ethylene/propylene)-polystyrene.
Figure 37C:
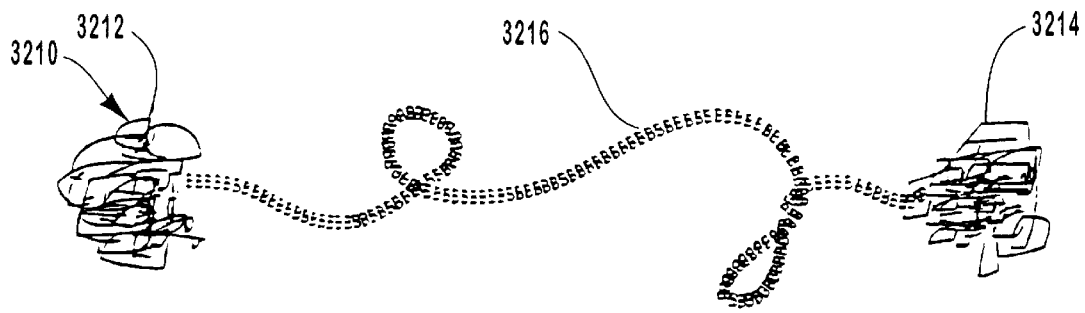
FIG. 37c depicts polystyrene-polybutadiene-polystyrene.
Figure 37D:
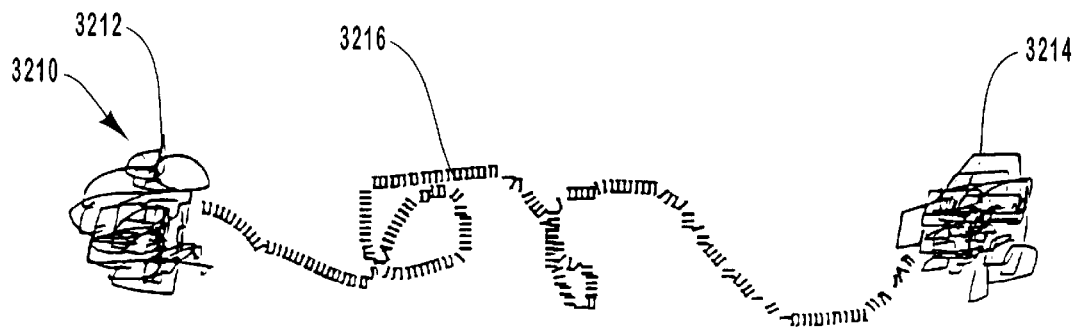
FIG. 37d depicts polystyrene-polyisoprene-polystyrene.
Figure 37E:
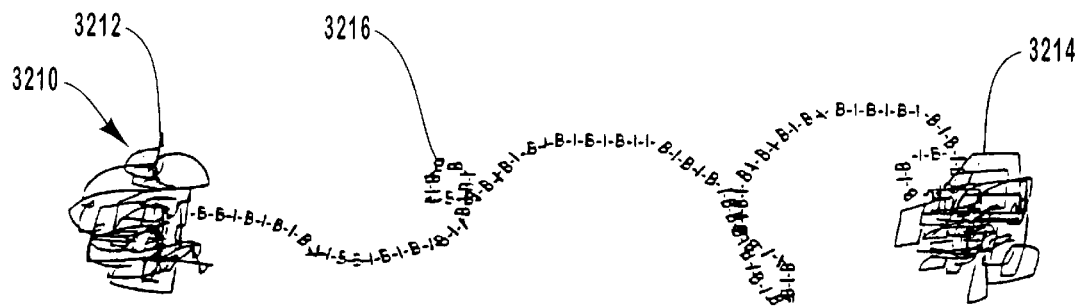
FIG. 37e depicts polystyrene-poly(isoprene+butadiene)-polystyrene.
Figure 37F:
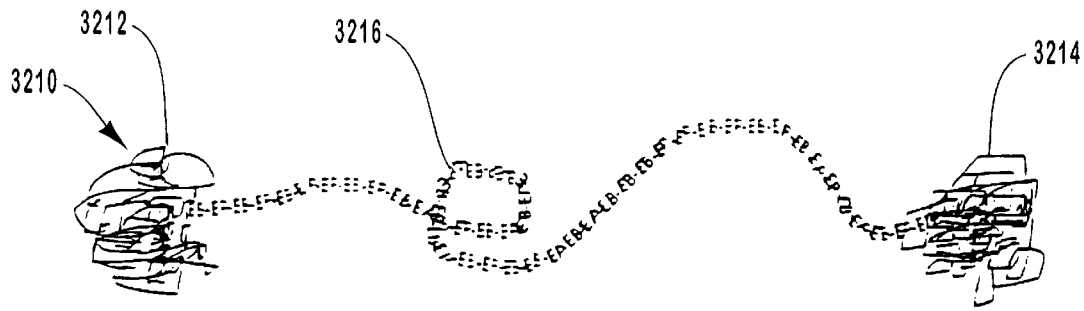
FIG. 37f depicts polystyrene-poly(ethylene/butylene+ ethylene/propylene)-polystyrene.

As shown in FIGS. 37a through 37d, the midblock may contain (i) only one type of monomer, EB, EP, B or I or, as FIGS. 37e and 37f illustrate, (ii) a combination of monomer types EB and EP or B and I, providing for wide variability in the physical characteristics of different midblocks made from different types or combination of types of monomers. The interaction of physical characteristics of each molecule (monomer and block) determines the physical characteristics of the tangible, visible material. In other words, the type or types of monomer molecules which make up the midblock polymer play a role in determining various characteristics of the material of which the midblock is a part.

Attributes such as strength, elongation, elasticity or viscoelasticity, softness, tackiness and plasticizer retention are, in part, determined by the type or types of midblock monomers. For example, referring again to FIG. 37a, the midblock polymer 3216 of a triblock copolymer-containing material may be made up primarily or solely of ethylene-butylene monomers EB, which contribute to that material's physical character. With reference to FIG. 37e, in comparison to the material having a midblock made up solely of EB, a similar triblock-containing material, wherein the midblock polymer 3216 of the triblocks are made up of a combination of butadiene B and isoprene I monomers, may have greatly increased strength and elongation, similar elasticity or viscoelasticity and softness, reduced tackiness and reduced plasticizer bleed.

The monomer units of the midblock have an affinity for each other. However, the hydrophobic attraction of the midblock monomers for each other is much weaker than the non-covalent attraction of the end block monomers for one another.

Figure 38A:
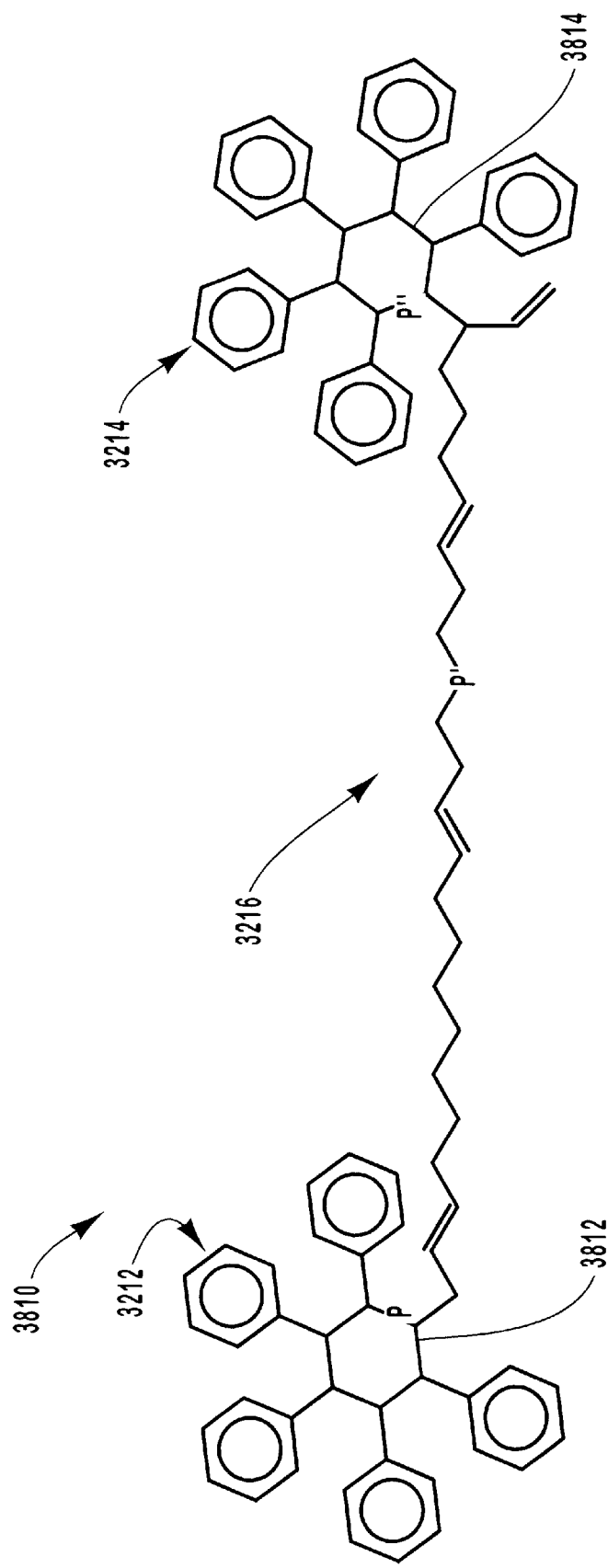
FIG. 38a depicts the chemical structure of polystyrene-poly(ethylene/butylene +ethylene/propylene)-polystyrene.
Figure 38B:
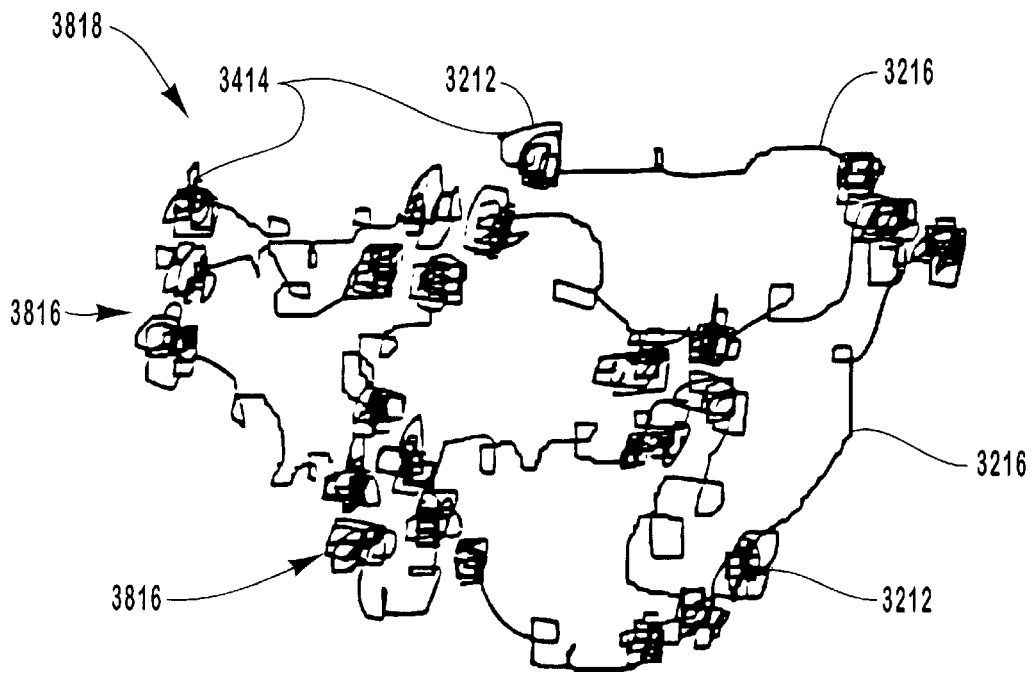
FIG. 38b depicts the group of the triblock copolymers of FIG. 321a, showing weak attraction of the endblocks to each other.

Referring now to FIG. 38a, which shows a polystyrene-poly(butadiene+isoprene)-polystyrene triblock copolymer, in a complete triblock copolymer 3810, each end 3812 and 3814 of midblock chain 3216 is covalently bound to an end block 3212 and 3214. P and P" represent the remainder of the endblock polymers 3212 and 3214 respectively. P' represents the central portion of midblock polymer 3216. Many billions of triblock copolymers combine to form a tangible material. The triblock copolymers are held together by the high affinity (i.e., hydrophobic attraction) that monoalkenylarene molecules have for one another. In other words, as FIG. 38b illustrates, the endblocks of each triblock copolymer molecule, each of which resemble an entangled mass of string 3414, are attracted to the endblocks of another triblock copolymer. When several endblocks are attracted to each other, they form an accretion of endblocks, called a domain or a glassy center 3816. Agglomeration of the endblocks occurs in a random fashion, which results in a three-dimensional network 3818 of triblocks, the midblock 3216 of each connecting endblocks 3212 and 3214 located at two different domains 3816a and 3816b. In addition to holding the material together, the domains of triblock copolymers also provide it with strength and rigidity.

Figure 39A:
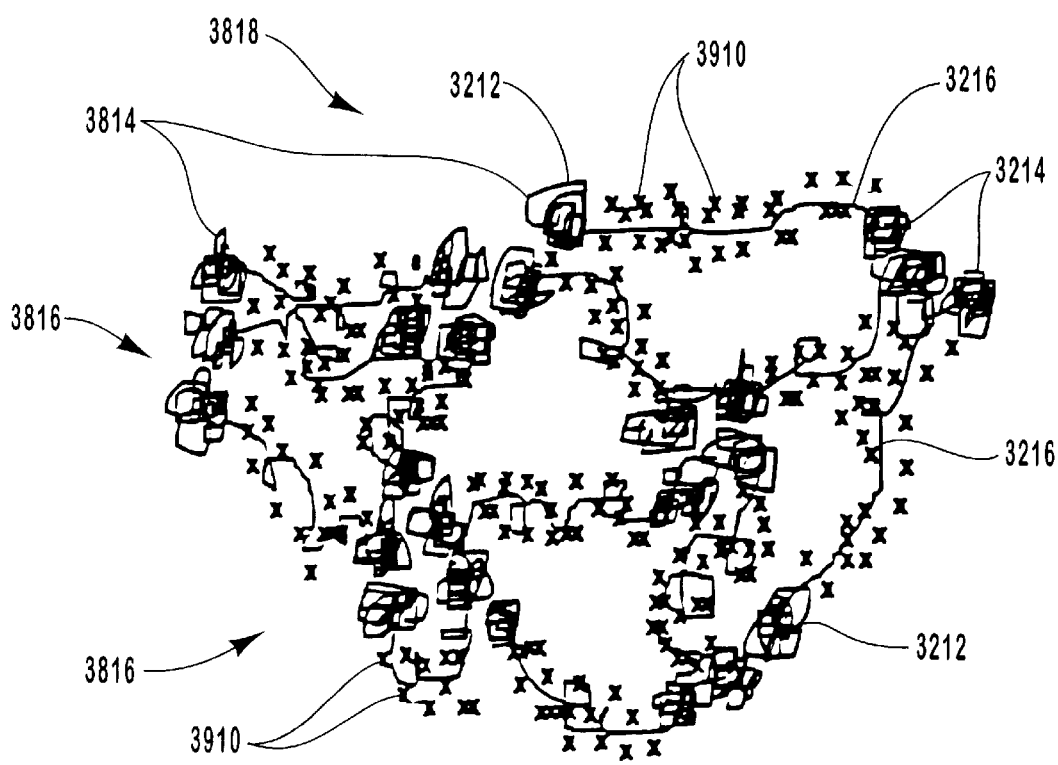
FIG. 39a illustrates plasticizer association with the group of triblock copolymers of FIG. 38b according to a preferred formulation of the preferred cushioning medium.

Plasticizers are generally incorporated into a material to increase the workability, pliability and flexibility of that material. Incorporation of plasticizers into a material is known as plasticization. Chemically, plasticizers are hydrocarbon molecules which associate with the material into which they are incorporated, as represented in FIG. 39a. In the preferred gel material, plasticizer molecules 3910 associate with the triblock copolymer 3210, and increase its workability, softness, elongation and elasticity or visco-elasticity. Depending upon the type of plasticizer used, the plasticizer molecules associate with either the endblocks, the midblock, or both. In order to preserve the strength of the preferred gel materials, Applicant prefers the predominant use of plasticizers 3910 which associate primarily with midblock polymer 3216 of triblock copolymer 3818, rather than with the end blocks. However, plasticizers which associate with the end blocks may also be useful in some formulations of the preferred gel material. Plasticizers are also desired which associate with the principle thermoplastic polymer component of the gel material.

Chemists have proposed four general theories to explain the effects that plasticizers have on certain materials. These theories are known as the lubricity theory, the gel theory, the mechanistic theory and the free volume theory.

Figure 39B:
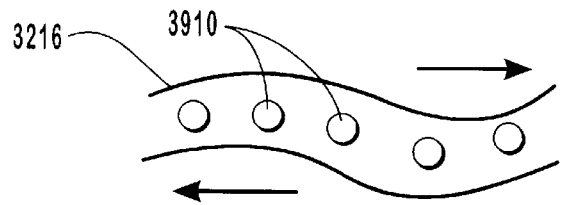
FIG. 39b illustrates the lubricity theory of plasticization, showing two midblocks (B) moving away from each other.
Figure 39C:
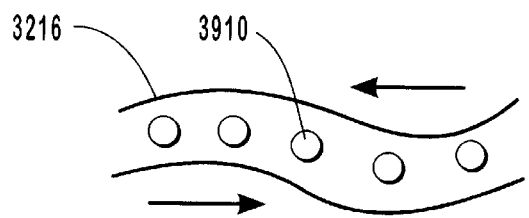
FIG. 39c illustrates the lubricity theory of plasticization, showing two midblocks (B) moving toward each other.
Figure 39D:
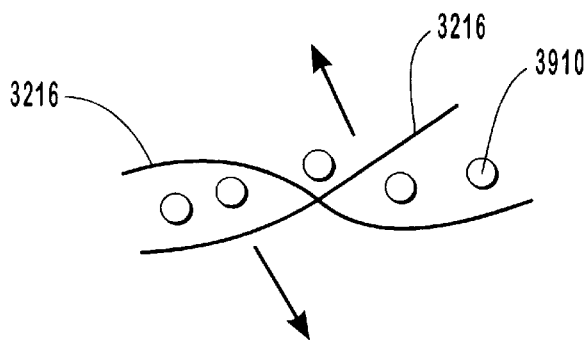
FIG. 39d illustrates the lubricity theory of plasticization, showing two midblocks (B0 moving across each other.

The lubricity theory, illustrated in FIGS. 39b through 39d, assumes that the rigidity of a material (i.e., its resistance to deformation) is caused by intermolecular friction. Under this theory, plasticizer molecules 3910 lubricate the large molecules, facilitating movement of the large molecules over each other. See generally, Jacqueline I. Kroschwitz, ed., *CONCISE ENCYCLOPEDIA OF POLYMER SCIENCE AND ENGINEERING* 734–44, *Plasticizers* (1990), which is hereby incorporated by reference. In the case of triblock copolymers, lubrication of the endblocks should be avoided since the endblock domains are responsible for holding the triblock copolymers together and impart the material with strength (e.g., tensile strength during elongation). Thus, a plasticizer which associates with the midblocks is preferred. According to the lubricity theory, when manipulative force is exerted on the material, plasticizer 3910 facilitates movement of midblocks 3216 past each other. Id. at 734–35. The arrows in FIGS. 39b, 39c and 39d represent the motion of midblocks 3216 with respect to each other. FIG. 39b represents adjacent midblocks being pulled away from each other. FIG. 39c represents two midblocks being forced side-to-side. FIG. 39d represents adjacent midblocks being pulled across one another.

Figure 39E:
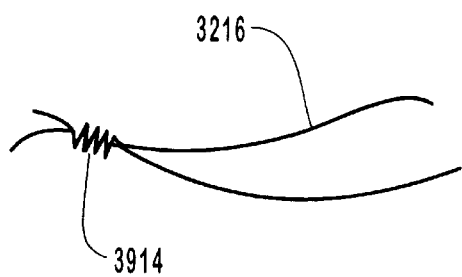
FIG. 39e illustrates the gel theory of plasticization, showing a weak attraction between two midblocks (B) when plasticizer is not present.
Figure 39F:
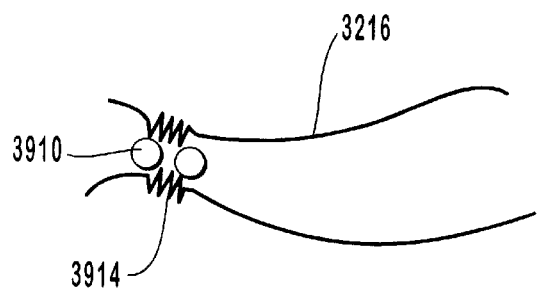
FIG. 39f illustrates the gel theory of plasticization, showing a plasticizer molecule breaking the weak attraction of FIG. 39e.

FIGS. 39e and 39f depict a second plasticization theory, the gel theory, which reasons that the resistance of amorphous polymers to deformation results from an internal, three-dimensional honeycomb structure or gel. Loose attachments between adjacent polymer chains, which occur at intervals along the chains, called attachment points, form the gel. Closer attachment between adjacent chains creates a stiffer and more brittle material. Plasticizers 3910 break, or solvate, the points of attachment 3914 between polymer chains, loosening the structure of the material. Thus, plasticizers produce about the same effect on a material as if there were fewer attachment points between polymer chains, making the material softer or less brittle. See Id. at 735. Since one of the purposes of the preferred gel is to provide a material which does not have significantly decreased tensile strength, which is provided by agglomeration of the endblocks, according to the gel theory plasticizer 3910 should associate with midblocks 3216 rather than with the endblocks. Further, a plasticizer which associates with the midblock polymers decreases the attachment of adjacent midblocks, which likely decreases the rigidity while increasing the pliability, elongation and elasticity or visco-elasticity of the material. Similar to the lubricity theory, under the gel theory, reduction of attachment points between adjacent midblocks facilitates movement of the midblocks past one another as force is applied to the material.

Figure 39G:
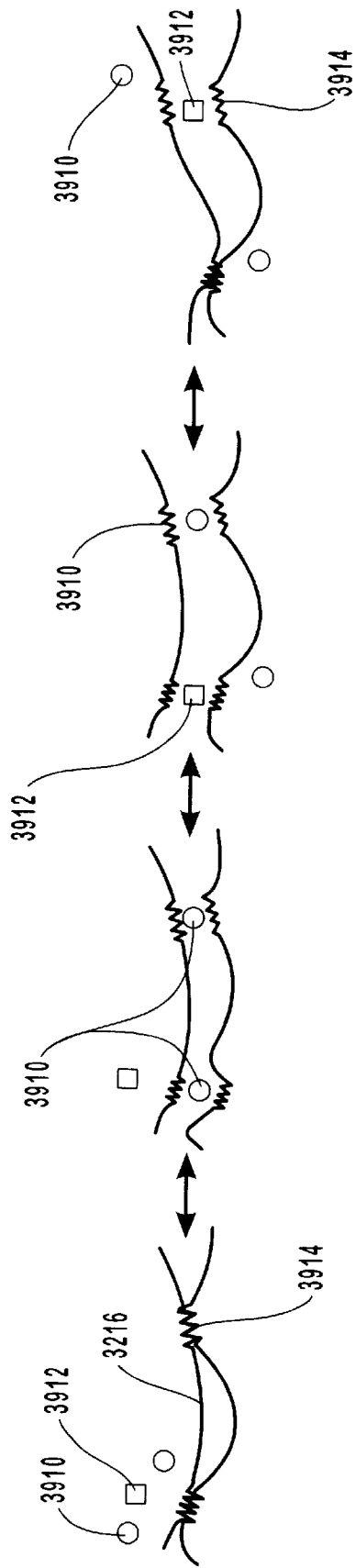
FIG. 39g illustrates the mechanistic theory of plasticization, showing an equilibrium of plasticizer breaking the weak attraction of midblocks (B) for each other.

Referring now to FIG. 39g, the mechanistic theory of plasticization assumes that different types of plasticizers 3910, 3912, etc. are attracted to polymer chains by forces of different magnitudes. In addition, the mechanistic theory supposes that, rather than attach permanently, a plasticizer molecule attaches to a given attachment point only to be later dislodged and replaced by another plasticizer molecule. This continuous exchange of plasticizers 3910, 3912, etc., demonstrated by FIG. 39g as different stages connected by arrows which represent an equilibrium between each stage, is known as a dynamic equilibrium between solvation and desolvation of the attachment points between adjacent polymer chains. The number or fraction of attachment points affected by a plasticizer depends upon various conditions, such as plasticizer concentration, temperature, and pressure. See Id. Accordingly, as applied to the preferred gel material for use in this invention, a large amount of plasticizer would be necessary to affect the majority of midblock attachment points and thus provide the desired amounts of rigidity, softness, pliability, elongation and elasticity or visco-elasticity.

Figure 39H:
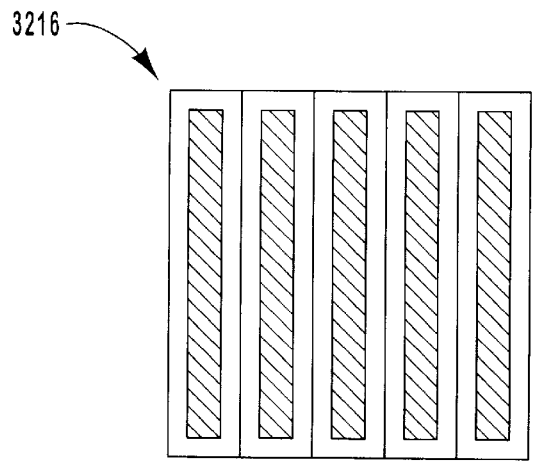
FIG. 39h illustrates the free volume theory of plasticization, showing the free space associated with a midblock (B).
Figure 39I:
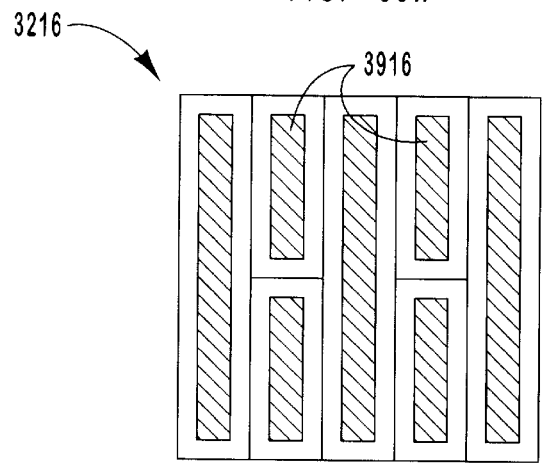
FIG. 39i illustrates the theory of FIG. 39h, showing that as small plasticizer molecules are added, the free space in a given area increases.
Figure 39J:
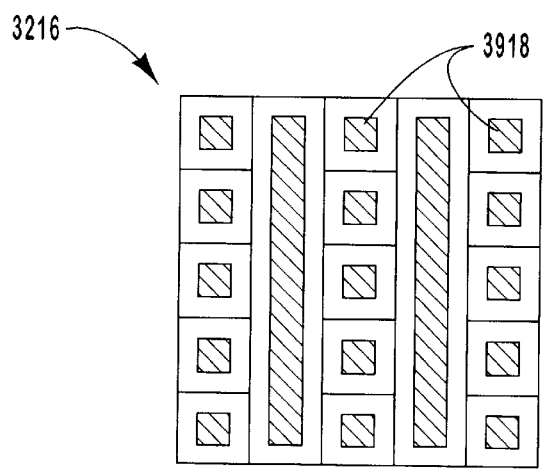
FIG. 39j illustrates the theory of FIG. 39h, showing the even small plasticizers provide an even greater amount of free space.

With reference to FIGS. 39h through 39j, the fourth plasticization theory, known as the free volume theory, assumes that there is nothing but free space between molecules. As molecular motion increases (e.g., due to heat), the free space between molecules increases. Thus, a disproportionate amount of that free volume is associated with the ends of the polymer chains. As FIGS. 39h through 39j demonstrate, free volume is increased by using polymers with shorter chain lengths. For example, the black rectangles of FIG. 39h represent a material made up of long midblock polymers 3216. The white areas around each black rectangle represent a constant width of free space around the molecule. In FIG. 39i, a molecule 3916, which is smaller than midblock 3216, is added to the material, creating more free space. In FIG. 39j, an even smaller molecule 3918 has been added to the material. The increase in free space within the material is evident from the increased area of white space. The crux of the free volume theory is that the increase in free space or volume allows the molecules to more easily move past one another. In other words, the use of a small (or low molecular weight) plasticizer increases the ability of the midblock polymer chains to move past each other. While FIGS. 39h, 39i and 39j provide a fair representation of the free volume theory, in reality, the increase in free space would be much greater than a two-dimensional drawing illustrates since molecules are three-dimensional structures.

Similarly, the use of polymers with flexible side chains create additional free volume around the molecule, which produces a similar plasticization-like effect, called internal plasticization. Applicant believes that incorporation of monomers into the midblock, which create flexible side chains thereon, including but not limited to isoprene (either hydrogenated or non-hydrogenated) and ethylene/propylene monomers, creates internal plasticization. In comparision, the addition of an even smaller plasticizer molecule, described above, increases the free space at a given location; this is external plasticization. The size and shape of plasticizing molecule and the nature of its atoms and groups of atoms (i.e., nonpolar, polar, hydrogen bonding or not, and dense or light) determines the plasticizer's plasticizing ability on a specific polymer. See Id.

With this general background in mind, Applicant will explain the formulation, chemical structure and performance of the preferred gel material for use in the present invention.

2. Definitions

For the reader's convenience, Applicant has defined several terms which are used throughout the description of the present gel. Additionally, other terms have been defined throughout the detailed description of the preferred gel material.

a. Elasticity and Visco-Elasticity

When finite strains are imposed upon visco-elastic materials, such as the preferred gel materials, the stress-strain relations are much more complicated than those ordinarily anticipated in accordance with the classical theory of elasticity (Hooke's law) or the classical theory of hydrodynamics (Newton's law). According to Hooke's law, stress is always directly proportional to strain in small deformations but independent of the rate of strain or the strain history. Newton's law of hydrodynamics, which deals with the properties of viscous liquids, states that stress is always directly proportional to the rate of strain but independent of the strain itself.

"Elastic," as defined herein, refers to a characteristic of materials which return substantially to their original shape following deformation and the subsequent cessation of deforming force.

"Visco-," as defined herein, relates to both the rate of deformation and the rate of reformation. In reference to deformation rate, the faster a deforming force is applied to a visco-elastic material, the stiffer it is. The rate of reformation of a visco-elastic material is slower than that of a truly elastic material.

Even if both strain and rate of strain are infinitesimal, a visco-elastic material may exhibit behavior that combines liquid-like and solid-like characteristics. For example, materials that exhibit not-quite-solid-like characteristics do not maintain a constant deformation under constant stress but deform, or creep, gradually over time. Under constant deformation, the stress required to hold a visco-elastic material in the deformed state gradually diminishes until it reaches a relatively steady state. On the other hand, a visco-elastic material that exhibits not-quite-liquid-like characteristics may, while flowing under constant stress, store some of the energy input instead of dissipating it all as heat. The stored energy may then cause the material to at least partially recover from its deformation, known as elastic recoil, when the stress is removed. When viscoelastic materials are subjected to sinusoidally oscillating stress, the strain is neither exactly in phase with the stress (as it would be for a perfectly elastic solid) nor 90° out of phase (as it would be for a perfectly viscous liquid), but is somewhere in between. Visco-elastic materials store and recover some of the deforming energy during each cycle, and dissipate some of the energy as heat. If the strain and rate of strain on a visco-elastic material are infinitesimal, the behavior of that material is linear viscoelastic and the ratio of stress to strain is a function of time (or frequency) alone, not of stress magnitude. The gel material preferred for use in the present invention is elastic in nature. Visco-elastic materials are also useful in the cushions of the present invention.

b. Rebound Rate

"Rebound rate", as defined herein, is the amount of time it takes a one inch long piece of material to rebound to within about five percent its original shape and size following the release of stress which elongates the material to a length of two inches. The preferred elastic (or elastomeric) gel material useful in the cushioning elements of the present invention has a rebound rate of less than about one second. The preferred visco-elastic (or visco-elastomeric) gel material useful in the cushioning elements of the present invention has a rebound rate of at least about one second. More preferably, the preferred visco-elastic gel has a rebound rate within the range of about one second to about ten minutes.

"Instantaneous Rebound," as defined herein, refers to a characteristic of a one inch long piece of an elastomeric material which returns substantially to its original size and shape in times of about one second or less following the release of stress which elongates the material to a length of two inches. "Elastomer," as used herein, refers to the gel materials that are useful in the cushioning element of this invention and which have instantaneous rebound.

"Delayed Rebound," as used herein, refers to a characteristic of the visco-elastic materials preferred for use in the cushions of this invention which have a rebound rate of at least about one second. More preferably, the preferred visco-elastomeric material has a rebound rate within the range of about one second to about ten minutes. "Visco-elastomer," as defined herein, refers to gel materials useful in the invented cushions which exhibit delayed rebound characteristics.

c. Resins

The term "resin" is defined herein as a solid or semisolid fusible, organic substance that is usually transparent or translucent, is soluble in organic solvent but not in water, is an electrical nonconductor, and includes tackifiers. Resins are complex mixtures which associate together due to similar physical or chemical properties. Because of their complex nature, resins do not exhibit simple melting or boiling points.

"Resinous" as used herein refers to resins and resin-like materials.

"Resinous plasticizers" as used herein refers to plasticizers which include a majority, by weight, of a resin or resins.

"Tackifier" as used herein refers to resins that add tack to the resulting mixture. The primary function of a tackifier is to add tack. The secondary functions of tackifiers include modification of both melt viscosity and melt temperature.

Tackifiers are normally low molecular weight and high glass transition temperature ($T_g$) materials, and are sometimes characterized as highly condensed acrylic structures. The most commonly used tackifiers are rosin derivatives, terpene resins, and synthetic or naturally derived petroleum resins. A tackifier's effectiveness is largely determined by its compatibility with the rubber component and by its ability to improve the tackiness of a material.

"Low molecular weight," as defined herein with reference to resins, means resins having a weight average molecular weight of less than about 50,000.

Resins and tackifiers are used in some preferred formulations of the preferred gel cushioning medium.

d. Oils

The term "oil" is defined herein as naturally occurring hydrocarbon liquids, the carbons of which are primarily saturated with hydrogen atoms. Oils preferred for use in the preferred gel are mineral oils.

"Paraffinic" oils have include straight-chain or branched-chain structures. "Naphthenic" oils include cyclic hydrocarbon structures. When an oil contains both paraffinic- and naphthenic-type structures, the relative concentrations of each type of structure determine whether the oil is identified as naphthenic or paraffinic.

"Oil viscosity" is defined herein as the measurement of time it takes a given volume of oil to pass through an orifice, such as a capillary tube. Viscosity measurements include the Saybolt universal second (SUS), stokes (s) and centistokes (cs).

e. Molecular Weight

"Number Average Molecular Weight" ($M_n$), as determined by gel permeation chromatography, provides information about the lower molecular weight parts of a substance which includes hydrocarbon molecules.

"Weight Average Molecular Weight" ($M_w$), as determined by gel permeation chromatography, indicates the average molecular weight of hydrocarbon molecules in a substance. This is the value that is commonly used in reference to the molecular weight of a hydrocarbon molecule.

"Z-Average Molecular Weight" ($M_z$), as determined by gel permeation chromatography, is used as an indication of the high-molecular-weight portion of a substance which includes hydrocarbon molecules. When the substance is a resin, the Z-average molecular weight indicates the compatibility and adhesive properties of that resin.

Molecular weight values may also be determined by any of several other methods, such as the Flory viscosity method, the Staudinger viscosity method, light scattering in combination with high performance liquid chromatography (HPLC), and others.

f. Cloud Point Tests

The following values, which are determined by cloud point tests, are useful in determining the compatibility of a resin with different types of materials.

"MMAP," as defined herein, is a measurement of aromatic solubility and determines the aliphatic/aromatic character of a resin. The MMAP value is obtained by dissolving a resin in a high temperature mixture of one part methylcyclohexane and two parts aniline, and cooling the solution while mixing to determine the temperature at which the mixture starts becoming cloudy, which is commonly referred to as the cloud point. The lower the MMAP value, the greater the aromaticity and lower the aliphaticity of the resin.

"DACP," as defined herein, is a value which determines the polarity of a resin due to the highly polar nature of the solvent system. In order to determine the DACP value of resin, the resin must first be dissolved in a heated 1:1 mixture of xylene and 4-hydroxy-4-methyl-2-pentanone. The solution is then cooled with mixing. The temperature at which the solution begins becoming opaque is the cloud point, which is the DACP value.

Since specific adhesion is related to the polarity of a resin, the DACP value can be used as a specific adhesion indicator. Lower DACP values indicate greater specific adhesion.

"OMSCP," as defined herein, is a value which is related to the molecular weight and molecular weight distribution of a resin. OMSCP can determine the compatibility characteristics of a resin/polymer system. The higher the OMS cloud point, the greater the molecular weight and the molecular weight distribution of a resin. In particular, high OMSCP values can indicate the presence of high molecular weight materials (of Z-average molecular weight).

The term "OMSCP" is derived from the method for determining OMSCP values. A resin is first dissolved in a high temperature mixture of odorless mineral spirits (OMS). The solution is then cooled with mixing. The temperature at which the mixture starts becoming cloudy is referred to as the cloud point (CP), or OMSCP value.

3. Material Formulations a. Elastomer Component

Preferably, the compositions of the preferred gel materials for use in the present invention are low durometer (as defined below) thermoplastic elastomeric compounds and visco-elastomeric compounds which include a principle polymer component, an elastomeric block copolymer component and a plasticizer component.

The elastomer component of the preferred gel material includes a triblock polymer of the general configuration A-B-A, wherein the A represents a crystalline polymer such as a monoalkenylarene polymer, including but not limited to polystyrene and functionalized polystyrene, and the B is an elastomeric polymer such as polyethylene, polybutylene, poly(ethylene/butylene), hydrogenated poly(isoprene), hydrogenated poly(butadiene), hydrogenated poly (isoprene+butadiene), poly(ethylene/propylene) or hydrogenated poly(ethylene/butylene+ethylene/propylene), or others. The A components of the material link to each other to provide strength, while the B components provide elasticity. Polymers of greater molecular weight are achieved by combining many of the A components in the A portions of each A-B-A structure and combining many of the B components in the B portion of the A-B-A structure, along with the networking of the A-B-A molecules into large polymer networks.

A preferred elastomer for making the preferred gel material is a very high to ultra high molecular weight elastomer and oil compound having an extremely high Brookfield Viscosity (hereinafter referred to as "solution viscosity"). Solution viscosity is generally indicative of molecular weight. "Solution viscosity" is defined as the viscosity of a solid when dissolved in toluene at 25–30° C., measured in centipoises (cps). "Very high molecular weight" is defined herein in reference to elastomers having a solution viscosity, 20 weight percent solids in 80 weight percent toluene, the weight percentages being based upon the total weight of the solution, from greater than about 20,000 cps to about 50,000 cps. An "ultra high molecular weight elastomer" is defined herein as an elastomer having a solution viscosity, 20 weight percent solids in 80 weight percent toluene, of greater than about 50,000 cps. Ultra high molecular weight elastomers have a solution viscosity, 10 weight percent solids in 90 weight percent toluene, the weight percentages being based upon the total weight of the solution, of about 800 to about 30,000 cps and greater. The solution viscosities, in 80 weight percent toluene, of the A-B-A block copolymers useful in the elastomer component of the preferred gel cushioning material are substantially greater than 30,000 cps. The solution viscosities, in 90 weight percent toluene, of the preferred A-B-A elastomers useful in the elastomer component of the preferred gel are in the range of about 2,000 cps to about 20,000 cps. Thus, the preferred elastomer component of the preferred gel material has a very high to ultra high molecular weight.

Applicant has discovered that, after surpassing a certain optimum molecular weight range, some elastomers exhibit lower tensile strength than similar materials with optimum molecular weight copolymers. Thus, merely increasing the molecular weight of the elastomer will not always result in increased tensile strength.

The elastomeric B portion of the preferred A-B-A polymers has an exceptional affinity for most plasticizing agents, including but not limited to several types of oils, resins, and others. When the network of A-B-A molecules is denatured, plasticizers which have an affinity for the B block can readily associate with the B blocks. Upon renaturation of the network of A-B-A molecules, the plasticizer remains highly associated with the B portions, reducing or even eliminating plasticizer bleed from the material when compared with similar materials in the prior art, even at very high oil:elastomer ratios. The reason for this performance may be any of the plasticization theories explained above (i.e., lubricity theory, gel theory, mechanistic theory, and free volume theory).

The elastomer used in the preferred gel cushioning medium is preferably an ultra high molecular weight polystyrene-hydrogenated poly(isoprene+butadiene)-polystyrene, such as those sold under the brand names SEPTON 4045, SEPTON 4055 and SEPTON 4077 by Kuraray, an ultra high molecular weight polystyrene-hydrogenated polyisoprene-polystyrene such as the elastomers made by Kuraray and sold as SEPTON 2005 and SEPTON 2006, or an ultra high molecular weight polystyrene-hydrogenated polybutadiene-polystyrene, such as that sold as SEPTON 8006 by Kuraray. High to very high molecular weight polystyrene-hydrogenated poly(isoprene+butadiene)-polystyrene elastomers, such as that sold under the trade name SEPTON 4033 by Kuraray, are also useful in some formulations of the preferred gel material because they are easier to process than the preferred ultra high molecular weight elastomers due to their effect on the melt viscosity of the material.

Following hydrogenation of the midblocks of each of SEPTON 4033, SEPTON 4045, SEPTON 4055, and SEPTON 4077, less than about five percent of the double bonds remain. Thus, substantially all of the double bonds are removed from the midblock by hydrogenation.

Applicant's most preferred elastomer for use in the preferred gel is SEPTON 4055 or another material that has similar chemical and physical characteristics. SEPTON 4055 has the optimum molecular weight (approximately 300,000, as determined by Applicant's gel permeation chromatography testing). SEPTON 4077 has a somewhat higher molecular weight, and SEPTON 4045 has a somewhat lower molecular weight than SEPTON 4055. Materials which include either SEPTON 4045 or SEPTON 4077 as the primary block copolymer typically have lower tensile strength than similar materials made with SEPTON 4055.

Kuraray Co. Ltd. of Tokyo, Japan has stated that the solution viscosity of SEPTON 4055, the most preferred A-B-A triblock copolymer for use in the preferred gel material, 10% solids in 90% toluene at 25° C., is about 5,800 cps. Kuraray also said that the solution viscosity of SEPTON 4055, 5% solids in 95% toluene at 25° C., is about 90 cps. Although Kuraray has not provided a solution viscosity, 20% solids in 80% toluene at 25° C., an extrapolation of the two data points given shows that such a solution viscosity would be about 400,000 cps. Applicant reads the prior art as consistently teaching away from such high solution viscosities.

Applicant confirmed Kuraray's data by having an independent laboratory, SGS U.S. Testing Company Inc. of Fairfield, N.J., test the solution viscosity of SEPTON 4055. When SGS attempted to dissolve 20% solids in 80% toluene at 25° C., the resulting material did not resemble a solution. Therefore, SGS determined the solution viscosity of SEPTON 4055 using 10% solids in 90% toluene at 25° C., which resulted in a 3,040 cps solution.

Other materials with chemical and physical characteristics similar to those of SEPTON 4055 include other A-B-A triblock copolymers which have a hydrogenated midblock polymer that is made up of at least about 30% isoprene monomers and at least about 30% butadiene monomers, the percentages being based on the total number of monomers that make up the midblock polymer. Similarly, other A-B-A triblock copolymers which have a hydrogenated midblock polymer that is made up of at least about 30% ethylene/propylene monomers and at least about 30% ethylene/butylene monomers, the percentages being based on the total number of monomers that make up the midblock polymer, are materials with chemical and physical characteristics similar to those of SEPTON 4055.

Mixtures of block copolymer elastomers are also useful as the elastomer component of some of the formulations of the preferred gel cushioning medium. In such mixtures, each type of block copolymer contributes different properties to the material. For example, high strength triblock copolymer elastomers are desired to improve the tensile strength and durability of a material. However, some high strength triblock copolymers are very difficult to process with some plasticizers. Thus, in such a case, block copolymer elastomers which improve the processability of the materials are desirable.

In particular, the process of compounding SEPTON 4055 with plasticizers may be improved via a lower melt viscosity by using a small amount of more flowable elastomer such as SEPTON 8006, SEPTON 2005, SEPTON 2006, or SEPTON 4033, to name only a few, without significantly changing the physical characteristics of the material.

In a second example of the usefulness of block copolymer elastomer mixtures in the preferred gel materials, many block copolymers are not good compatibilizers. Other block copolymers readily form compatible mixtures, but have other undesirable properties. Thus, the use of small amount of elastomers which improve the uniformity with which a material mixes are desired. KRATON® G 1701, manufactured by Shell Chemical Company of Houston, Tex., is one such elastomer that improves the uniformity with which the components of the preferred gel material mix.

Many other elastomers, including but not limited to triblock copolymers and diblock copolymers are also useful in the preferred gel material. Applicant believes that elastomers having a significantly higher molecular weight than the ultra-high molecular weight elastomers useful in the preferred gel material increase the softness thereof, but decrease the strength of the gel. Thus, high to ultra high molecular weight elastomers, as defined above, are desired for use in the preferred gel material due to the strength of such elastomers when combined with a plasticizer.

b. Additives i. Polarizable Plasticizer Bleed-Reducing Additives

Preferably, the gel materials used in the cushions of the present invention do not exhibit migration of plasticizers, even when placed against materials which readily exhibit a high degree of capillary action, such as paper, at room temperature.

A preferred plasticizer bleed-reducing additive that is useful in the preferred gel cushioning material includes hydrocarbon chains with readily polarizable groups thereon. Such polarizable groups include, without limitation, halogenated hydrocarbon groups, halogens, nitrites, and others. Applicant believes that the polarizability of such groups on the hydrocarbon molecule of the bleed-reducing additive have a tendency to form weak van der Waals bonding with the long hydrocarbon chains of the rubber portion of an elastomer and with the plasticizer molecules. Due to the great length of typical rubber polymers, several of the bleed-reducers will be attracted thereto, while fewer will be attracted to each plasticizer molecule. The bleed-reducing additives are believed to hold the plasticizer molecules and the elastomer molecules thereto, facilitating attraction between the elastomeric block and the plasticizer molecule. In other words, the preferred bleed-reducing additives are believed to attract a plasticizer molecule at one polarizable site, while attracting an elastomeric block at another polarizable site, thus maintaining the association of the palsticizer molecules with the elastomer molecules, which inhibits exudation of the plasticizer molecules from the elastomer-plasticizer compound. Thus, each of the plasticizer molecules is preferably attracted to an elastomeric block by means of a bleed-reducing additive.

The preferred bleed-reducing additives that are useful in the preferred gel material have a plurality of polarizable groups thereon, which facilitate bonding an additive molecule to a plurality of elastomer molecules and/or plasticizer molecules. It is believed that an additive molecule with more polarizable sites thereon will bond to more plasticizer molecules. Preferably, the additive molecules remain in a liquid or a solid state during processing of the gel material.

The most preferred bleed-reducing additives for use in the preferred gel material are halogenated hydrocarbon additives such as those sold under the trade name DYNAMAR™ PPA-791, DYNAMAR™ PPA-790, DYNAMAR™ FX-9613, and FLUORAD® FC 10 Fluorochemical Alcohol, each by 3M Company of St. Paul, Minn. Other additives are also useful to reduce plasticizer exudation from the preferred gel material. Such additives include, without limitation, other halogenated hydrocarbons sold under the trade name FLUORAD®, including without limitation FC-129, FC-135, FC-430, FC-722, FC-724, FC-740, FX-8, FX-13, FX-14 and FX-189; halogentated hydrocarbons such as those sold under the trade name ZONYL®, including without limitation FSN 100, FSO 100, PFBE, 8857A, ™, BA-L, BA-N, TBC and FTS, each of which are manufactured by du Pont of Wilmington, Del.; halogenated hydrocarbons sold under the trade name EMCOL by Witco Corp of Houston, Tex., including without limitation 4500 and DOSS; other halogenated hydrocarbons sold by 3M under the trade name DYNAMAR™; chlorinated polyethylene elastomer (CPE), distributed by Harwick, Inc. of Akron, Ohio; chlorinated paraffin wax, distributed by Harwick, Inc.; and others.

ii. Detackifiers

The preferred material may include a detackifier. Tack is not a desirable feature in many potential uses for the cushions of the invention. However, some of the elastomeric copolymers and plasticizers useful in the preferred cushioning media for the cushioning elements of the present invention may impart tack to the media.

Soaps, detergents and other surfactants have detackifying abilities and are useful in the preferred gel material. "Surfactants," as defined herein, refers to soluble surface active agents which contain groups that have opposite polarity and solubilizing tendencies. Surfactants form a monolayer at interfaces between hydrophobic and hydrophilic phases; when not located at a phase interface, surfactants form micelles. Surfactants have detergency, foaming, wetting, emulsifying and dispersing properties. Sharp, D. W. A., *DICTIONARY OF CHEMISTRY*, 381–82 (Penguin, 1990). For example, coco diethanolamide, a common ingredient in shampoos, is useful in the preferred gel material as a detackifying agent. Coco diethanolamide resists evaporation, is stable, relatively non-toxic, non-flammable and does not support microbial growth. Many different soap or detergent compositions could be used in the material as well.

Other known detackifiers include glycerin, epoxidized soybean oil, dimethicone, tributyl phosphate, block copolymer polyether, diethylene glycol mono oleate, tetraethyleneglycol dimethyl ether, and silicone, to name only a few. Glycerine is available from a wide variety of sources. Witco Corp. of Greenwich, Connecticut sells epoxidized soybean oil as DRAPEX 6.8. Dimethicone is available from a variety of vendors, including GE Specialty Chemicals of Parkersburg, W.Va. under the trade name GE SF 96-350. C. P. Hall Co. of Chicago, Ill. markets block copolymer polyether as PLURONIC L-61. C. P. Hall Co. also manufactures and markets diethylene glycol mono oleate under the name Diglycol Oleate— Hallco CPH-I-SE. Other emulsifiers and dispersants are also useful in the preferred gel material. Tetraethyleneglycol dimethyl ether is available under the trade name TETRAGLYME from Ferro Corporation of Zachary, La. Applicant believes that TETRAGLYME also reduces plasticizer exudation from the preferred gel material.

iii. Antioxidants

The preferred gel material also includes additives such as an antioxidant. Antioxidants such as those sold under the trade names IRGANOX® 1010 and IRGAFOS® 168 by Ciba-Geigy Corp. of Tarrytown, N.Y. are useful by themselves or in combination with other antioxidants in the preferred materials of the present invention.

Antioxidants protect the preferred gel materials against thermal degradation during processing, which requires or generates heat. In addition, antioxidants provide long term protection from free radicals. A preferred antioxidant inhibits thermo-oxidative degradation of the compound or material to which it is added, providing long term resistance to polymer degradation. Preferably, an antioxidant added to the preferred gel cushioning medium is useful in food packaging applications, subject to the provisions of 21 C.F.R. § 178.2010 and other laws.

Heat, light (in the form of high energy radiation), mechanical stress, catalyst residues, and reaction of a material with impurities all cause oxidation of the material. In the process of oxidation, highly reactive molecules known as free radicals are formed and react in the presence of oxygen to form peroxy free radicals, which further react with organic material (hydro-carbon molecules) to form hydroperoxides.

The two major classes of antioxidants are the primary antioxidants and the secondary antioxidants. Peroxy free radicals are more likely to react with primary antioxidants than with most other hydrocarbons. In the absence of a primary antioxidant, a peroxy free radical would break a hydrocarbon chain. Thus, primary antioxidants deactivate a peroxy free radical before it has a chance to attack and oxidize an organic material.

Most primary antioxidants are known as sterically hindered phenols. One example of sterically hindered phenol is the $C_{73}H_{108}O_{12}$ marketed by Ciba-Geigy as IRGANOX® 1010, which has the chemical name 3,5-bis(1,1-dimethylethyl)-4-hydroxybenzenepropanoic acid, 2,2-bis[[3-[3,5-bis(dimethylethyl)4-hydroxyphenyl]-1-oxopropoxy]methyl]1,3-propanediyl ester. The FDA refers to IRGANOX® 1010 as tetrakis[methylene(3,5-di-tert-butyl-4-hydroxyhydrocinnimate)]methane. Other hindered phenols are also useful as primary antioxidants in the preferred material.

Similarly, secondary antioxidants react more rapidly with hydroperoxides than most other hydrocarbon molecules. Secondary antioxidants have been referred to as hyperoxide decomposers. Thus, secondary antioxidants protect organic materials from oxidative degradation by hydroperoxides.

Commonly used secondary antioxidants include the chemical classes of phosphites/phosphonites and thioesters, many of which are useful in the preferred gel material. The hydroperoxide decomposer used by Applicant is a $C_{42}H_{63}O_3P$ phosphite known as Tris(2,4-di-tert-butylphenyl)phosphite and marketed by Ciba-Geigy as IRGAFOS® 168.

It is known in the art that primary and secondary antioxidants form synergistic combinations to ward off attacks from both peroxy free radicals and hydroperoxides.

Other antioxidants, including but not limited to multifunctional antioxidants, are also useful in the preferred material. Multifunctional antioxidants have the reactivity of both a primary and a secondary antioxidant. IRGANOX® 1520 D, manufactured by Ciba-Geigy is one example of a multifunctional antioxidant. Vitamin E antioxidants, such as that sold by Ciba-Geigy as IRGANOX® E17, are also useful in the preferred cushioning material for use in the cushions of the present invention.

Preferably, the preferred gel material includes up to about three weight percent antioxidant, based on the weight of the elastomer component, when only one type of antioxidant is used. The material may include as little as 0.1 weight percent of an antioxidant, or no antioxidant at all. When a combination of antioxidants is used, each may comprise up to about three weight percent, based on the weight of the elastomer component. Additional antioxidants may be added for severe processing conditions involving excessive heat or long duration at a high temperature.

Applicant believes that the use of excess antioxidants reduces or eliminates tack on the exterior surface of the preferred gel material. Excess antioxidants appear to migrate to the exterior surface of the material following compounding of the material. Such apparent migration occurs over substantial periods of time, from hours to days or even longer.

iv. Flame retardants

Flame retardants may also be added to the preferred gel materials. Flame retardants useful in the cushioning elements of the present invention include but are not limited to diatomaceous earth flame retardants sold as GREAT LAKES DE 83R and GREAT LAKES DE 79 by Great Lakes Filter, Division of Acme Mills Co. of Detroit, Mich. Most flame retardants that are useful in elastomeric materials are also useful in the preferred gel material. In particular, Applicant prefers the use of food grade flame retardants which do not significantly diminish the physical properties of the preferred gel material.

Chemical blowing agents, such as SAFOAM® FP-40, manufactured by Reedy International Corporation of Keyport, N.J. and others are useful for making a gel cushioning medium that is self-extinguishing.

v. Colorants

Colorants may also be used in the preferred gel materials for use in the cushions of the present invention. Any colorant which is compatible with elastomeric materials may be used in the materials. In particular, Applicant prefers to use aluminum lake colorants such as those manufactured by Warner Jenkinson Corp. of St. Louis, Mo.; pigments manufactured by Day Glo Color Corp. of Cleveland, Ohio; Lamp Black, such as that sold by Spectrum Chemical Manufacturing Corp. of Gardena, Calif.; and Titanium Dioxide (white). By using these colorants, the gel material takes on intense shades of colors, including but not limited to pink, red, orange, yellow, green, blue, violet, brown, flesh, white and black.

vi. Paint

The preferred gel cushioning medium may also be painted.

vii. Other additives

Other additives may also be added to the preferred gel material. Additives such as foaming facilitators, tack modifiers, plasticizer bleed modifiers, flame retardants, melt viscosity modifiers, melt temperature modifiers, tensile strength modifiers, and shrinkage inhibitors are useful in specific formulations of the preferred gel material.

Melt temperature modifiers useful in the preferred gel include cross-linking agents, hydrocarbon resins, diblock copolymers of the general configuration A-B and triblock copolymers of the general configuration A-B-A wherein the end block A polymers include functionalized styrene monomers, and others.

Tack modifiers which tend to reduce tack and which are useful in the preferred gel include surfactants, dispersants, emulsifiers, and others. Tack modifiers which tend to increase the tack of the material and which are useful in the material include hydrocarbon resins, polyisobutylene, butyl rubber and others.

Foam facilitators that are useful in the gel material include polyisobutylene, butyl rubber, surfactants, emulsifiers, dispersants and others.

Plasticizer bleed modifiers which tend to reduce plasticizer exudation from the preferred material and which are useful therein include hydrocarbon resins, elastomeric diblock copolymers, polyisobutylene, butyl rubber, transpolyoctenylene rubber ("tor rubber"), and others.

Flame retardants useful in the preferred gel include halogenated flame retardants, non-halogenated flame retardants, and volatile, non-oxygen gas forming chemicals and compounds.

Melt viscosity modifiers that tend to reduce the melt viscosity of the pre-compounded component mixture of the preferred cushioning medium include hydrocarbon resins, transpolyoctenylene rubber, castor oil, linseed oil, non-ultra high molecular weight thermoplastic rubbers, surfactants, dispersants, emulsifiers, and others.

Melt viscosity modifiers that tend to increase the melt viscosity of the pre-compounded component mixture of the preferred gel material include hydrocarbon resins, butyl rubber, polyisobutylene, additional triblock copolymers having the general configuration A-B-A and a molecular weight greater than that of each of the block copolymers in the elastomeric block copolymer component of the material, particulate fillers, microspheres, butadiene rubber, ethylene/propylene rubber, ethylene/butylene rubber, and others.

Tensile strength modifiers which tend to increase the tensile strength of the preferred gel material for use in the cushions of the present invention include mid block B-associating hydrocarbon resins, non-end-block solvating hydrocarbon resins which associate with the end blocks, particulate reinforcers, and others.

Shrinkage inhibitors, which tend to reduce shrinkage of the gel material following compounding, that are useful in the material include hydrocarbon resins, particulate fillers, microspheres, transpolyoctenylene rubber, and others.

c. Microspheres

Microspheres may also be added to the preferred gel material. The gel material may contain up to about 90% microspheres, by volume. In one preferred microsphere-containing formulation of the preferred gel material, microspheres make up at least about 30% of the total volume of the material. A second preferred microsphere-containing formulation of the preferred gel cushioning medium includes at least about 50% microspheres, by volume.

Different types of microspheres contribute various properties to the material. For example, hollow acrylic microspheres, such as those marketed under the brand name MICROPEARL, and generally in the 20 to 200 micron size range, by Matsumoto Yushi-Seiyaku Co., Ltd. of Osaka, Japan, lower the specific gravity of the material. In other formulations of the gel, the microspheres may be unexpanded DU(091-80), which expand during processing of the preferred gel cushioning medium, or pre-expanded DE (091-80) acrylic microspheres from Expancel Inc. of Duluth, Ga.

In formulations of the preferred material which include hollow acrylic microspheres, the microspheres preferably have substantially instantaneous rebound when subjected to a compression force which compresses the microspheres to a thickness of up to about 50% of their original diameter or less.

Hollow microspheres also decrease the specific gravity of the gel material by creating gas pockets therein. In many cushioning applications, very low specific gravities are preferred. The specific gravity of the preferred gel cushioning medium may range from about 0.06 to about 1.30, depending in part upon the amount and specific gravity of fillers and additives, including microspheres and foaming agents. In many cushioning applications of the present invention, a gel material having a specific gravity of less than about 0.50 is preferred. When a gel material preferred for use in cushions according to the present invention includes the preferred microspheres, the microspheres must be dispersed, on average, at a distance of about one-and-a-half (1.5) times the average microsphere diameter or a lesser distance from one another in order to achieve a specific gravity of less than about 0.50. A specific gravity of less than about 0.30 is preferred for use in some cushions according to this invention. Other formulations of the preferred gel material have specific gravities of less than about 0.65, less than about 0.45, and less than about 0.25.

MICROPEARL and EXPANCEL acrylic microspheres are preferred because of their highly flexible nature, as explained above, which tend to not restrict deformation of the thermoplastic elastomer. Glass, ceramic, and other types of microspheres may also be used in the thermoplastic gel material, but are less preferred.

d. Plasticizer Component

As explained above, plasticizers allow the midblocks of a network of triblock copolymer molecules to move past one another. Thus, Applicant believes that plasticizers, when trapped within the three dimensional web of triblock copolymer molecules, facilitate the disentanglement and elongation of the elastomeric midblocks as a load is placed on the network. Similarly, Applicant believes that plasticizers facilitate recontraction of the elastomeric midblocks following release of the load. The plasticizer component of the preferred gel cushioning medium may include oil, resin, a mixture of oils, a mixture of resins, other lubricating materials, or any combination of the foregoing.

i. Oils

The plasticizer component of the preferred gel material may include a commercially available oil or mixture of oils. The plasticizer component may include other plasticizing agents, such as liquid oligomers and others, as well. Both naturally derived and synthetic oils are useful in the preferred gel material. Preferably, the oils have a viscosity of about 70 SUS to about 500 SUS at about 100° F. Most preferred for use in the gel material are paraffinic white mineral oils having a viscosity in the range of about 90 SUS to about 200 SUS at about 100° F.

One embodiment of a plasticizer component of the preferred gel includes paraffinic white mineral oils, such as those having the brand name DUOPRIME, by Lyondell Lubricants of Houston, Tex., and the oils sold under the brand name TUFFLO by Witco Corporation of Petrolia, Pa. For example, the plasticizer component of the preferred gel may include paraffinic white mineral oil such as that sold under the trade name LP-150 by Witco.

Paraffinic white mineral oils having an average viscosity of about 90 SUS, such as DUOPRIME 90, are preferred for use in other embodiments of the plasticizer component of the preferred gel cushioning medium. Applicant has found that DUOPRIME 90 and oils with similar physical properties can be used to impart the greatest strength to the preferred gel material.

Other oils are also useful as plasticizers in compounding the gel material. Examples of representative commercially available oils include processing oils such as paraffinic and naphthenic petroleum oils, highly refined aromatic-free or low aromaticity paraffinic and naphthenic food and technical grade white petroleum mineral oils, and synthetic liquid oligomers of polybutene, polypropene, polyterpene, etc., and others. The synthetic series process oils are oligomers which are permanently fluid liquid non-olefins, isoparaffins or parafrins. Many such oils are known and commercially available. Examples of representative commercially available oils include Amoco® polybutenes, hydrogenated polybutenes and polybutenes with epoxide functionality at one end of the polybutene polymer. Examples of such Amoco polybutenes include: L-14 (320 $M_n$), L-50 (420 $M_n$), L-100 (460 $M_n$), H-15 (560 $M_n$), H-25 (610 $M_n$), H-35 (660 $M_n$), H-50 (750 $M_n$), H-100 (920 $M_n$), H-300 (1290 $M_n$), L-14E (27–37 cst @ 100° F. Viscosity), L-300E (635–690 cst @ 210° F. Viscosity), Actipol E6 (365 $M_n$), E16 (973 $M_n$), E23 (1433 $M_n$) and the like. Examples of various commercially available oils include: Bayol, Bernol, American, Blandol, Drakeol, Ervol, Gloria, Kaydol, Litetek, Marcol, Parol, Peneteck, Primol, Protol, Sontex, and the like.

ii. Resins

Resins useful in the plasticizer component of the preferred gel material include, but are not limited to, hydrocarbon-derived and rosin-derived resins having a ring and ball softening point of up to about 150° C., more preferably from about 0° C. to about 25° C., and a weight average molecular weight of at least about 300.

For use in many of the cushions according to the invention, Applicant prefers the use of resins or resin mixtures which are highly viscous flowable liquids at room temperature (about 23° C.). Plasticizers which are fluid at room temperature impart softness to the gel material. Although room temperature flowable resins are preferred, resins which are not flowable liquids at room temperature are also useful in the material.

The resins most preferred for use in the preferred gel material have a ring and ball softening point of about 18° C.; melt viscosities of about 10 poises (ps) at about 61° C., about 100 ps at about 42° C. and about 1,000 ps at about 32° C.; an onset $T_g$ of about –20° C.; a M value of about 68° C.; a DACP value of 15° C.; an OMSCP value of less than 40° C.; a $M_n$ of about 385; a $M_w$ of about 421; and a $M_z$ of about 463. One such resin is marketed as REGALREZ® 1018 by Hercules Incorporated of Wilmington, Del. Variations of REGALREZ® 1018 which are useful in the preferred cushioning material have viscosities including, but not limited to, 1025 stokes, 1018 stokes, 745 stokes, 114 stokes, and others.

Room temperature flowable resins that are derived from poly-β-pinene and have softenening points similar to that of REGALREZ® 1018 are also useful in the plasticizer component of the preferred cushioning medium. One such resin, sold as PICCOLYTE® S25 by Hercules Incorporated, has a softening point of about 25° C.; melt viscosities of about 10 ps at about 80° C., about 100 ps at about 56° C. and about 1,000 ps at about 41° C.; a MMAP value of about 88° C.; a DACP value of about 45° C.; an OMSCP value of less than about –50° C.; a $M_z$ of about 4,800; a $M_w$ of about 1,950; and a $M_n$ of about 650. Other PICCOLYTE® resins may also be used in the preferred gel material.

Another room temperature flowable resin which is useful in the plasticizer component of the preferred material is marketed as ADTAC® LV by Hercules Incorporated. That resin has a ring and ball softening point of about 5° C.; melt viscosities of about 10 ps at about 62° C., about 100 ps at about 36° C. and about 1,000 ps at about 20° C.; a MMAP value of about 93° C.; a DACP value of about 44° C.; an OMSCP value of less than about –40° C.; a $M_z$ of about 2,600; a $M_w$ of about 1,380; and a $M_n$ of about 800.

Resins such as the liquid aliphatic C-5 petroleum hydrocarbon resin sold as WINGTACK® 10 by the Goodyear Tire & Rubber Company of Akron, Ohio and other WINGTACK® resins are also useful in the gel material. WINGTACK® 10 has a ring and ball softening point of about 10° C.; a Brookfield Viscosity of about 30,000 cps at about 25° C.; melt viscosities of about 10 ps at about 53° C. and about 100 ps at about 34° C.; an onset $T_g$ of about –37.7° C.; a $M_n$ of about 660; a $M_w$ of about 800; a 1:1 polyethylene-to-resin ratio cloud point of about 89° C.; a 1:1 microcrystalline wax-to-resin ratio cloud point of about 77° C.; and a 1:1 paraffin wax-to-resin ratio cloud point of about 64° C.

Resins that are not readily flowable at room temperature (i.e., are solid, semi-solid, or have an extremely high viscosity) or that are solid at room temperature are also useful in the preferred gel material. One such solid resin is an aliphatic C-5 petroleum hydrocarbon resin having a ring and ball softening point of about 98° C.; melt viscosities of about 100 ps at about 156° C. and about 1000 ps at about 109° C.; an onset $T_g$ of about 46.1° C.; a $M_n$ of about 1,130; a $M_w$ of about 1,800; a 1:1 polyethylene-to-resin ratio cloud point of about 90° C.; a 1:1 microcrystalline wax-to-resin ratio cloud point of about 77° C.; and a 1:1 paraffin wax-to-resin ratio cloud point of about 64° C. Such a resin is available as WINGTACK® 95 and is manufactured by Goodyear Chemical Co.

Polyisobutylene polymers are an example of resins which are not readily flowable at room temperature and that are useful in the preferred gel material. One such resin, sold as VISTANEX® LM-MS by Exxon Chemical Company of Houston, Texas, has a $T_g$ of –60° C., a Brookfield Viscosity of about 250 cps to about 350 cps at about 350° F., a Flory molecular weight in the range of about 42,600 to about 46,100, and a Staudinger molecular weight in the range of about 10,400 to about 10,900. The Flory and Staudinger methods for determining molecular weight are based on the intrinsic viscosity of a material dissolved in diisobutylene at 20° C.

Glycerol esters of polymerized rosin are also useful as plasticizers in the preferred gel material. One such ester, manufactured and sold by Hercules Incorporated as HERCULES® Ester Gum 10D Synthetic Resin, has a softening point of about 116° C.

Many other resins are also suitable for use in the gel material. In general, plasticizing resins are preferred which are compatible with the B block of the elastomer used in the material, and non-compatible with the A blocks.

In some embodiments of the cushion according to the present invention, tacky materials may be desirable. In such embodiments, the plasticizer component of the gel material may include about 20 weight percent or more, about 40 weight percent or more, about 60 weight percent or more, or up to about 100 weight percent, based upon the weight of the plasticizer component, of a tackifier or tackifier mixture.

iii. Plasticizer Mixtures

The use of plasticizer mixtures in the plasticizer component of the preferred gel material is useful for tailoring the physical characteristics of the preferred gel material. For example, characteristics such as durometer, tack, tensile strength, elongation, melt flow and others may be modified by combining various plasticizers.

For example, a plasticizer mixture which includes at least about 37.5 weight percent of a paraffinic white mineral oil having physical characteristics similar to those of LP-150 (a viscosity of about 150 SUS at about 100° F., a viscosity of about 30 centistokes (cSt) at about 40° C., and maximum pour point of about −35° F.) and up to about 62.5 weight percent of a resin having physical characteristics similar to those of REGALREZ® 1018 (such as a softening point of about 20° C.; an onset $T_g$ of about −20° C.; a MMAP value of about 70° C.; a DACP value of about 15° C.; an OMSCP value of less than about 40° C.; and $M_w$ of about 400), all weight percentages being based upon the total weight of the plasticizer mixture, could be used in a gel cushioning medium. When compared to a material plasticized with the same amount of an oil such as LP-150, the material which includes the plasticizer mixture has decreased oil bleed and increased tack.

Applicant believes that, when resin is included with oil in a plasticizer mixture of the preferred gel for use in cushions according to the present invention, the material exhibits reduced oil bleed. For example, a formulation of the material which includes a plasticizing component which has about three parts plasticizing oil (such as LP-150), and about five parts plasticizing resin (such as REGALREZ® 1018) exhibits infinitesimal oil bleed at room temperature, if any, even when placed against materials with high capillary action, such as paper. Prior art thermoplastic elastomers bleed noticeably under these circumstances.

The plasticizer:block copolymer elastomer ratio, by total combined weight of the plasticizer component and the block copolymer elastomer component, of the preferred gel cushioning material for use in the cushions of the present invention ranges from as low as about 1:1 or less to higher than about 25:1. In applications where plasticizer bleed is acceptable, the ratio may as high as about 100:1 or more. Especially preferred are plasticizer:block copolymer ratios in the range of about 2.5:1 to about 8:1. A preferred ratio, such as 5:1 provides the desired amounts of rigidity, elasticity and strength for many typical applications. Another preferred plasticizer to block copolymer elastomer ratio of the preferred gel material is 2.5:1, which has an unexpectedly high amount of strength and elongation.

4. Compounding Methods

As used herein, the term "liquification" refers to the placement of the block copolymer elastomer and plasticizer components of the preferred gel cushioning medium in a liquid state, such as a molten state or a dissolved state.

a. Melt Blending

A preferred method for manufacturing the preferred gel material includes mixing the plasticizer, block copolymer elastomer and any additives and/or fillers (e.g., microspheres), heating the mixture to melting while agitating the mixture, and cooling the compound. This process is referred to as "melt blending."

Excessive heat is known to cause the degradation of the elastomeric B portion of A-B-A and A-B block copolymers which are the preferred elastomer component of the preferred gel material for use in the cushions of the present invention. Similarly, maintaining block copolymers at increased temperatures over prolonged periods of time often results in the degradation of the elastomeric B portion of A-B-A and A-B block copolymers. As the B molecules of an A-B-A triblock copolymer break, the triblock is separated into two diblock copolymers having the general configuration A-B. While it is believed by some in the art that the presence of A-B diblock copolymers in oil-containing plasticizer-extended A-B-A triblock copolymers reduces plasticizer bleed-out, high amounts of A-B copolymers significantly reduce the strength of the preferred gel material. Thus, Applicant believes that it is important to minimize the compounding temperatures and the amount of time to which the material is exposed to heat.

The plasticizers, any additives and/or fillers, and the A-B-A copolymers are premixed. Preferably, if possible, hydrophobic additives are dissolved into the plasticizer prior to adding the plasticizer component to the elastomer component. If possible, hydrophilic additives and particulate additives are preferably emulsified or mixed into the plasticizer of a preferred gel material prior to adding the elastomer components. The mixture is then quickly heated to melting. Preferably, the temperature of the mixture does not exceed the volatilization temperature of any component. For some of the preferred gel materials, Applicant prefers temperatures in the range of about 270° F. to about 290° F. For other gel materials, Applicant prefers temperatures in the range of about 360° F. to about 400° F. A melting time of about ten minutes or less is preferred. A melting time of about five minutes or less is more preferred. Even more preferred are melting times of about ninety seconds or less. Stirring, agitation, or, most preferably, high shearing forces are preferred to create a homogeneous mixture. The mixture is then cast, extruded, injection molded, etc.

Next, the mixture is cooled. When injection molding equipment and cast molds are used, the mixture may be cooled by running coolant through the mold, by the thermal mass of the mold itself, by room temperature, by a combination of the above methods, or other methods. Extruded mixtures are cooled by air or by passing the extruded mixture through coolant. Cooling times of about five minutes or less are preferred. A cooling time of less than one minute is most preferred.

Use of high shear facilitates short heating times. "High shear", for purposes of this disclosure, is defined in terms of the length over diameter (L/D) ratio of a properly designed injection molding single screw or extruder single screw. L/D ratios of about 20:1 and higher create high shear. Twin screws, Banbury mixers and the like also create high shear. High shearing with heat mixes compounds at lower temperatures and faster rates than the use of heat alone or heat with relatively low-shear mixing. Thus, high shear forces expedite compounding of the mixture over a relatively short period of time by more readily forcing the molecules into close association with the B component of the A-B-A copolymer. Use of high shear also facilitates the decrease of equipment temperatures. Melt blending techniques which employ little or no shear require an external heat source. Thus, in order to avoid heat loss, the periphery of many types of melt blending equipment must be heated to a temperature higher than the melt temperature in order to transfer heat and melt a component mixture. In comparison, high shearing equipment can generate high material temperatures directly from the shear forces, substantially reducing or eliminating the need for external heating.

The inventor prefers the use of equipment that produces high shear, such as twin screw compounding extrusion machinery, to melt blend the preferred gel cushioning medium. Twin screw extruders such as the ZE25 TIEBAR AIR COOLED TWIN SCREW EXTRUDER, with a 35:1 L/D ratio, manufactured by Berstorff Corporation of Charlotte, N.C., are useful for compounding the preferred gel material. Twin screw compounding extrusion machinery is desired for compounding the preferred gel material since it generates a very high level of shear and because compounding and molding, casting, extrusion, or foaming are performed in one continuous process. Alternatively, the preferred thermoplastic elastomeric may be compounded first, then later formed into a finished product by injection molding, extrusion, or some other method.

It was mentioned above that microspheres may be added to the gel material to reduce its specific gravity and to increase its stiffness or durometer. Applicant has unexpectedly discovered that acrylic microspheres remain intact when subjected to the heat and shear of injection molding machines and extruders if the time at high temperature is kept to about five minutes or less.

Other equipment, such as batch mixers are also useful for melt blending the preferred gel materials for use in the cushions according to the present invention.

b. Solvent Blending

A second preferred method for making the preferred elastomeric compounds comprises dissolving the elastomeric component in a solvent, adding the plasticizer component and any additives and/or fillers, and removing the solvent from the mixture.

Aromatic hydrocarbon solvents such as toluene may be used for mixing the preferred gel compounds. Sufficient solvent is added to the elastomer component to dissolve the network of block copolymer molecules. Preferably, the amount of solvent is limited to an amount sufficient for dissolving the network of block copolymer molecules. The elastomers then dissolve in the solvent. Mixing is preferred since it speeds up the solvation process. Similarly, slightly elevating the mixture temperature is preferred since it speeds up the solvation process. Next, plasticizer, any additives and any fillers are mixed into the solvated elastomer. If possible, hydrophobic additives are preferably dissolved in the plasticizer prior to adding the plasticizer to the principle polymer, the block copolymer elastomer and the solvent. Preferably, if possible, hydrophilic additives and particulate additives are emulsified or mixed into the plasticizer prior to adding the elastomer components and solvent. The mixture is then cast into a desired shape (accounting for later shrinkage due to solvent loss) and the solvent is evaporated from the mixture.

Other methods of compounding the preferred materials, including but not limited to other processes for compounding, modifying and extending elastomeric materials, are also useful for compounding the preferred gel cushioning medium.

c. Foaming

The preferred gel material may be foamed. "Foaming", as defined herein, refers to processes which form gas bubbles or gas pockets in the material. A preferred foamed gel material that is useful in the cushions of this invention includes gas bubbles dispersed throughout the material. Both open cell and closed cell foaming are useful in the preferred gel material. Foaming decreases the specific gravity of the preferred material. In many cushioning applications, very low specific gravities are preferred. The specific gravity of the gel material may range, after foaming, from about 0.06 to about 1.30.

A preferred foamed formulation of the gel material includes at least about 10% gas bubbles or gas pockets, by volume of the material. More preferably, when the material is foamed, gas bubbles or gas pockets make up at least about 20% of the volume of the material. Other foamed formulations of the preferred gel material contain at least about 40% gas bubbles or gas pockets, by volume, and at least about 70% gas bubbles or pockets, by volume.

Various methods for foaming the preferred gel material include, but are not limited to, whipping or injecting air bubbles into the material while it is in a molten state, adding compressed gas or air to the material while it is in the molten state and under pressure, adding water to the material while it is in the molten state, use of sodium bicarbonate, and use of chemical blowing agents such as those marketed under the brand name SAFOAM(® by Reedy International Corporation of Keyport, N.J. and those manufactured by Boehringer Ingelheim of Ingelheim, Germany under the trade name HYDROCEROL®.

When blowing agents such as sodium bicarbonate and chemical blowing agents are used in the preferred gel material, the material temperature is preferably adjusted just prior to addition of the blowing agent so that the material temperature is just above the blowing temperature of the blowing agent. Following addition of the blowing agent to the material, the material is allowed to cool so that it will retain the gas bubbles or gas pockets formed by the release of gas from the blowing agent. Preferably, the material is quickly cooled to a temperature below its $T_g$. The material will retain more gas bubbles and the gas bubbles will be more consistently dispersed throughout the material the quicker the material temperature cools to a temperature below the $T_g$.

When a preferred gel material is injection molded in accordance with one preferred compounding method of the gel material, foaming is preferred just after the material has been injected into a mold. Thus, as the material passes through the injection molding machine nozzle, its temperature is preferably just higher than the blowing temperature of the blowing agent. Preferably, the material is then cooled to a temperature below its $T_g$.

Addition of polyisobutylene resin improves the ability of the preferred gel material to foam and retain cells during the foaming process. One such resin, known as VISTANEX® LM-MS, is manufactured by Exxon Chemical Company. Similarly, surfactants, dispersants and emulsifiers such as Laureth-23, available from Lonza of Fair Lawn, N.J. under the trade name ETHOSPERSE LA-23, and others may be used to facilitate foaming of the gel material. In formulations which include oil, certain foaming oils such as Hydraulic and Transmission Oil, such as that made by Spectrum Corp. of Selmer, Tenn., may also be used in the material to facilitate foaming of the materials.

Additives which modify the gas permeability of the preferred gel material are preferred when the material is foamed. One such material, manufactured by Rohm & Haas Company of Philadelphia, Pa. and marketed under the trade name PARALOID® K 400, modifies the gas permeability of the preferred gel material, facilitating the material's ability to hold gas bubbles.

When foaming is desired, additives which increase the melt viscosity or melt body of the material are also useful. One such additive, PARALOID® K 400, is believed to increase the melt viscosity of the material, making it more difficult for gas bubbles to escape from the material as it cools. Another additive, ACRYLOID® F-10, manufactured by Rohm & Haas, is also believed to improve the ability of the material to entrap bubbles.

Another additive, ethylene vinyl acetate (EVA) crosslinks with itself and/or other molecules to increase the internal structure of the material, while reducing the material's melt viscosity. Thus, EVA is also believed to improve the gas bubble retention of the material. EVA is available from a variety of sources. High viscosity plasticizers, including without limitation DUOPRIME 500, are also believed to facilitate gas bubble retention.

Additives which act as nucleating agents are also useful for foaming the preferred gel material. Such additives are helpful in initiating the formation of gas bubbles. Applicant believes that antioxidants, including but not limited to IRGANOX® 1010 and IRGAFOS® 168, act as nucleating agents during foaming of the material. Blowing agents such as those sold under the trade name SAFOAM® by Reedy International are also believed to have a secondary function as nucleating agents. Examples of other nucleating agents include talc, carbon black, aluminum stearate, hydrated alumina, titanium dioxide, aluminum lake colorants, and others.

Figure 40A:
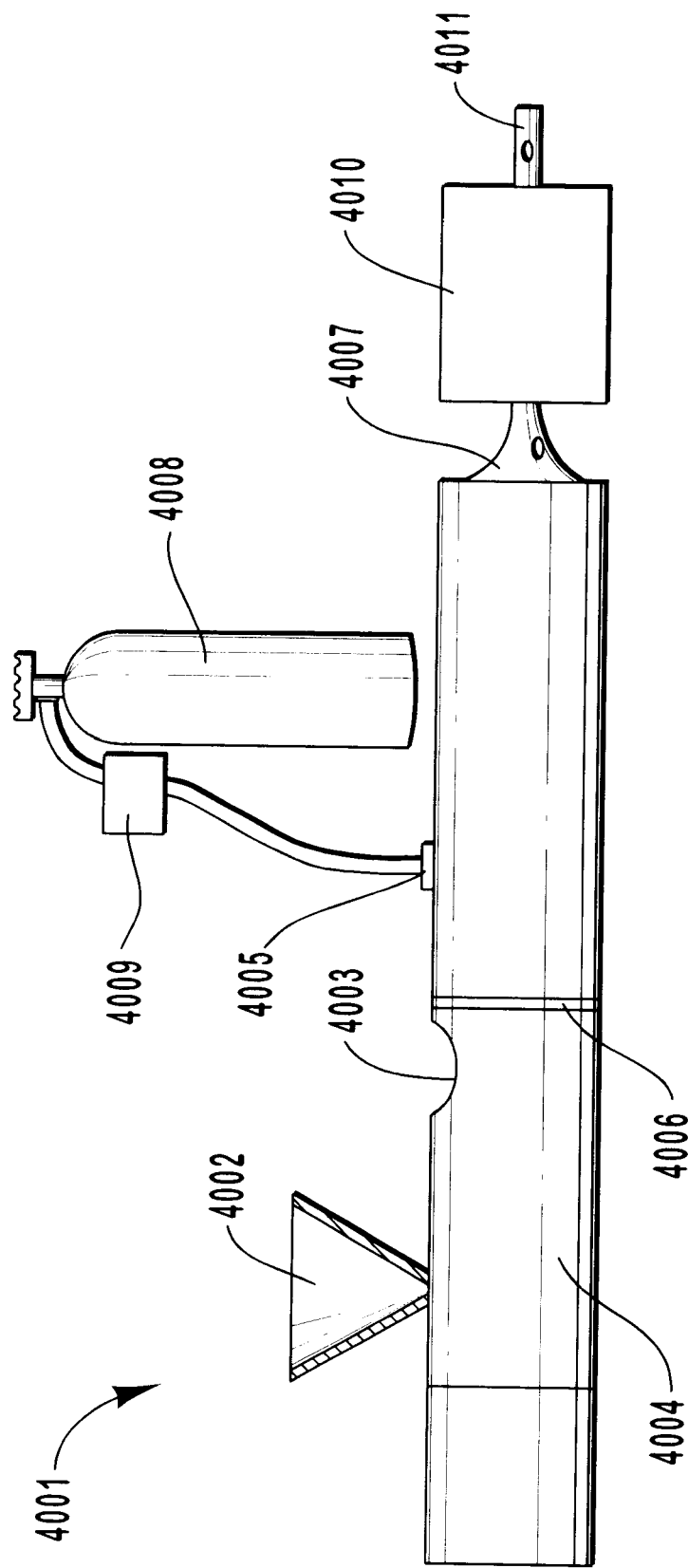
FIG. 40a depicts the use of an extruder to perform a preferred method for foaming the preferred gel cushioning media.
Figure 40B:
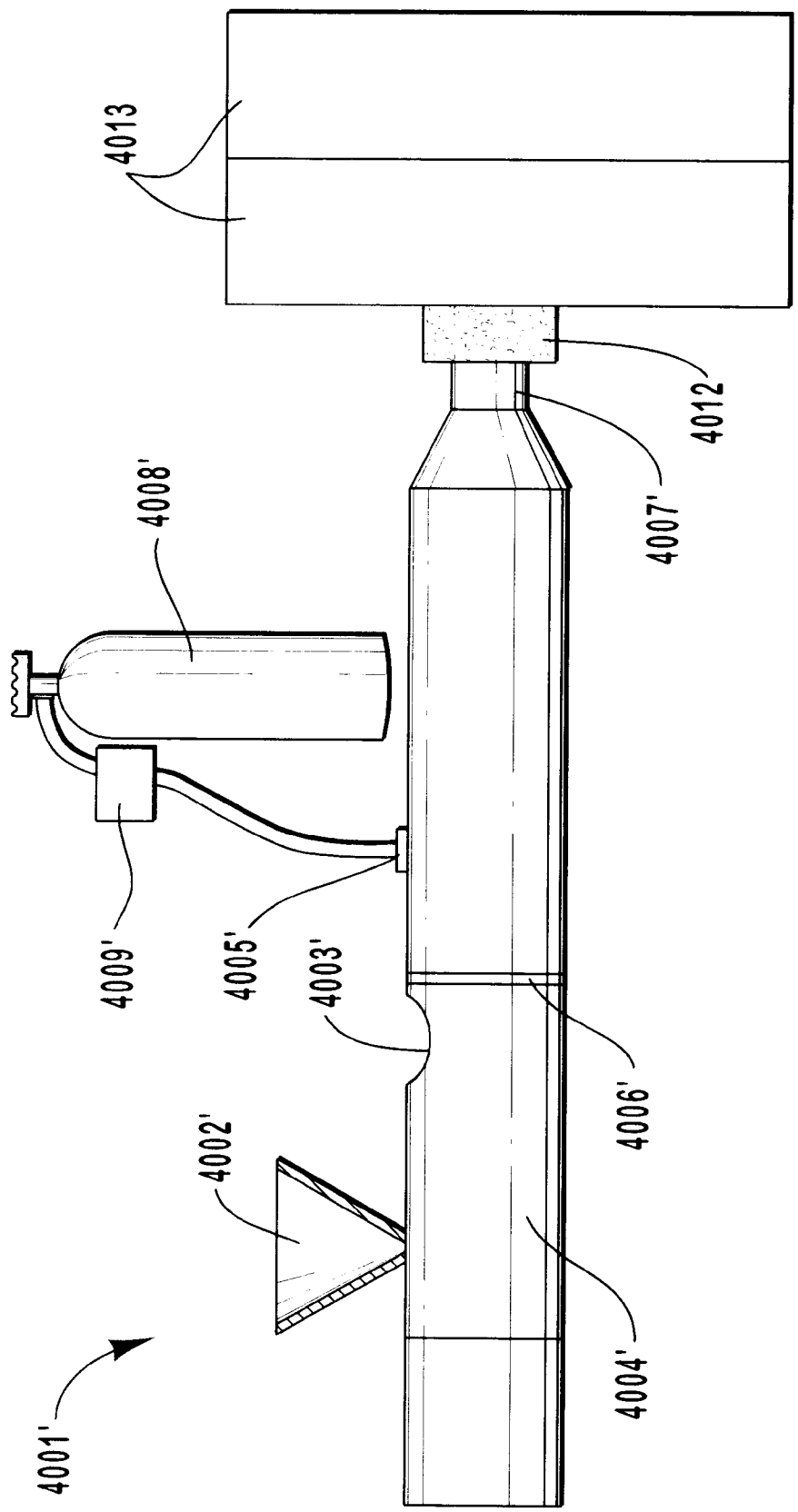
FIG. 40b depicts the use of an injection molding machine to perform a preferred method for foaming the preferred gel cushioning media.

Referring now to FIGS. 40*a* and 40*b*, a preferred embodiment of a method for foaming the preferred gel cushioning material is shown. FIG. 40*a* illustrates the preferred embodiment of the foaming method using an extruder 4001. FIG. 10*b* shows the preferred embodiment of the foaming method in an injection molding machine 4001'. Preferably, the gel cushioning medium includes a blowing agent such as SAFOAM® FP-40, which is added to the non-liquid components of the cushioning medium prior to processing. About half of the plasticizer component is then added to the non-liquid components, which are then fed into extruder 4001 or injection molding machine 4001'. The remaining plasticizer is added to the mixture at 4003, 4003' as the mixture moves along the barrel 4004, 4004', which houses the screw or screws. Pressurized carbon dioxide ($CO_2$), which is contained in a $CO_2$ source 4008, 4008' such as a pressurized cannister, is then injected into the barrel. The $CO_2$ is injected into the mixture near the end of the barrel 4004, 4004', after a seal 4006, 4006' and just before the nozzle 4007, 4007'. Preferably, a pumping mechanism 4009, 4009' such as a stepping pump, which are widely used in the industry, is used to increase the pressure in barrel 4004, 4004'. The material is then discharged through nozzle 4007, 4007'.

Referring to FIG. 40*a*, when an extruder 4001 is used to compound and foam the preferred gel cushioning medium, a gear pump 4010, which is preferably positioned at the end of nozzle 4007, controls the amount of pressure in barrel 4004 and inhibits a drop in pressure at the nozzle. As the material is discharged from pump 4010 at 4011, the $CO_2$ expands, which introduces gas bubbles into the material and foams the material.

With reference to FIG. 40*b*, when an injection molding machine 4001' is used to compound and foam the preferred gel material, an accumulator positioned just before nozzle 4007' increases the material pressure. Following discharge from nozzle 4007', the material passes through a heat exchanger 4012 and into the cavity (not shown) of a mold 4013. Preferably, the $CO_2$ begins to expand and form gas bubbles in the material as the material fills the mold cavity.

Preferably, the $CO_2$ and the material are maintained at a pressure of at least about 700 psi just prior to entering the gear pump at the extrusion end of the barrel. More preferably, the material and $CO_2$ reach a pressure of at least about 900 psi. Most preferably, the $CO_2$ and material are subjected to a pressure of at least about 1,700 psi. At pressures of about 1,700 psi and greater, $CO_2$ acts as a supercritical fluid.

At such high pressure, the liquid $CO_2$ solvates the block copolymer and principle polymer, which decreases the $T_g$ of the mixture. Thus, as pressure is released upon extrusion of the mixture from the nozzle, the $CO_2$ immediately becomes a gas and the mixture immediately crosses its $T_g$. In other words, as gas bubbles are forming in the material, the material begins to solidify. Thus, the number of gas bubbles retained in the material is increased. $CO_2$ bubbles are believed to form around the SAFOAM®, which is believed to act as a nucleating agent.

The expansion rate of the $CO_2$ bubbles and the solidification rate of the mixture are varied, depending upon the particular formulation of the material. Various other factors also affect how a material will foam, including the rate at which material is fed into the barrel (the "feed rate"), the length of time the material is in the barrel (the "residence time"), the speed at which the screw or screws rotate (the "screw rpm"), the relative direction each screw rotates and others.

In addition, properties of the material affect the foaming process. The amount of plasticizer affects a material's ability to foam. For example, when the plasticizer is an oil, materials which include increased amounts of plasticizer do not foam as readily as similar materials with less plasticizing oil. Applicant believes that as the amount of plasticizing oil in a material increases, gas bubbles tend to more readily escape from the material.

d. Lattice Structures

Lattice structures may be made using the preferred gel material, which is incorporated into the cushion configurations according to the present invention. Such lattice structures include multiple overlaid streams of the gel material in a lattice-like arrangement. Preferably, the streams of material have a thickness of less than about one-tenth of an inch.

Formation of the gel material into lattice structures decreases the specific gravity of the material due to the free space created within the lattice structure. Preferably, lattice structures reduce the specific gravity of the material by at least about 50%.

One method of forming lattice structures includes heating the material to a molten state and spraying streams of the material to form a desired lattice structure. Preferably, a hot melt adhesive spray gun, such as the FP-200 Gun System manufactured by Nordson Corporation of Amherst, Ohio, is used to spray streams of the preferred gel cushioning material to form a lattice structure.

e. Premixing of Microspheres

In formulations of the preferred material for use in the cushioning elements of this invention which include microspheres, premixing the microspheres with the plasticizer prior to adding the plasticizer to the elastomeric block copolymer and the polyolefin may result in a more uniform mixture (i.e., a better final product) and makes the microsphere-containing gel material easier to process. For example, the materials may be premixed by hand.

5. Representative Elastomeric Gel Physical Properties and Formulations

When the preferred A-B-A triblock copolymer, plasticizer and additives are mixed, the resultant material is very strong, yet very elastic and easily stretched, having a Young's elasticity modulus of only up to about $1 \times 10^6$ dyne/cm$^2$. The preferred elastomeric gel material for use in the cushioning elements of this invention also has low tack and little or no oil bleed, both of which are believed to be related to the molecular weight of the uniquely preferred elastomers as well as the molecular structure of the molecular structure of the elastomer and its interaction with the plasticizing component. Finally, the preferred elastomeric gel cushioning medium is capable of elongation up to about 2400% and more.

EXAMPLES

Examples 1 through 14 include various mixtures of SEPTON 4055 (available from Kuraray) ultra high molecular weight polystyrene-hydrogenated poly(isoprene+butadiene)-polystyrene triblock copolymer extended in a plasticizing oil. In addition, the materials of Examples 1 through 14 include very minor amounts of IRGANOX® 1010 (about 0.03%), IRGAFOS® 168 (about 0.03%), and colorant (about 0.04%).

The material of each of Examples 1 through 14 was compounded in an ISF 120VL injection molding machine, manufactured by Toshiba Machine Co. of Tokyo, Japan, with a 20:1 (L/D) high mixing single screw manufactured by Atlantic Feed Screw, Inc. of Cayce, S.C. The temperature in the injection molding machine was increased stepwise from the point of insertion to the injection nozzle. At the point of insertion, the temperature was about 270° F. Temperatures along the screw were about 275° F. and about 280° F., with the temperature increasing as the material approached the injection nozzle. The temperature at the injection nozzle was about 290° F. This gradual increase in temperature builds up pressure during feeding of the material through the injection molding machine, providing a more homogeneous mixture of the components of the material.

Each of the formulations of Examples 1 through 11 were then injected into an aluminum plaque mold and allowed to cure at room temperature for about 24 hours to about 48 hours. Thereafter, various tests were performed on the materials, including percent elongation, tensile strength at break, and percent oil bleed.

Percent elongation and tensile strength testing were performed in accordance with American Society for Testing and Materials (ASTM) Standard Test Method D412, using a Model QC-II-30XS-B Electronic Tensile Tester manufactured by Thwing Albert Instrument Co. of Philadelphia, Pa. Each of samples were O-shaped rings with an outer diameter of about 0.500 inch, an inner diameter of about 0.375 inch, a gauge diameter of about 0.438 inch, and a mean circumference of about 1.374 inches. Five samples of each material were tested for elongation and tensile strength.

Percent oil bleed was measured by obtaining the combined weight of three disk-shaped samples of the material, each sample having diameter of about 3 cm and a thickness of about 6.5 mm. Two pieces of 12.5 cm diameter qualitative filter paper having a medium filter speed and an ash content of about 0.15%, such as that sold under the trade name DOUBLE RINGS 102, and manufactured by Xinhua Paper Mill, were then weighed individually.

The three sample disks were then placed on one of the pieces of filter paper (which has high capillary action), and the other piece of filter paper was placed on top of the samples. The material and paper were then placed in a plastic bag and pressure-sandwiched between two flat steel plates, each weighing within about 0.5% of about 2285 g. Next, the material samples, paper and steel plates were placed in a freezer at about −4° C. for about 4 hours.

Oil bleed testing was conducted at a low temperature because rubber molecules are known to constrict at low temperatures. Thus, in theory, when a plasticized material is subjected to cooler temperatures, the attraction of plasticizer to Vander Waals binding sites on the rubber molecules decreases. Therefore, it has been theorized that plasticizer-extended materials tend to bleed more at lower temperatures. However, oil tends to flow more slowly at low temperatures, suggesting that this theory may not be accurate. Nevertheless, this theory has been widely accepted. The extreme condition of the pressure and the freezer was needed for quantitative evaluation since the preferred elastomeric gel materials have the advantage over prior art gel materials of not bleeding at all at room temperature without pressure, even when placed next to high capillary action paper. Although John Y. Chen did not report oil bleed in his patents or patent applications, Applicant's experience is that Chen's materials have a higher level of oil bleed than the preferred elastomeric gel cushioning medium.

Upon removal from the freezer, each piece of the filter paper and the samples were immediately weighed again. Percent oil bleed was then calculated by determining the combined weight increase of the filter papers, dividing that value by the original sample weight and multiplying the result by 100.

EXAMPLE 1

The material of Example 1 includes eight parts LP 150 mineral oil to one part SEPTON 4055.

| 8:1 | Average | High Value |
| --- | --- | --- |
| Percent Elongation | 2375 | 2400 |
| PSI at Failure | 185 | 190 |

In comparison, the material of Chen's patents that has an oil to elastomer ratio of 4:1, which should have higher strength than Applicant's 8:1 material of Example 1, instead exhibits much lower elongation and PSI at failure (i.e., tensile strength) values. The material of Example 1 elongates up to about 2,400%, which is 700% greater elongation than Chen's 4:1, which is capable of only 1700% elongation (See, e.g., '213 Patent, Table I, col. 6, lines 18–38). Likewise, the tensile strength at break of Chen's 4:1 gel is only about $4 \times 10^6$ dyne/cm$^2$, or 58 psi. Thus, the 8:1 material of Example 1 is at least three times as strong as Chen's 4:1. This is an unexpectedly good result since the conventional wisdom concerning gels is that more oil results in less strength. Applicant doubled the amount of oil used (8:1 compared to 4:1) but achieved more than three times the tensile strength of Chen's material.

EXAMPLE 2

The material of Example 2 includes five parts LP 150 mineral oil to one part SEPTON 4055.

| 5:1 | Average | High Value |
|---|---|---|
| Percent Elongation | 1975 | 2030 |
| PSI at Failure | 335 | 352 |

A comparison of the 5:1 material of Example 2 to the 4:1 material of Chen's patents shows that Chen's material exhibits much lower elongation and PSI at failure (i.e., tensile strength) values. The material of Example 2 elongates up to about 2,000%, which is about 300% more than Chen's 4:1, which is capable of only 1700% elongation (See, e.g., '213 Patent, Table I, col. 6, lines 18–38). Likewise, the tensile strength at break of Chen's 4:1 gel is only about $4 \times 10^6$ dyne/cm$^2$, which translates to only about 58 psi. Thus, the 5:1 material of Example 2, despite the presence of about 25% more oil than Chen's 4:1 material, is about five-and-a-half times as strong as Chen's 4:1.

EXAMPLE 3

The material of Example 3 includes three parts LP 150 mineral oil to one part SEPTON 4055.

| 3:1 | Average | High Value |
|---|---|---|
| Percent Elongation | 1555 | 1620 |
| PSI at Failure | 404 | 492 |

A consideration of both Example 2, a material having a 5:1 oil to elastomer ratio, and Example 3, a material having a 3:1 oil to elastomer ratio, indicates that a material with a 4:1 oil to elastomer ratio would compare very favorably to the gel disclosed in U.S. Pat. No. 5,508,334, which issued in the name of John Y. Chen. According to Table I in the '334 patent, Chen's 4:1 KRATON® G-1651-containing material had a breaking strength (i.e., tensile strength) value of $4 \times 10^6$ dyne/cm$^2$, which translates to only about 58 psi.

The elongation at break value was mysteriously omitted from Table I of the '334 patent and other Chen patents. However, reference to Table I of Chen's first two issued patents (the '284 and '213 patents) sets the percent elongation of Chen's 4:1 material at about 1700. Applicant suspects that Chen omitted this data in later patent applications because it was either inaccurate or Chen's improved materials failed to exhibit improved properties over his earlier materials.

In comparison, the percent elongation of a 4:1 preferred elastomeric gel material for use in the cushions of the present invention would be at least about 1800, exceeding the elongation of Chen's 4:1 material by about 100% or more. Similarly, the tensile strength of a 4:1 material preferred for use in the cushions of this invention would be at least about 350 psi, and probably in the 370 to 375 psi range. Thus, a preferred elastomeric gel cushioning medium for use in the cushions of the present invention with an oil to elastomer ratio of about 4:1 would be about six times a strong as Chen's most preferred 4:1 gel.

The following Examples 4 through 11 have been included to demonstrate the usefulness of various plasticizing oils in the preferred elastomeric gel material.

EXAMPLE 4

The material of Example 4 included eight parts of a plasticizer mixture to one part SEPTON 4055. The eight parts plasticizer mixture included about 5.3 parts REGALREZ® 1018 and about 2.8 parts DUOPRIME® 90 mineral oil.

| 8:1 | Average | High Value |
|---|---|---|
| Percent Elongation | 2480 | 2520 |
| PSI at Failure | 187 | 195 |

EXAMPLE 5

The material of Example 5 included eight parts of EDELEX® 27 oil to one part SEPTON 4055. EDELEX® 27 has an aromatic content of about 1%, which would be expected to slightly decrease the tensile strength of the material.

| 8:1 | Average | High Value |
|---|---|---|
| Percent Elongation | 2105 | 2150 |
| PSI at Failure | 144 | 154 |
| Percent Oil bleed | 0.34 | |

EXAMPLE 6

The material of Example 6 included eight parts of DUOPRIME® 55 mineral oil to one part SEPTON 4055.

| 8:1 | Average | High Value |
|---|---|---|
| Percent Elongation | 1940 | 2055 |
| PSI at Failure | 280 | 298 |
| Percent oil bleed | 0.29 | |

EXAMPLE 7

The material of Example 7 included eight parts of DUOPRIME® 70 mineral oil to one part SEPTON 4055.

| 8:1 | Average | High Value |
|---|---|---|
| Percent Elongation | 2000 | 2030 |
| PSI at Failure | 250 | 275 |
| Percent oil bleed | 0.41 | |

EXAMPLE 8

The material of Example 8 included eight parts of DUOPRIME® 90 mineral oil to one part SEPTON 4055.

| 8:1 | Average | High Value |
|---|---|---|
| Percent Elongation | 2090 | 2125 |
| PSI at Failure | 306 | 311 |
| Percent oil bleed | 0.35 | |

EXAMPLE 9

The material of Example 9 included eight parts of DUOPRIME ® 200 mineral oil to one part SEPTON 4055.

| 8:1 | Average | High Value |
|---|---|---|
| Percent Elongation | 1970 | 2040 |
| PSI at Failure | 200 | 228 |
| Percent oil bleed | 0.20 | |

EXAMPLE 10

The material of Example 10 included eight parts of DUOPRIME ® 350 mineral oil to one part SEPTON 4055.

| 8:1 | Average | High Value |
|---|---|---|
| Percent Elongation | 2065 | 2080 |
| PSI at Failure | 267 | 270 |
| Percent oil bleed | 0.21 | |

EXAMPLE 11

The material of Example 11 included eight parts of DUOPRIME ® 500 mineral oil to one part SEPTON 4055.

| 8:1 | Average | High Value |
|---|---|---|
| Percent Elongation | 1995 | 2075 |
| PSI at Failure | 194 | 223 |
| Percent oil bleed | 0.17 | |

EXAMPLE 12

| Component | Generic Class | Amount (grams) |
|---|---|---|
| Septon 4055 | A-B-A copolymer | 227.0 |
| Duoprime 500 oil | Plasticizing oil | 2,722.0 |
| Irganox 1010 | Antioxidant | 4.5 |
| Irgafos 168 | Antioxidant | 4.5 |
| Safoam FP-40 | Foaming agent | 14.0 |
| Lamp Black | Colorant and Foam Bubble Nucleating Agent | 1.5 |

Applicant began foaming the preferred elastomeric gel material to reduce its specific gravity by heating it until the SAFOAM began to degenerate and create $CO_2$ gas. DUOPRIME 500 oil was selected for use in the example because of its high viscosity (i.e., it would help hold a bubble longer than a lower viscosity oil). The components were compounded in an injection molding machine according to one preferred melt blending method. The original mixture included 3.40 g SAFOAM. When half of the SAFOAM appeared to have been consumed, 3.40 g more was added. Another 7.20 g of SAFOAM was added when half of the SAFOAM again appeared to have been consumed. Temperatures along the injection molding screw ranged from about 280° F. at the point of insertion to about 240° F. at the nozzle. The material of Example 12 had closed cells of fairly consistent density.

EXAMPLE 13

| Component | Generic Class | Amount (grams) |
|---|---|---|
| Septon 4055 | A-B-A copolymer | 227.0 |
| Duoprime 500 oil | Plasticizing oil | 2,722.0 |
| Irganox 1010 | Antioxidant | 1.5 |
| Irgafos 168 | Antioxidant | 1.5 |
| Expancell DE-80 | Microspheres | 500.O |
| Orange | Colorant | 2.0 |

Applicant has also used microspheres to reduce the specific gravity of the preferred elastomeric gel cushioning medium. Acrylic microspheres were used in the material of Example 13. The components were premixed, then compounded in an injection molding machine screw. Temperatures along the injection molding screw ranged from about 260° F. at the point of insertion to about 220° F. at the nozzle. Surprisingly, the microspheres were not deformed by the high shear and high temperatures of the injection molding machine. The resulting material was very light, with microspheres consistently dispersed therethrough.

EXAMPLE 14

| Component | Generic Class | Amount (grams) |
|---|---|---|
| Septon 4055 | A-B-A copolymer | 114.0 |
| Kraton G-1701 | A-B copolymer | 5.8 |
| Regalrez 1018 | Plasticizing resin | 340.0 |
| Edelex 45 | Plasticizing oil | 225.0 |
| Talc | Talc | 20.4 |
| Vestenamer 8012 | Tor rubber | 11.5 |
| Expancell DU-80 | Microspheres | 0.5 |
| Safoam FP-40 | Foaming agent | 10.0 |
| Irganox 1010 | Antioxidant | 3.0 |
| Irgafos 168 | Antioxidant | 3.0 |
| Boiled Linseed Oil | | 8.0 |
| Green | Colorant | 2.0 |

In the material of Example 14, Applicant used KRATON® G-1701, manufactured by Shell Chemical Co., to reduce oil bleed. REGALREZ® 1018 was used as a plasiticizer and to reduce oil bleed from the material. Talc was included in the material of Example 14 to act as a nucleating agent during foaming of the material. Since talc migrates to the surface of the material, it is also useful as a surface detackifier. Talc may also be used as a filler in the material. VESTENAMER 8012, sold by Hüls America Inc. of Piscataway, N.J., is a transpolyoctylene rubber (tor) which is useful for reducing oil bleed and reducing melt viscosity of the preferred elastomeric gel material. Boiled linseed oil is believed to reduce the melt viscosity and tackiness of the material and to accelerate the migration of particulate matter to the material's surface. Applicant used both microspheres and foaming agents in the material of Example 14. Although acrylic microspheres reduce the specific gravity of the preferred elastomeric gel material, they increase the stiffness of the material, though not as much as glass, ceramic, or other rigid microspheres would.

The closed cell foaming and the microsphere dispersion of the material of Example 14 were consistent. The material was soft and light-weight. The components were well compounded. In addition, the material of Example 14 did not have an oily feel and exhibited no plasticizer bleedout at room temperature.

Additives such as colorants, flame retardants, detackifiers and other additives may be included in the preferred elastomeric gel cushioning medium. Various formulations of the preferred elastomeric gel material may be tailored to achieve differing levels of softness, strength, tackiness and specific gravity as desired. Examples 1 through 11 illustrate the surprisingly high elongation and tensile strength of the material. Many embodiments of the preferred elastomeric material, of which the preceding examples are representative, exhibit physical properties vastly superior to those of John Y. Chen's material, which Applicant believes to be the closest and best prior art. A chemical explanation for the superior results is provided below.

Examples 15 through 35 are other formulations of the preferred elastomeric gel cushioning medium for use in the cushions according to the present invention. The formulations of Examples 15 through 35 were compounded using a ZE25 TIEBAR AIR COOLED TWIN SCREW EXTRUDER with a 35:1 L/D ratio according to a preferred melt blending method. Temperatures along the screws were in the range of about 130° C. to about 170° C. at the hopper to about 100° C. to about 130° C. at the nozzle.

EXAMPLE 15

| Component | Generic Class | Amount (grams) |
|---|---|---|
| Septon 4055 | A-B-A copolymer | 50.04 |
| LP-150 | Plasticizing oil | 250.0 |
| Irganox 1010 | Antioxidant | 1.5 |
| Irgafos 168 | Antioxidant | 1.5 |

EXAMPLE 16

| Component | Generic Class | Amount (grams) |
|---|---|---|
| Septon 4055 | A-B-A copolymer | 83.25 |
| LP-150 | Plasticizing oil | 250.00 |
| Irganox 10100 | Antioxidant | 1.5 |
| Irgafos 168 | Antioxidant | 1.5 |

EXAMPLE 17

| Component | Generic Class | Amount (grams) |
|---|---|---|
| Septon 4055 | A-B-A copolymer | 50.04 |
| Kadol | Plasticizing oil | 250.00 |
| E 17 | Antioxidant (vitamin E) | 6.26 |

EXAMPLE 18

| Component | Generic Class | Amount (grams) |
|---|---|---|
| Septon 4055 | A-B-A copolymer | 250.00 |
| Duoprime 90 | Plasticizing oil | 1,250.00 |
| E 17 | Antioxidant (vitamin E) | 6.30 |

EXAMPLE 19

| Component | Generic Class | Amount (grams) |
|---|---|---|
| Septon 4055 | A-B-A copolymer | 250.00 |
| LP-150 | Plasticizing oil | 1,250.00 |
| E 17 | Antioxidant (vitamin E) | 6.25 |

EXAMPLE 20

| Component | Generic Class | Amount (grams) |
|---|---|---|
| Septon 4055 | A-B-A copolymer | 350.00 |
| Regalrez 1018 | Plasticizing resin | 262.51 |
| C23 to C27 Alkane Wax | Plasticizer | 35.00 |
| LP-150 | Plasticizing oil | 287.60 |
| E 17 | Antioxidant (vitamin E) | 14.00 |
| Ethosperse | | 52.50 |
| White | Colorant | 10.50 |
| Yellow | Colorant | 0.70 |
| Red | Colorant | 0.03 |

EXAMPLE 21

| Component | Generic Class | Weight % of Total |
|---|---|---|
| SEPTON ® 4055 | Triblock copolymer | 11.89 |
| KRATON ® G 1701 | Diblock copolymer | 0.24 |
| LP-150 mineral oil | Plasticizer | 73.87 |
| Astor Slack Wax 2050 | Plasticizer | 8.33 |
| Alkane Wax C 25-27 | Plasticizer | 0.59 |
| IRGANOX ® 1010 | Antioxidant | 0.42 |
| IRGAFOS ® 168 | Antioxidant | 0.42 |
| IRGANOX ® E 17 | Antioxidant | 0.42 |
| TETRAGLYME | Anti-bleed, anti-tack additive | 1.19 |
| PQ 6546 | Acrylic Microspheres | 1.44 |
| Rocket Red | Colorant | 1.19 |

EXAMPLE 22

| Component | Generic Class | Weight % of Total |
|---|---|---|
| SEPTON ® 4055 | Triblock copolymer | 14.86 |
| KRATON ® G 1701 | Diblock copolymer | 0.30 |
| LP-150 mineral oil | Plasticizer | 71.01 |
| Astor Slack Wax 2050 | Plasticizer | 6.69 |
| Alkane Wax C 25-27 | Plasticizer | 0.58 |
| IRGANOX ® 1010 | Antioxidant | 0.52 |
| IRGAFOS ® 168 | Antioxidant | 0.52 |
| IRGANOX ® E 17 | Antioxidant | 0.52 |
| TETRAGLYME | Anti-bleed, anti-tack additive | 1.34 |
| PQ 6546 | Acrylic Microspheres | 1.44 |
| Rocket Red | Colorant | 2.23 |

EXAMPLE 23

| Component | Generic Class | Weight % of Total |
|---|---|---|
| SEPTON ® 4055 | Triblock copolymer | 16.66 |
| KRATON ® G 1701 | Diblock copolymer | 0.33 |
| LP-150 mineral oil | Plasticizer | 67.48 |
| Astor Slack Wax 2050 | Plasticizer | 7.50 |
| Alkane Wax C 25-27 | Plasticizer | 0.67 |
| IRGANOX ® 1010 | Antioxidant | 0.58 |
| IRGAFOS ® 168 | Antioxidant | 0.58 |
| IRGANOX ® E 17 | Antioxidant | 0.58 |
| TETRAGLYME | Anti-bleed, anti-tack additive | 1.50 |
| PQ 6546 | Acrylic Microspheres | 1.62 |
| Rocket Red | Colorant | 2.50 |

EXAMPLE 24

| Component | Generic Class | Weight % of Total |
|---|---|---|
| SEPTON ® 4055 | Triblock copolymer | 13.18 |
| KRATON ® G 1701 | Diblock copolymer | 0.26 |
| LP-150 mineral oil | Plasticizer | 75.12 |
| Astor Slack Wax 2050 | Plasticizer | 5.27 |
| Alkane Wax C 25-27 | Plasticizer | 0.33 |
| IRGANOX ® 1010 | Antioxidant | 0.46 |
| IRGAFOS ® 168 | Antioxidant | 0.46 |
| IRGANOX ® E 17 | Antioxidant | 0.46 |
| TETRAGLYME | Anti-bleed, anti-tack additive | 1.19 |
| PQ 6546 | Acrylic Microspheres | 1.62 |
| Horizon Blue | Colorant | 1.65 |

EXAMPLE 25

| Component | Generic Class | Weight % of Total |
|---|---|---|
| SEPTON ® 4055 | Triblock copolymer | 11.07 |
| KRATON ® G 1701 | Diblock copolymer | 0.22 |
| LP-150 mineral oil | Plasticizer | 76.89 |
| Astor Slack Wax 2050 | Plasticizer | 5.54 |
| Alkane Wax C 25-27 | Plasticizer | 0.55 |
| IRGANOX ® 1010 | Antioxidant | 0.39 |
| IRGAFOS ® 168 | Antioxidant | 0.39 |
| IRGANOX ® E 17 | Antioxidant | 0.39 |
| Amyl Formate (supplied by Aldrich) | Clarity enhancer | 0.55 |
| TETRAGLYME | Anti-bleed, anti-tack additive | 1.66 |
| PQ 6546 | Acrylic Microspheres | 0.97 |
| Horizon Blue | Colorant | 1.38 |

EXAMPLE 26

| Component | Generic Class | Weight % of Total |
|---|---|---|
| SEPTON ® 4055 | Triblock copolymer | 14.40 |
| KRATON ® G 1701 | Diblock copolymer | 0.29 |
| LP-150 mineral oil | Plasticizer | 74.50 |
| Astor Slack Wax 2050 | Plasticizer | 4.80 |
| Alkane Wax C 25-27 | Plasticizer | 0.50 |
| IRGANOX ® 1010 | Antioxidant | 0.50 |
| IRGAFOS ® 168 | Antioxidant | 0.50 |
| IRGANOX ® E 17 | Antioxidant | 0.50 |
| TETRAGLYME | Anti-bleed, anti-tack additive | 1.44 |
| PQ 6546 | Acrylic Microspheres | 0.97 |
| Signal Green | Colorant | 1.58 |

EXAMPLE 27

| Component | Generic Class | Weight % of Total |
|---|---|---|
| SEPTON ® 4055 | Triblock copolymer | 13.37 |
| KRATON ® G 1701 | Diblock copolymer | 0.27 |
| LP-150 mineral oil | Plasticizer | 74.88 |
| Astor Slack Wax 2050 | Plasticizer | 5.35 |
| Alkane Wax C 25-27 | Plasticizer | 3.34 |
| IRGANOX ® 1010 | Antioxidant | 0.47 |
| IRGAFOS ® 168 | Antioxidant | 0.47 |
| IRGANOX ® E 17 | Antioxidant | 0.47 |
| TETRAGLYME | Anti-bleed, anti-tack additive | 1.34 |
| Amyl Formate | Clarity Enhancer | 0.40 |
| PQ 6546 | Acrylic Microspheres | 0.99 |
| Signal Green | Colorant | 1.47 |

EXAMPLE 28

| Component | Generic Class | Weight % of Total |
|---|---|---|
| SEPTON ® 4055 | Triblock copolymer | 8.14 |
| KRATON ® G 1701 | Diblock copolymer | 0.16 |
| LP-150 mineral oil | Plasticizer | 80.76 |
| Astor Slack Wax 2050 | Plasticizer | 6.51 |
| Alkane Wax C 25-27 | Plasticizer | 0.49 |
| IRGANOX ® 1010 | Antioxidant | 0.28 |
| IRGAFOS ® 168 | Antioxidant | 0.28 |
| IRGANOX ® E 17 | Antioxidant | 0.28 |
| TETRAGLYME | Anti-bleed, anti-tack additive | 1.22 |
| PQ 6546 | Acrylic Microspheres | 0.97 |
| Blaze Orange | Colorant | 0.90 |

EXAMPLE 29

| Component | Generic Class | Weight % of Total |
|---|---|---|
| SEPTON ® 4055 | Triblock copolymer | 8.12 |
| KRATON ® G 1701 | Diblock copolymer | 0.16 |
| LP-150 mineral oil | Plasticizer | 80.60 |
| Astor Slack Wax 2050 | Plasticizer | 6.50 |
| Alkane Wax C 25-27 | Plasticizer | 0.49 |
| IRGANOX ® 1010 | Antioxidant | 0.28 |
| IRGAFOS ® 168 | Antioxidant | 0.28 |
| IRGANOX ® E 17 | Antioxidant | 0.28 |
| TETRAGLYME | Anti-bleed, anti-tack additive | 1.22 |
| Amyl Formate | Clarity Enhancer | 0.20 |
| PQ 6546 | Acrylic Microspheres | 0.97 |
| Blaze Orange | Colorant | 0.90 |

EXAMPLE 30

| Component | Generic Class | Weight % of Total |
|---|---|---|
| SEPTON ® 4055 | Triblock copolymer | 12.10 |
| KRATON ® G 1701 | Diblock copolymer | 0.30 |
| LP-150 mineral oil | Plasticizer | 84.47 |
| IRGANOX ® 1010 | Antioxidant | 0.18 |
| IRGAFOS ® 168 | Antioxidant | 0.18 |
| FC-10 fluorochemical alcohol | Bleed-reducing additive | 0.18 |
| Strong Magenta | Colorant | 0.36 |
| Horizon Blue | Colorant | 0.36 |
| PQ 6545 | Acrylic Microspheres | 1.62 |

EXAMPLE 31

| Component | Generic Class | Weight % of Total |
|---|---|---|
| SEPTON ® 4055 | Triblock copolymer | 19.69 |
| LP-150 mineral oil | Plasticizer | 78.78 |
| IRGANOX ® 1010 | Antioxidant | 0.20 |
| IRGAFOS ® 168 | Antioxidant | 0.20 |
| DYNAMAR ® FX 9613 | Bleed-reducing additive | 0.15 |
| 091DU80 | Acrylic Microspheres | 0.98 |

EXAMPLE 32

| Component | Generic Class | Weight % of Total |
|---|---|---|
| SEPTON ® 4055 | Triblock copolymer | 19.60 |
| LP-150 mineral oil | Plasticizer | 78.39 |
| IRGANOX ® 1010 | Antioxidant | 0.19 |
| IRGAFOS ® 168 | Antioxidant | 0.20 |
| DYNAMAR ® FX 9613 | Bleed-reducing additive | 0.15 |
| 091DU80 | Acrylic Microspheres | 1.47 |

EXAMPLE 33

| Component | Generic Class | Weight % of Total |
|---|---|---|
| SEPTON ® 4055 | Triblock copolymer | 28.38 |
| LP-150 mineral oil | Plasticizer | 70.92 |
| IRGANOX ® 1010 | Antioxidant | 0.28 |
| IRGAFOS ® 168 | Antioxidant | 0.28 |
| ZONYL ® BA-N | Bleed-reducing additive | 0.14 |

EXAMPLE 34

| Component | Generic Class | Weight % of Total |
|---|---|---|
| SEPTON ® 4055 | Triblock copolymer | 23.43 |
| LP-150 mineral oil | Plasticizer | 58.55 |
| IRGANOX ® 1010 | Antioxidant | 0.23 |

-continued

| Component | Generic Class | Weight % of Total |
|---|---|---|
| IRGAFOS ® 168 | Antioxidant | 0.23 |
| Carbowax | Plasticizer, includes polar molecules | 17.56 |

EXAMPLE 35

| Component | Generic Class | Weight % of Total |
|---|---|---|
| SEPTON ® 4055 | Triblock copolymer | 15.14 |
| SEPTON ® 4033 | Triblock copolymer | 3.79 |
| LP-150 mineral oil | Plasticizer | 80.45 |
| IRGANOX ® 1010 | Antioxidant | 0.19 |
| IRGAFOS ® 168 | Antioxidant | 0.19 |
| ZONYL ® BA-N | Bleed-reducing additive | 0.15 |
| Horizon Blue | Colorant | 0.09 |

6. Representative Visco-Elastomeric Gel Formulations

The following examples have been prepared by Applicant.

EXAMPLE 36

| Component | Generic Class | Weight % of Total |
|---|---|---|
| Septon 4055 | A-B-A copolymer | 5.46 |
| Kraton G1701 | A-B copolymer | 0.55 |
| Irganox 1010 | antioxidant | 0.16 |
| Irgafos 168 | antioxidant | 0.16 |
| LP-150 | plasticizing oil | 32.77 |
| Regalrez 1018 | plasticizing resin | 54.62 |
| Kristalex 5140 | strengthening resin | 0.55 |
| Regalite R101 | plasticizing resin | 2.73 |
| Regalrez 1139 | plasticizimg resin | 2.73 |
| PQ 6545 microspheres | added to increase rebound rate and decrease specific gravity | 0.16 |
| Bright orange aluminum lake | colorant | 0.11 |

SEPTON® 4055 imparts form and strength to the visco-elastic material. KRATON® G-1701 is used to facilitate a more homogeneous blend of the elastomer (A-B-A copolymer) and plasticizer components. REGALREZ® 1018, a room temperature liquid plasticizer, is the primary plasticizer used in the material. REGALITE® R101 and REGALREZ® 1139 are also plasticizers and modify the tack of the visco-elastic material. KRISTALEX® 5140 is believed to impart strength to the styrene domains or centers of the A-B-A copolymer. It is also believed to have some plasticizing abilities when used in combination with A-B-A copolymers. IRGANOX® 1010 and IRGAFOS® 168 are antioxidants. The material of Example 36 was made as an early experiment. Consequently, LP-150, a plasticizing oil, was used in combination with the resin plasticizers.

The material of Example 36 was prepared by premixing the components and melt blending them in an injection molding machine according to one preferred method for compounding the preferred gel cushioning medium. The material was very tacky and readily deformable, had very quick rebound and was very soft. Applicant believes that the very quick rebound rate is caused by the presence of plasticizing oil and microspheres. The specific gravity of the material was about 0.40.

EXAMPLE 37

| Component | Generic Class | Weight % of Total |
|---|---|---|
| Septon 8006 | A-B-A copolymer | 2.42 |
| Septon 4055 | A-B-A copolymer | 2.42 |
| Kraton 01701 | A-B copolymer | 0.48 |
| Irganox 1010 | antioxidant | 0.15 |
| Irgafos 168 | antioxidant | 0.15 |
| Regafrez 1018 | plasticizing resin | 87.18 |
| Kristalex 5140 | strengthening resin | 0.48 |
| Regalite R101 | plasticizing resin | 2.42 |
| Regalrez 1139 | plasticizing resin | 2.42 |
| PQ 6545 microspheres | added to increase rebound rate and decrease specific gravity | 1.39 |
| Bright orange aluminum lake | colorant | 0.24 |
| Dow Corning 200 silicone | rubber additive | 0.24 |

In the material of Example 37, SEPTON® 8006 was used in combination with SEPTON® 4055 to provide some form, but a softer visco-elastic material. Silicone was added to detackify the material.

The material of Example 37 was prepared by premixing the components and melt blending them in an injection molding machine according to a preferred method for compounding the preferred gel material. The material was slightly tacky and readily deformable, had slow rebound and moderate stiffness. The use of silicone seems to have decreased the tackiness of the material. The specific gravity of the material was about 0.30.

EXAMPLE 38

| Component | Generic Class | Weight % of Total |
|---|---|---|
| Septon 8006 | A-B-A copolymer | 2.45 |
| Septon 4055 | A-B-A copolymer | 2.45 |
| Kraton G1701 | A-B copolymer | 0.49 |
| Irganox 1010 | antioxidant | 0.15 |
| Irgafos 168 | antioxidant | 0.15 |
| Regalrez 1018 | plasticizing resin | 88.38 |
| Kristalex 5140 | strengthening resin | 0.49 |
| Regalite R101 | plasticizing resin | 2.46 |
| Regalrez 1139 | plasticizing resin | 2.46 |
| PQ 6545 microspheres | added to increase rebound rate and decrease specific gravity | 0.28 |
| Bright orange aluminum lake | colorant | 0.25 |

The material of Example 38 was prepared by premixing the components and melt blending them in an injection molding machine according to a preferred method for compounding the preferred gel material for use in the cushions of the present invention. The material was very tacky and readily deformable, had a slow to moderate rebound rate and was extremely soft. The specific gravity of the material was about 0.65.

EXAMPLE 39

| Component | Generic Class | Weight % of Total |
|---|---|---|
| Septon 8006 | A-B-A copolymer | 2.45 |
| Septon 4055 | A-B-A copolymer | 2.45 |
| Kraton G1701 | A-B copolymer | 0.49 |
| Irganox 1010 | antioxidant | 0.15 |
| Irgafos 168 | antioxidant | 0.15 |
| Regalrez 1018 | plasticizing resin | 88.06 |
| Kristalex 5140 | strengthening resin | 0.49 |
| Regalite R101 | plasticizing resin | 2.45 |
| Regalrez 1139 | plasticizing resin | 2.45 |
| PQ 6545 microspheres | added to increase rebound rate and decrease specific gravity | 0.64 |
| Bright orange aluminum lake | colorant | 0.24 |

The material of Example 39 was prepared by premixing the components and melt blending them in an injection molding machine according to a preferred compounding method. The material was very tacky and readily deformable, had moderate rebound and moderate softness. The specific gravity of the material was about 0.44.

EXAMPLE 40

| Component | Generic Class | Weight % of Total |
|---|---|---|
| Septon 8006 | A-B-A copolymer | 2.43 |
| Septon 4055 | A-B-A copolymer | 2.43 |
| Kraton G1701 | A-B copolymer | 0.49 |
| Irganox 1010 | antioxidant | 0.15 |
| Irgafos 168 | antioxidant | 0.15 |
| Regalrez 1018 | plasticizing resin | 87.51 |
| Kristalex 5140 | strengthening resin | 0.49 |
| Regalite R101 | plasticizing resin | 2.43 |
| Regalrez 1139 | plasticizing resin | 2.43 |
| PQ 6545 microspheres | added to increase rebound rate and decrease specific gravity | 1.26 |
| Bright orange aluminum lake | colorant | 0.24 |

The material of Example 40 was prepared by premixing the components and melt blending them in an injection molding machine according to a preferred compounding method. The material was tacky and readily deformable, had very quick rebound and moderate softness. The specific gravity of the material was about 0.28.

EXAMPLE 41

| Component | Generic Class | Weight % of Total |
|---|---|---|
| Septon 8006 | A-B-A copolymer | 2.44 |
| Septon 4055 | A-B-A copolymer | 2.44 |
| Kraton G1701 | A-B copolymer | 0.49 |
| Irganox 1010 | antioxidant | 0.15 |
| Irgafos 168 | antioxidant | 0.15 |
| Regalrez 1018 | plasticizing resin | 87.78 |
| Kristalex 5140 | strengthening resin | 0.49 |
| Regalite R101 | plasticizing resin | 2.44 |
| Regalrez 1139 | plasticizing resin | 2.44 |

-continued

| Component | Generic Class | Weight % of Total |
|---|---|---|
| PQ 6545 microspheres | added to increase rebound rate and decrease specific gravity | 0.95 |
| Colorant - bright orange aluminum lake | | 0.24 |

The material of Example 41 was prepared by premixing the components and melt blending them in an injection molding machine according to a preferred compounding method. The material was very tacky and readily deformable, had slow rebound and little stiffness. The specific gravity of the material was about 0.37.

EXAMPLE 42

| Component | Generic Class | Weight % of Total |
|---|---|---|
| Septon 4003 | A-B-A copolymer | 0.29 |
| Septon 8006 | A-B-A copolymer | 4.05 |
| Kraton G1701 | A-B copolymer | 0.09 |
| Irganox 1010 | antioxidant | 0.12 |
| Irgafos 168 | antioxidant | 0.12 |
| Regalrez 1018 | plasticizing resin | 86.73 |
| Kristalex 5140 | plasticizing resin | 0.87 |
| Regalite R101 | plasticizing resin | 2.02 |
| Regalrez 1139 | plasticizing resin | 2.02 |
| Vistanex LM-MS | plasticizing resin | 2.89 |
| PQ 6545 microspheres | added to increase rebound rate and decrease specific gravity | 0.37 |
| Safoam FP-powder | blowing agent | 0.43 |

In the material of Example 42, SEPTON® 4033 was used as a lower molecular weight polymer to help trap foam bubbles. A greater weight percentage of SEPTON® 8006 was used to provide a visco-elastomeric material which was softer than the materials of the preceding examples. VISTANEX® LM-MS was also added to determine whether its presence improved the material's ability to retain foam bubbles.

In preparing the material of Example 42, the solid resins were first crushed and premixed. The VISTANEX® LM-MS was heated for thirty minutes in an oven at about 150 to 200° C. The REGALREZ® and VISTANEX® were then mixed together with heat until the VISTANEX® appeared to be completely solvated.

The components of the material of Example 42 were then melt blended in an injection molding machine according to a preferred compounding method. The material was very tacky and readily deformable, had very slow rebound and was very soft. The use of VISTANEX® LM-MS appears to have decreased the rebound rate of the material. The specific gravity of the material was about 0.61.

EXAMPLE 43

| Component | Generic Class | Weight % of Total |
|---|---|---|
| Septon 4003 | A-B-A copolymer | 0.29 |
| Septon 8006 | A-B-A copolymer | 4.05 |

-continued

| Component | Generic Class | Weight % of Total |
|---|---|---|
| Kraton G1701 | A-B copolymer | 0.09 |
| Irganox 1010 | antioxidant | 0.12 |
| Irgafos 168 | antioxidant | 0.12 |
| Vistanex LM-MS | plasticizing resin | 2.90 |
| Regalrez 1018 | plasticizing resin | 86.85 |
| Kristalex 5140 | strengthening resin | 0.87 |
| Regalite R101 | plasticizing resin | 2.03 |
| Regalrez 1139 | plasticizing resin | 2.03 |
| PQ 6545 microspheres | added to increase rebound rate and decrease specific gravity | 0.67 |

In preparing the material of Example 43, the crystallized (not readily flowable at room temperature) resins were first crushed and premixed. The VISTANEX® LM-MS was heated for thirty minutes in oven at about 150 to 200° C. The REGALREZ® and VISTANEX® were then mixed together with heat until the VISTANEX® appeared to be completely solvated.

The components of the material of Example 43 were then melt blended in an injection molding machine according to a preferred method for compounding the preferred gel cushioning media. The material was very tacky and readily deformable, had extremely slow, incomplete rebound and was very soft. The specific gravity of the material was about 0.47.

EXAMPLE 44

| Component | Generic Class | Weight % of Total |
|---|---|---|
| Septon 4077 | A-B-A copolymer | 4.67 |
| Irganox 1010 | antioxidant | 0.30 |
| Irgafos 168 | antioxidant | 0.30 |
| Regalrez 1018 | plasticizing resin | 83.25 |
| Vistanex LM-MS | plasticizing resin | 1.81 |
| Kristalex 5140 | plasticizing resin | 0.96 |
| Regalite R101 | plasticizing resin | 1.93 |
| Regalrez 1139 | plasticizing resin | 1.93 |
| PQ 6545 microspheres | added to increase rebound rate and decrease specific gravity | 0.60 |
| Glycerin | detackifying agent | 4.25 |

SEPTON® 4077 was included in the material of Example 44 to provide form and strength to the material, yet provide a softer material than that using SEPTON® 4055. The crystallized (not readily flowable at room temperature) resins of Example 44 were first crushed and premixed. The VISTANEX® LM-MS was heated for thirty minutes in oven at about 150 to 200° C. The REGALREZ® and VISTANEX® were then mixed together with heat until the VISTANEX® appeared to be completely solvated.

The remaining components were then quickly mixed and melt blended in an injection molding machine according to a preferred compounding method. The material was very tacky (but less than a comparable material without the glycerin), readily deformable, had extremely slow, incomplete rebound and moderate softness. Use of SEPTON® 4077 appears to have resulted in a material which is softer than those which include SEPTON® 4055 as the only plasticizer, but stiffer than materials of the previous examples which have a combination of copolymers. The specific gravity of the material was about 0.40.

EXAMPLE 45

| Component | Generic Class | Weight % of Total |
| --- | --- | --- |
| Septon 4077 | A-B-A copolymer | 4.67 |
| Irganox 1010 | antioxidant | 0.30 |
| Irgafos 168 | antioxidant | 0.30 |
| Regalrez 1018 | plasticizing resin | 83.25 |
| Vistanex LM-MS | plasticizing resin | 1.81 |
| Kristalex 5140 | strengthening resin | 0.96 |
| Regalite R101 | plasticizing resin | 1.93 |
| Regalrez 1139 | plasticizing resin | 1.93 |
| PQ 6545 microspheres | added to increase rebound rate and decrease specific gravity | 0.60 |
| Glycerin | detackifying agent | 4.25 |

Glycerine was added to detackify the material of Example 45. In preparing the material of Example 45, the crystallized (not readily flowable at room temperature) resins were first crushed and premixed. The VISTANEX® LM-MS was heated for thirty minutes in oven at about 150 to 200° C. The REGALREZ® and VISTANEX® were then mixed together with heat until the VISTANEX® appeared to be completely solvated.

The remaining components were then mixed thoroughly and melt blended in an injection molding machine according to a preferred compounding method. The material was moderately tacky and readily deformable, had quick rebound and was soft. Glycerine appears to have reduced the tackiness of the material. The specific gravity of the material was about 0.42.

EXAMPLE 46

| Component | Generic Class | Weight % of Total |
| --- | --- | --- |
| Septon 4055 | A-B-A copolymer | 2.47 |
| Septon 8006 | A-B-A copolymer | 2.47 |
| Kraton G1701 | A-B copolymer | 0.49 |
| Irganox 1010 | antioxidant | 0.15 |
| Irgafos 168 | antioxidant | 0.15 |
| Regalrez 1018 | plasticizing resin | 88.85 |
| Kristalex 5140 | strengthening resin | 0.49 |
| Regalite R101 | plasticizing resin | 2.47 |
| Regalrez 1139 | plasticizing resin | 2.47 |

The material of Example 46 was prepared by premixing the components and melt blending them in an injection molding machine according to a preferred compounding method. The material was extremely tacky and readily deformable, had slow rebound and was very soft. The specific gravity of the material was about 0.37.

EXAMPLE 47

| Component | Generic Class | Weight % of Total |
| --- | --- | --- |
| Septon 4055 | A-B-A copolymer | 2.35 |
| Septon 8006 | A-B-A copolymer | 2.35 |
| Kraton G1701 | A-B copolymer | 0.47 |
| Irganox 1010 | antioxidant | 0.14 |
| Irgafos 168 | antioxidant | 0.14 |
| Regalrez 1018 | plasticizing resin | 84.36 |
| Kristalex 5140 | strengthening resin | 0.47 |
| Regalite R101 | plasticizing resin | 2.34 |
| Regalrez 1139 | plasticizing resin | 2.34 |
| PQ 6545 microspheres | added to increase rebound rate and decrease specific gravity | 0.36 |
| Glycerin | detackifying agent | 4.69 |

The material of Example 47 was prepared by premixing the components and melt blending them in an injection molding machine according to a preferred method for compounding the preferred gel cushioning materials for use in the cushioning elements of this invention. The material was very tacky and readily deformable, had slow rebound and little stiffness.

EXAMPLE 48

| Component | Generic Class | Weight % of Total |
| --- | --- | --- |
| Septon 4055 | A-B-A copolymer | 2.39 |
| Septon 8006 | A-B-A copolymer | 2.39 |
| Kraton G1701 | A-B copolymer | 0.48 |
| Irganox 1010 | antioxidant | 0.14 |
| Irgafos 168 | antioxidant | 0.14 |
| Regalrez 1018 | plasticizing resin | 80.21+ (see premix below) |
| Kristalex 5140 | strengthening resin | 0.48 |
| Regalite R101 | plasticizing resin | 2.39 |
| Regalrez 1139 | plasticizing resin | 2.39 |
| Premixed microspheres | | 9.00 |
| PQ 6545 microspheres | added to increase rebound rate and decrease specific gravity | 11.76% of premix (1.06) |
| Regalrez 1018 | | 88.24% of premix (7.94) |

The material of Example 48 was prepared by premixing the components and melt blending them in an injection molding machine according to a preferred compounding method. The material was extremely tacky and readily deformable, had slow rebound and little stiffness. The specific gravity of the Example 48 material was about 0.63.

Pre-blending the microspheres with REGALREZ® 1018 was, in part, advantageous because it reduced the amount of microspheres that were dispersed into the air during agitation, making the microspheres easier to handle.

EXAMPLE 49

A visco-elastic material was made which included four parts REGALREZ® 1018 (plasticizing resin), four parts HERCULES® Ester Gum 10D (plasticizing resin) and one part SEPTON 4055 (A-B-A copolymer). The components were mixed, placed in an oven and heated to about 300° F. After all of the components became molten, they were mixed, poured onto a flat surface and cooled. The material had little tack, deformed under pressure, was very stiff but readily deformable with light sustained pressure, and had an extremely slow rate of rebound.

EXAMPLE 50

| Component | Generic Class | Weight % of Total |
|---|---|---|
| Septon 4055 | A-B-A copolymer | 11.75 |
| Ester Gum 10D | visco-elasticity enhancer | 35.25 |
| Regalrez 1018 | plasticizing resin | 29.38 |
| Kristalex 5140 | strengthening resin | 1.18 |
| Foral 85 | strengthening resin | 3.53 |
| LP-150 oil | plasticizing oil | 14.10 |
| Ethosperse LA-23 | foaming facilitator | 3.53 |
| Irganox 1010 | antioxidant | 0.35 |
| Irgafos 168 | antioxidant | 0.35 |
| Aluminum Lake Colorant (Rocket red) | | 0.59 |

The material of Example 50 was prepared by premixing the components and melt blending them in an injection molding machine according to a preferred compounding method. The material was moderately tacky and deformable under slight, prolonged compressive force, had extremely slow rebound and was very stiff.

FORAL 85, manufactured by Hercules, is a glycerol ester of hydrogenated resin that is used primarily as a tackifier. In the preferred visco-elastic gel, FORAL 85 acts as a strengthening resin, and is believed to associate with and bind together the styrene domains. ETHOSPERSE LA-23, known generically in the art as Laureth-23, is used in the art as an emulsifier. Laureth-23 facilitates foaming in the gel materials preferred for use in the cushions of the present invention. The other components of Example 50 have been explained above.

EXAMPLE 51

| Component | Generic Class | Weight % of Total |
|---|---|---|
| Septon 4055 | A-B-A copolymer | 80.00 |
| Septon 4077 | A-B-A copolymer | 80.00 |
| Kraton G-1701 | A-B copolymer | 16.00 |
| Regalrez 1018 | plasticizing resin | 2688.00+ (see microsphere premix below) |
| Irganox 1010 | antioxidant | 4.80 |
| Irgafos 168 | antioxidant | 4.80 |
| Premixed microspheres | | 402.30 |
| PQ 6545 microspheres | added to increase rebound rate and decrease specific gravity | 11.76% of premix (47.31 g) |
| Regalrez 1018 | | 88.24% of premix (354.99 g) |

The material of Example 51 was prepared by preheating the REGALREZ® 1018, mixing all of the components except the microspheres together, and melt blending the components in a heated vessel at 295° F. under about one to about four pounds pressure for about two hours, according to a compounding method of the present invention. The mixture was then transferred to another vessel, which was heated to about 300° F., and the premixed microspheres and REGALREZ® 1018 were mixed in by hand.

The material was very tacky and readily deformable, had moderately slow rebound and was very soft. The specific gravity of the material of Example 51 was about 0.51.

Of the preceding sixteen examples (Examples 36–51), Applicant preferred the material of Example 51 because of its extreme softness and slow to moderate rebound rate. Applicant also liked the material of Example 50 because of its stiffness, but easy deformability under sustained pressure, and its extremely slow rate of reformation.

EXAMPLE 52

A visco-elastic material which includes from about one to about 30 weight percent of a triblock copolymer and about 70 to about 99 weight percent of a plasticizer, said weight percentages being based upon the total weight of the visco-elastic material. The visco-elastic material may also include up to about 2.5 weight percent of a primary antioxidant and up to about 2.5 weight percent of a secondary antioxidant, said weight percentages based upon the weight of the triblock copolymer.

Although the gel formulations referred to above are most preferred, there are numerous other preferred gels. For example, although they exhibit less desirable characteristics than the preferred gel cushioning media, the gel formulations of the following U.S. Patent Nos. are also useful in the cushions of the present invention: U.S. Pat. Nos. 5,334,646, issued in the name of John Y. Chen; 4,369,284, issued in the name of John Y. Chen; 5,262,468, issued in the name of John Y. Chen; 4,618,213, issued in the name of John Y. Chen; 5,336,708, issued in the name of John Y. Chen, each of which is incorporated by reference in its entirety. Other oil-extended polystyrene-poly(ethylene/butylene)-polystyrene gels can be used advantageously for the cushions of this invention. For example, the GLS Corporation of Cary, Ill. offers a gel in injection moldable pellet form under the designation G-6703 which is made with the ingredients of the gels mentioned above but with less plasticizing oil, and has a Shore A hardness of 3. Other preferred gels which may be used in the invention include PVC plastisol gels, silicone gels, and polyurethane gels.

PVC plastisol gels are well known in the art, and are exemplified by artificial worms and grubs used in fishing. A description of a typical PVC plastisol gel is given in U.S. Pat. No. 5,330,249 issued in the name of Weber et al. on Jul. 19, 1994, which is hereby incorporated by reference. PVC plastisol gels are not the most preferred because their strength is not as high for a given gel rigidity as the preferred gel media or even the gels of the Chen patents, but they are acceptable for use in the invention.

Silicone gels are also well known in the art, and are available from many sources including GE Silicones and Dow Corning. From a performance standpoint, silicone gels are excellent for use in this invention. However, the cost of silicone gels is many times higher than that of the most preferred gels.

Polyurethane gels are also well known in the art, and are available from a number of companies including Bayer Aktiengesellschaft in Europe. For reference, the reader is directed to U.S. Pat. No. 5,362,834 issued in the name of Schapel et al. on Nov. 8, 1994, which is hereby incorporated by reference, for more information concerning polyurethane gels. Like silicone gels, polyurethane gels are excellent from a performance standpoint, but are many times more expensive than the most preferred gels.

Foam rubber and polyurethane foams may also be useful as cushioning media in the cushioning elements of the present invention, so long as they exhibit gel-like buckling behavior. Preferably, in order to exhibit desired buckling and elastomeric or visco-elastomeric gel-like behavior, column walls formed from polyurethane foams and foam rubbers are very thin. Alternatively, thicker column walls formed from polyurethane foams and foam rubbers may also exhibit the desired buckling and gel-like characteristics with appropriate column shapes and column pattern configurations. Foam rubbers and polyurethane foams are useful in the cushioning element of the present invention if columns occupy about one-half or more of the cushion volume. Cushion volume is defined by the top and bottom surfaces and the perimeter of the cushion.

C. Method for Making the Cushions

There are several ways in which the cushion can be manufactured.

1. Injection Molding

The invented cushions can be injection molded by standard injection molding techniques. For example, a cavity mold is created with cores inside the cavity. The gel ingredients are heated while stirring, which turns the gel into a liquid. The liquid is injected into the cavity and flows around the cores. The material is allowed to cool, which causes it to solidify. When the mold is parted, the cores pull out of the solidified gel and leave the hollow columns. The cushion is removed from the cavity, the mold is closed, and liquid is injected to form the next cushion, this process being repeated to manufacture the desired quantity of cushioning elements. This results in very inexpensive cushioning elements because the preferred gel is inexpensive and the manufacturing process is quick and requires very little labor.

Figure 4:
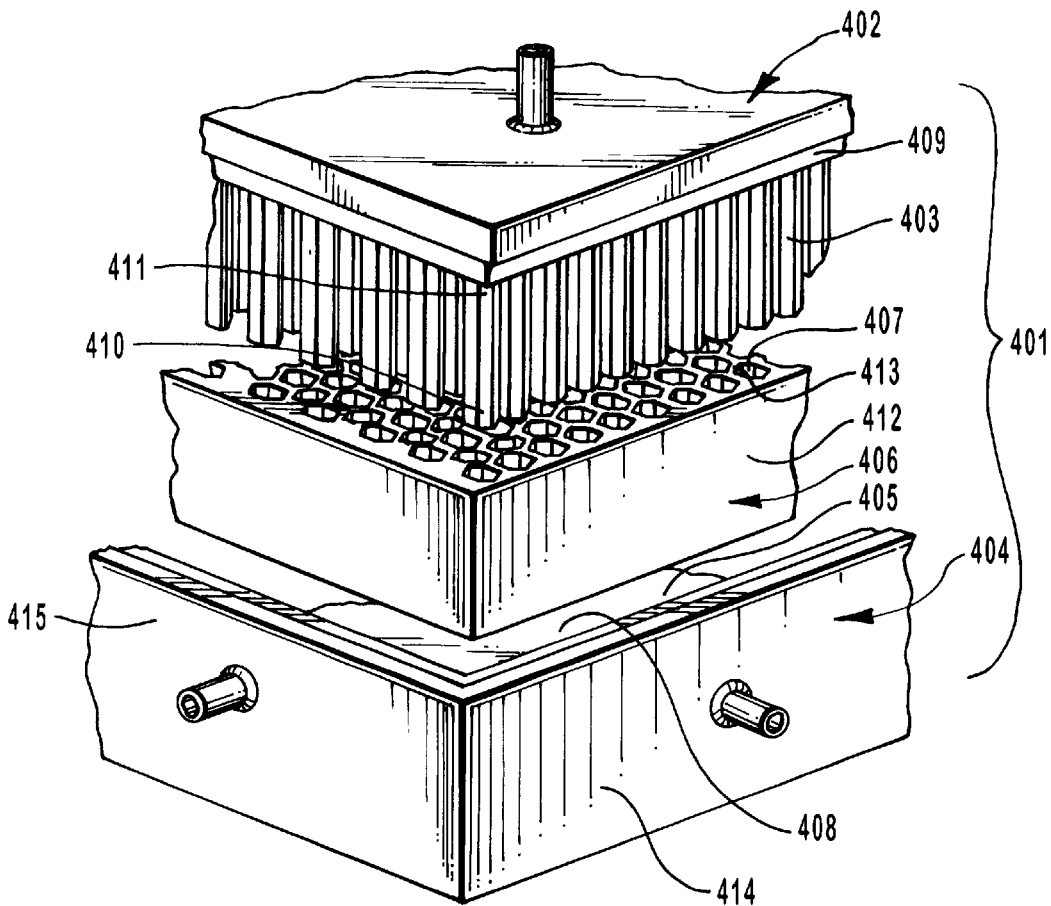
FIG. 4 depicts a mold which may be used to manufacture the invented cushion.

Referring to FIG. 4, an example mold in use is depicted. The mold assembly 401 has a first mold half 401 and a second mold half 404. The second mold half 404 has a cavity 408 and a base plate 405 at the bottom of the cavity 408. It also has side walls 414 and 415. The first mold half 402 has a core mounting plate 409 and a plurality of cores 403 mounted on it in any desired spacing and arrangement. The cores 403 may be of any desired shape, such as triangular, square, pentagonal, n-sided (where n is any integer), round, oval or of any other configuration in cross section in order to yield a molded cushioning element 406 of the desired configuration. The cores 403 could also be tapered from a more narrow dimension (reference numeral 410) at their end distal from the core mounting plate 409 to a wider dimension (reference numeral 411) at their end proximal the core mounting plate. This would create a tapered column or tapered column walls so that the radial measurement of a column orthogonal to its longitudinal axis would be different at two selected different points on the longitudinal axis.

Alternatively, the cores 403 could be tapered from 410 to 411, stepped from 410 to 411 or configured otherwise to create a column of desired shape. Use of the hexagonal cores 403 depicted yields a cushioning element 406 with cushioning media 412 molded so that the column walls 413 form the hollow columns 407 in a hexagonal configuration.

When the first mold half 402 and second mold half 404 are brought together, core distal ends 410 abut the second mold half base plate 405. This prevents liquid cushioning media from flowing between the base plate 405 and the core distal ends 410 in order to achieve a cushioning element 406 which has hollow columns through which air can circulate. If the core distal ends 410 did not reach all the way to the base plate 408, then the columns 407 would be open at one end and closed at the other.

FIG. 5 depicts an alternative mold configuration. The mold assembly 501 includes first mold half 502 that includes a first core mounting plate 509 onto which a plurality of cores 503 are mounted in a desired configuration. The cores 503 each have a core proximal end proximal to the core mounting plate 509 and a core distal end 511 distal to the core mounting plate 509. The mold assembly 501 also includes a mold second half 504 which has a core mounting plate 505, side walls 512, and cores 508 each having a core proximal end 513 proximal to the core mounting plate 505 and a core distal end 514 distal to the core mounting plate. The second core half 504 also has a cavity 514 in which its cores 508 are found. The mold assembly 501 may be designed so that when the two mold halves are brought together the core distal ends abut the surface of their opposing core mounting plates. This produces a cushioning element 506 with hollow columns 507 that are open from one end to the other in order to maximize air circulation through the columns 507 and yieldability of the cushioning element 506. Alternatively, the mold assembly 501 may be designed so that the core distal ends do not contact the core mounting plates. This will result in a cushion having a cross sectional appearance like that depicted in FIG. 6, where the columns are shorter in length than the thickness of the cushioning element, so the columns are closed at one end.

2. Extrusion

The invented cushioning elements may also be manufactured by typical extrusion processes. If extrusion is used, hot liquid gel is forced through an extrusion die. The die has metal rods situated to obstruct the path of the gel in some locations so that the gel is forced through the die in a pattern resembling the desired shape of the finished cushioning element. Thus the die, having an aperture, an aperture periphery, and forming rods within the aperture has an appearance similar to that of the desired cushioning element except that the portions of the die that are solid will be represented by empty air in the finished cushion, and the portions of the die in the aperture that are unobstructed will represent gel in the finished cushioning element. Thus the rods of the die should be of the shape and size that the desired cushioning element is intended to be; the spacing of the rods should approximate the spacing of the columns that is desired in the finished cushioning element; and the shape and size of the aperture periphery should approximate the shape and size of the periphery of the desired cushioning element.

When gel is forced through the die, the liquid gel is cooled during its traverse through the die, causing it to solidify as it leaves the die. The gel is then cut at desired length intervals to form cushioning elements. Of course, cushioning elements so formed have hollow columns throughout their length, although the ends of the columns could be sealed as mentioned elsewhere herein. It is not expected, however, that extrusion is a practical method for manufacturing cushions with columns that vary in dimension along their length. The extruded cushioning element is very inexpensive because the both the cushioning media (i.e. the preferred gel) is inexpensive and the manufacturing process is highly automated so that labor requirements are very low.

Figure 41:
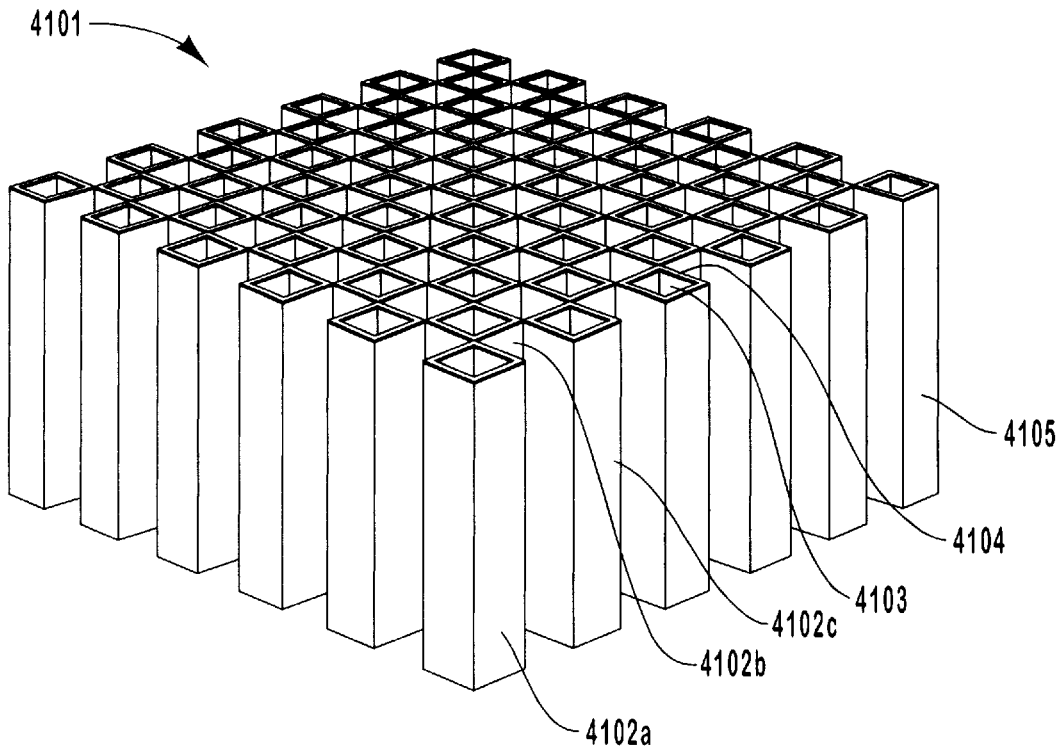
FIG. 41 depicts an embodiment of a cushioning element according to the present invention, wherein a plurality of tubes are bonded together to form the cushion.

Alternatively, a single tube may be extruded, then cut to a length that will form the appropriate cushion thickness. The tubes are then bonded together to form a cushioning element according to the present invention. Referring to FIG. 41, a preferred embodiment of a cushion 4101 which is made from bonded tubes 4102a, 4102b, 4102c, etc. is shown. Each tube includes a hollow column 4103 formed by a column wall 4104. Preferably, column wall 4104 is made from a gel cushioning medium 4105, such as the preferred elastomeric or visco-elastomeric materials for use in the cushions of the present invention.

Figure 42:
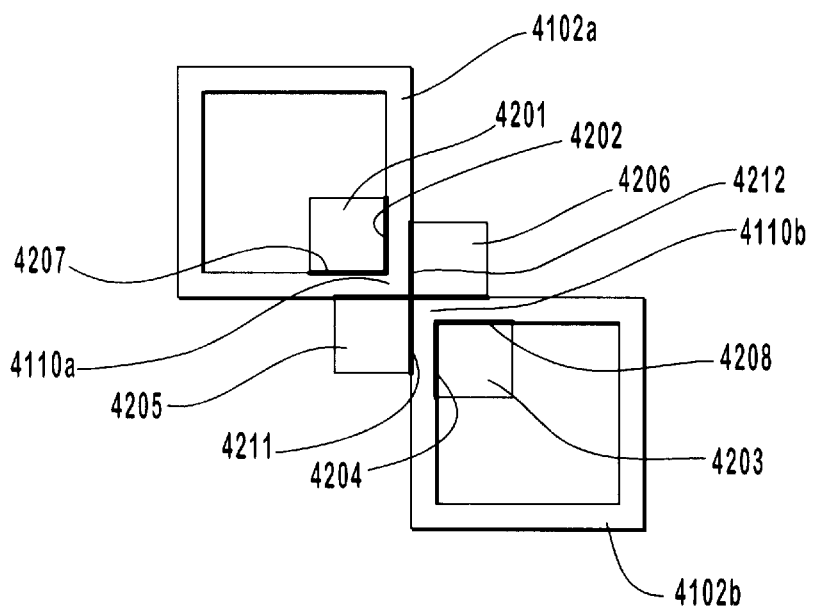
FIG. 42 depicts a method for bonding the individual tubes of FIG. 41 together to form the cushioning element shown therein.

FIG. 42 illustrates an example of a preferred method for bonding two tubes 4102a and 4102b together. Heating cores 4201 and 4203, which preferably include a heating edge 4202 and 4204, respectively, are positioned in tubes 4102*a* and 4102*b* within corners 4110*a* and 4110*b*, respectively, such that edges 4202 and 4204 abut the inner surface of the corners. Preferably, cores 4201 and 4203 hold the outer surface of corners 4110*a* and 4110*b* against one another. Preferably, securing cores 4205 and 4206 are positioned in each of the two inner corners formed by tubes 4102*a* and 4102*b* to secure corners 4110*a* and 4110*b* from sliding side-to-side in relation to one another. Preferably, heating edges 4202 and 4204 are heated to a temperature sufficient to melt cushioning medium 4105, but not to a temperature which would burn the material. As heating edges 4202 and 4204 are heated to a desirable temperature, the cushioning medium located in corners 4110*a* and 4110*b* melts. Preferably, heating edges 4202 and 4204 remain heated until all of the material located at corners 4110*a* and 4110*b* becomes molten and fuses tubes 4102*a* and 4102*b* together. Heating edges 4202 and 4204 and corners 4110*a* and 4110*b* are then cooled. Preferably, heating edges 4202 and 4204 are each covered with a non-stick surface 4207 and 4208, respectively. Similarly, securing cores 4205 and 4206 also have non-stick surfaces 4211 and 4212. The non-stick surfaces prevent the securing cores 4205 and 4206 and heating edges 4202 and 4204 of heating cores 4201 and 4203 from sticking to the cushioning medium located at corners 4110*a* and 4110*b* as the medium becomes molten. A preferred non-stick surface is teflon paper. Cores 4201, 4203, 4205 and 4206 are then removed from tubes 4102*a* and 4102*b*.

3. Casting

Another manufacturing process by which the invented cushioning element can be made is by generally known casting technology. In order to cast the invented cushioning element, hot liquid gel (or other cushioning media) is poured into an open cavity, and an assembly of metal rods is pushed into the liquid. The rods will form the columns of the finished product. The liquid flows between the metal rods, cools and solidifies. The metal rods are then removed, leaving the hollow portions of the columns, and the cushion is removed from the cavity. A vibrator may be used to vibrate the cavity to facilitate the flow of the liquid between the rods if needed.

Casting is a more labor intensive manufacturing method than injection molding or extrusion, but the tooling is generally less expensive, especially for large cushions. This is the preferred method of making very large cushions, such as king-size bed mattresses, since the size of such cushions is greater than that which can be manufactured using injection molding or extrusion methods.

The reader should note that any other manufacturing method may be used which results in a cushioning element having the general configuration of or achieving the object of this invention. Such other methods may include but are not limited to rotational molding of a cushioning media such as a hot liquid gel, and vacuum forming of sheets of a cushioning media such as gel.

While the present invention has been described and illustrated in conjunction with a number of specific embodiments, those skilled in the art will appreciate that variations and modifications may be made without departing from the principles of the invention as herein illustrated, described, and claimed.

The present invention may be embodied in other specific forms without departing from its spirit or essential characteristics. The described embodiments are to be considered in all respects as only illustrative, and not restrictive. The scope of the invention is, therefore, indicated by the appended claims, rather than by the foregoing description. All changes which come within the meaning and range of equivalency of the claims are to be embraced within their scope.

What is claimed is:

1. A yieldable cushioning element that includes a flexible, resilient, gel cushioning media having shape memory and being substantially solid and non-flowable at temperatures below 130 degrees Fahrenheit, the cushioning element comprising:

a quantity of gel cushioning medium formed to have a top, a bottom, and an outer periphery, said cushioning medium being compressible so that it will deform under the compressive force of a cushioned object, a plurality of hollow columns formed in said cushioning medium, each of said columns having a longitudinal axis along its length, each of said columns having a column wall which defines a column interior, and each of said columns having two ends;

wherein the cushioning element is adapted to have a cushioned object placed in contact with said top;

wherein each of said column ends is positioned at two different points of said column axis;

wherein at least one of said columns is positioned within said cushioning medium such that said column axis is positioned generally parallel to the direction of a compressive force exerted on the cushioning element by a cushioned object in contact with said cushioning medium; and wherein at least one of said column walls is capable of buckling beneath a protuberance that is located on the cushioned object.

2. A yieldable cushioning element as recited in claim 1, wherein at least one other of said columns is positioned within said cushioning medium such that said column axis is positioned generally non-parallel to the direction of a compressive force exerted on the cushioning element by the cushioned object in contact with said cushioning medium.

3. A yieldable cushioning element as recited in claim 1, wherein at least one of said column ends of at least one of said columns is open to said column interior.

4. A yieldable cushioning element as recited in claim 1, wherein both of said column ends of at least one of said columns is open to said column interior.

5. A yieldable cushioning element as recited in claim 4, wherein said column interior is hollow so that air may pass through said column to one of said column ends to ventilate a cushioned object in contact with said one column end.

6. A yieldable cushioning element as recited in claim 1, wherein said gel cushioning medium is selected from the group consisting of gelatinous elastomers and gelatinous visco-elastomers.

7. A yieldable cushioning element as recited in claim 1, wherein said cushioning medium generally retains its structure at normal useable temperatures of the cushioning element.

8. A yieldable cushioning element as recited in claim 1, wherein said cushioning medium does not escape from a puncture on said cushioning element.

9. A yieldable cushioning element as recited in claim 1, wherein a cross section of one of said columns taken orthogonal to said longitudinal axis of said column has a shape selected from the group consisting of triangular, square, rectangular, pentagonal, heptagonal, octagonal, round, oval, and n-sided polygonal where n is an integer.

10. A yieldable cushioning element as recited in claim 1, wherein said cushioning element has shape memory so that when a cushioned object is removed from contact with the cushioning element, the cushioning element has a tendency to return to a shape that approximates the shape of the cushioning element before the cushioning element and the cushioned object came into contact with each other.

11. A yieldable cushioning element as recited in claim 1, wherein the cushioning element is configured to have a low overall thermal mass and a low rate of thermal transfer, compared to the rate of thermal transfer of solid gel cushioning elements, in order to provide a comfortable cushioning element.

12. A yieldable cushioning element as recited in claim 1, wherein at least one of said columns has a column interior that has a greater measurement orthogonal to the longitudinal axis of that column at a first point on the longitudinal axis of the column than at a second point on said longitudinal axis.

13. A yieldable cushioning element as recited in claim 12, wherein said column is tapered between the first of said column ends and the second of said column ends.

14. A yieldable cushioning element as recited in claim 12, wherein said column is stepped between the first of said column ends and the second of said column ends.

15. A yieldable cushioning element as recited in claim 1, wherein both ends of at least one column are sealed so that said column interior is not in direct fluid or gas communication with a region outside of said column interior.

16. A yieldable cushioning element as recited in claim 15, wherein said column interior contains a quantity of fluid cushioning medium therein.

17. A cushioning element as recited in claim 1, wherein at least one of said columns has a firmness protrusion located at one of said column ends, said firmness protrusion being adapted to provide support within said column when said column buckles under a compressive force so that the cushioning element can readily yield in the vicinity of said column under a cushioned object until the cushioned object begins to compress said firmness protrusion, whereupon said firmness protrusion retards further movement of the cushioned object into the cushioning element.

18. A yieldable cushioning element as recited in claim 1, wherein at least one of said columns is adapted to buckle by having a portion of its column wall bulge outward away from the column interior.

19. A yieldable cushioning element as recited in claim 1, wherein at least one of said columns is adapted to buckle by having a portion of its column wall bulge inward toward the column interior.

20. A yieldable cushioning element as recited in claim 1, wherein at least one of said columns is adapted to yield along its longitudinal axis by buckling of its column wall.

21. A yieldable cushioning element as recited in claim 1, wherein the cushioning element has a total volume contained within the boundaries of the cushioning element top, bottom and outer periphery and wherein said cushioning element total volume is occupied by not more than about 50% by volume of cushioning medium.

22. A yieldable cushioning element as recited in claim 1, wherein said cushioning medium has a Shore A hardness of less than about 15.

23. A yieldable cushioning element as recited in claim 1, wherein said cushioning medium has a Shore A hardness of less than about 3.

24. A yieldable cushioning element as recited in claim 1, wherein said cushioning medium comprises a triblock copolymer and a plasticizer.

25. A yieldable cushioning element as recited in claim 24, wherein said cushioning medium comprises about one part by weight triblock copolymer and about one to about 25 parts by weight plasticizer, based on the total weight of the cushioning medium.

26. A yieldable cushioning element as recited in claim 25, wherein said copolymer is selected from the group consisting of polystyrene-poly(ethylene/butylene)-polystyrene, polystyrene-polyethylene-polystyrene, medium includes a blowing agent such as SAFOAM® FP-40, which is added to the non-liquid polystyrene-polypropylene-polystyrene, polystyrene-polybutadiene-polystyrene, polystyrene-polybutylene-polystyrene, polystyrene-polyisoprene-polystyrene, polystyrene-poly(ethylene/propylene)-polystyrene, polystyrene-poly(isoprene+butadiene)-polystyrene and polystyrene-poly(ethylene/butylene+ethylene/propylene)-polystyrene.

27. A yieldable cushioning element as recited in claim 25, wherein said copolymer is polystyrene-hydrogenated poly(isoprene+butadiene)-polystyrene.

28. A yieldable cushioning element as recited in claim 25, wherein said copolymer is polystyrene-poly(ethylene/butylene)-polystyrene.

29. A yieldable cushioning element as recited in claim 1, wherein said cushioning medium comprises a gelatinous visco-elastomer.

30. A yieldable cushioning element as recited in claim 29, and further comprising a cover.

31. A yieldable cushioning element as recited in claim 1, wherein said cushioning medium is a lightweight flowable cushioning material contained within an elastomeric cover.

32. A yieldable cushion comprising:
a cushioning element having a top, a bottom, a center and an outer periphery, said cushioning element comprising a quantity of gel cushioning media and a plurality of contiguous, adjacent hollow columns located within said cushioning media, said columns each having a column interior, a column wall, and a longitudinal axis,
wherein a plurality of said columns are positioned such that said column axis is generally parallel to a compressive force exerted on said top of said cushioning element by a cushioned object in contact therewith;
wherein at least one other of said columns is positioned such that said longitudinal axis of said other column is generally non-parallel to a compressive force exerted on said top of said cushioning element by a cushioned object in contact therewith;
wherein said cushion is responsive to the compressive force exerted thereon; and
wherein said yieldability of the cushion results from said cushioning media being compressible and from said columns being bucklable, so that the cushion is able to substantially conform to the shape of the cushioned object.

33. A yieldable cushioning element that includes a flexible, resilient, gel cushioning media having shape memory and being substantially solid and non-flowable at temperatures below 130 degrees Fahrenheit, the cushioning element comprising:
a quantity of cushioning medium formed to have a top, a bottom, and an outer periphery, said cushioning medium being deformable so that it will deform under the compressive force of a cushioned object,
a plurality of hollow columns formed in said cushioning medium, each of said columns having a longitudinal axis along its length, each of said columns having a column wall which defines a column interior, and each of said columns having two ends;

wherein the cushioning element is adapted to have a cushioned object placed directly or indirectly in contact with said top;

wherein each of said column ends is positioned at two different points of said column axis;

wherein a plurality of said columns are positioned within said cushioning medium such that said column axes are positioned generally parallel to the direction of a compressive force exerted on the cushioning element by a cushioned object in contact with said cushioning medium;

wherein at least one of said column walls is capable of buckling beneath a protuberance that is located on the cushioned object; and wherein said cushioning medium exhibits elastomeric properties.

34. A yieldable cushioning element that includes a flexible, resilient, gel cushioning media having shape memory and being substantially solid and non-flowable at temperatures below 130 degrees Fahrenheit, the cushioning element comprising:

a quantity of cushioning medium formed to have a top, a bottom, and an outer periphery, said cushioning medium being deformable so that it will deform under the compressive force of a cushioned object, a plurality of hollow columns formed in said cushioning medium, each of said columns having a longitudinal axis along its length, each of said columns having a column wall which defines a column interior, and each of said columns having two ends;

wherein the cushioning element is adapted to have a cushioned object placed directly or indirectly in contact with said top;

wherein each of said column ends is positioned at two different points of said column axis;

wherein a plurality of said columns are positioned within said cushioning medium such that said column axes are positioned generally parallel to the direction of a compressive force exerted on the cushioning element by a cushioned object in contact with said cushioning medium;

wherein at least one of said column walls is capable of buckling beneath a protuberance that is located on the cushioned object; and wherein said cushioning medium exhibits visco-elastomeric properties.

35. A yieldable cushioning element comprising:

a quantity of a first cushioning medium formed to have a top, a bottom, and an outer periphery and a hollow center, a quantity of a second cushioning medium disposed within said first cushioning medium, said second cushioning medium being deformable so that it will deform under the compressive force of a cushioned object, a plurality of hollow columns formed in said first cushioning medium, each of said columns having a longitudinal axis along its length, each of said columns having a column wall which defines a column interior, and each of said columns having two ends;

wherein the cushioning element is adapted to have a cushioned object placed directly or indirectly in contact with said top;

wherein each of said column ends is positioned at two different points of said column axis;

wherein a plurality of said columns are positioned within the cushion such that said column axes are positioned generally parallel to the direction of a compressive force exerted on the cushioning element by a cushioned object in contact with the cushion;

wherein at least one of said column walls is capable of buckling beneath a protuberance that is located on the cushioned object; and wherein said second cushioning medium is a gel cushioning medium.

36. A yieldable cushioning element comprising:

a quantity of gel cushioning medium formed to have a top, a bottom, and an outer periphery, said cushioning medium being deformable so that it will deform under the compressive force of a cushioned object, a coating material adhered to said top, said bottom and said outer periphery, a plurality of hollow columns formed in said cushioning medium, each of said columns having a longitudinal axis along its length, each of said columns having a column wall which defines a column interior, and each of said columns having two ends;

wherein the cushioning element is adapted to have a cushioned object placed directly or indirectly in contact with said top;

wherein each of said column ends is positioned at two different points of said column axis;

wherein a plurality of said columns are positioned within said cushioning medium such that said column axes are positioned generally parallel to the direction of a compressive force exerted on the cushioning element by a cushioned object in contact with said cushioning medium; and wherein at least one of said column walls is capable of buckling beneath a protuberance that is located on the cushioned object.

37. A yieldable cushioning element comprising:

a quantity of gel cushioning medium formed to have a top, a bottom, and an outer periphery, said cushioning medium being deformable so that it will deform under the compressive force of a cushioned object, a first plurality of hollow columns formed in said cushioning medium, each of said first columns having a first longitudinal axis along its length, each of said first columns having a first column wall which defines a first column interior, and each of said first columns having two ends;

a second plurality of hollow columns formed in said cushioning medium, each of said second columns having a second longitudinal axis along its length, each of said second columns having a second column wall which defines a second interior, and each of said second columns having two ends;

wherein the cushioning element is adapted to have a cushioned object placed directly or indirectly in contact with said top;

wherein each of said first column ends is positioned at two different points of said column axis;

wherein a plurality of said first columns are positioned within said cushioning medium such that said first column axes are positioned generally parallel to the direction of a compressive force exerted on the cushioning element by a cushioned object in contact with said cushioning medium;

wherein a plurality of said second columns are positioned within said cushioning medium such that said second column axes are positioned generally parallel to one another and generally non-parallel to said first column axes; and wherein at least one of said first column walls is capable of buckling beneath a protuberance that is located on the cushioned object.

38. A yieldable cushioning element as recited in claim 37, wherein at least one of said first columns intersects at least one of said second columns.

* * * * *

US006526527C1

(12) EX PARTE REEXAMINATION CERTIFICATE (6237th)
United States Patent
Pearce

(10) Number: US 6,026,527 C1
(45) Certificate Issued: *May 27, 2008

(54) GELATINOUS CUSHIONS WITH BUCKLING COLUMNS

(75) Inventor: Tony M. Pearce, Alpine, UT (US)

(73) Assignee: Edizone, LC, Alpine, UT (US)

Reexamination Request:
No. 90/007,659, Aug. 5, 2005
No. 90/008,509, Feb. 27, 2007

Reexamination Certificate for:
Patent No.: 6,026,527
Issued: Feb. 22, 2000
Appl. No.: 08/968,750
Filed: Aug. 13, 1997

(*) Notice: This patent is subject to a terminal disclaimer.

Related U.S. Application Data

(63) Continuation-in-part of application No. 08/601,374, filed on Feb. 14, 1996, now Pat. No. 5,749,111.

(51) Int. Cl.
*A47C 27/00* (2006.01)
*A47C 27/14* (2006.01)

(52) U.S. Cl. .................. 5/564; 5/909; 5/948; 428/137; 428/138

(58) Field of Classification Search .................. 5/652, 5/652.1, 653, 740, 948, 909, 703, 420; 428/137; 36/35 R
See application file for complete search history.

(56) References Cited

U.S. PATENT DOCUMENTS

| 4,179,826 A | 12/1979 | Davidson |
| 5,172,494 A | 12/1992 | Davidson |
| 5,336,708 A | 8/1994 | Chen |
| 5,444,881 A | 8/1995 | Landi et al. |
| 5,633,286 A | 5/1997 | Chen |
| 6,026,527 A | 2/2000 | Pearce |

OTHER PUBLICATIONS

Random House Webster's Unabridged Dictionary, V3.0 for 32bit Windows system, Random House, Inc., 1999.

Seely, Fred B. and Smith, James O., *Advanced Mechanics of Materials*, 2nd Ed., John Wiley & Sons, Inc., 1952, pp. 585–590.

*Primary Examiner*—Matthew C. Graham

(57) ABSTRACT

A cushioning element that has a number of substantially parallel elongate columns which buckle under an appropriate load. The cushioning element may be formed from a soft, easily deformable elastic or visco-elastic cushioning media. As a force is exerted against the cushioning element generally parallel to a column, the cushioning media may compress, and eventually the walls of the column may buckle. This equalizes pressure across the contact area of the object being cushioned.

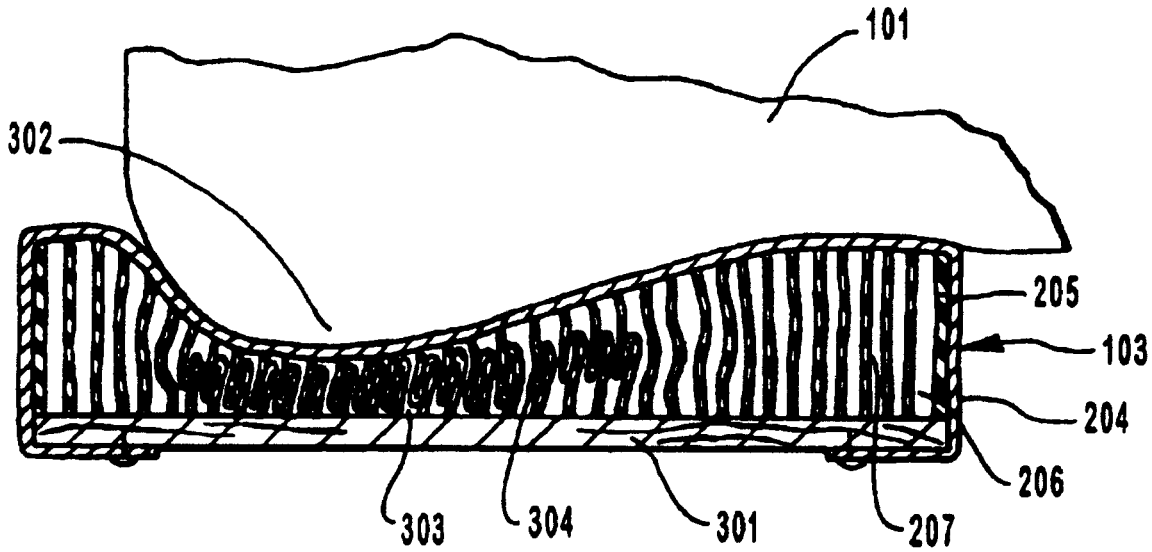

EX PARTE REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1–38 is confirmed.

* * * * *

(12) EX PARTE REEXAMINATION CERTIFICATE (7456th)

United States Patent
Pearce

(10) Number: US 6,026,527 C2
(45) Certificate Issued: Apr. 13, 2010

(54) GELATINOUS CUSHIONS WITH BUCKLING COLUMNS

(75) Inventor: Tony M. Pearce, Alpine, UT (US)

(73) Assignee: Edizone, LC, Alpine, UT (US)

Reexamination Request:
No. 90/009,003, Jan. 25, 2008

Reexamination Certificate for:
Patent No.: 6,026,527
Issued: Feb. 22, 2000
Appl. No.: 08/968,750
Filed: Aug. 13, 1997

Reexamination Certificate C1 6,026,527 issued May 27, 2008

Related U.S. Application Data

(63) Continuation-in-part of application No. 08/601,374, filed on Feb. 14, 1996, now Pat. No. 5,749,111.

(51) Int. Cl.
*A47C 27/00* (2006.01)
*A47C 27/14* (2006.01)

(52) U.S. Cl. .................. 5/564; 5/909; 5/948; 428/137; 428/138

(58) Field of Classification Search .............. 5/654, 5/909, 948; 427/137, 138
See application file for complete search history.

(56) References Cited

U.S. PATENT DOCUMENTS

| 2,617,751 | A | * | 11/1952 | Bickett ................. 428/166 |
| 2,887,425 | A | * | 5/1959 | Holland ................ 156/197 |
| 3,043,731 | A | * | 7/1962 | Hill .................... 428/137 |
| 5,172,494 | A | * | 12/1992 | Davidson .............. 36/35 R |
| 5,336,708 | A | * | 8/1994 | Chen .................. 524/474 |
| 5,444,881 | A | * | 8/1995 | Landi et al. ............ 5/708 |
| 5,633,286 | A | * | 5/1997 | Chen .................. 524/474 |

FOREIGN PATENT DOCUMENTS

WO 88/10339 * 12/1988

OTHER PUBLICATIONS

Handbook of Thermoplastic Elastomers, Van Nostrand Reinhold Co., 2na Edition, 1988 (title), pp. 26–28.*

* cited by examiner

*Primary Examiner*—Matthew C. Graham

(57) ABSTRACT

A cushioning element that has a number of substantially parallel elongate columns which buckle under an appropriate load. The cushioning element may be formed from a soft, easily deformable elastic or visco-elastic cushioning media. As a force is exerted against the cushioning element generally parallel to a column, the cushioning media may compress, and eventually the walls of the column may buckle. This equalizes pressure across the contact area of the object being cushioned.

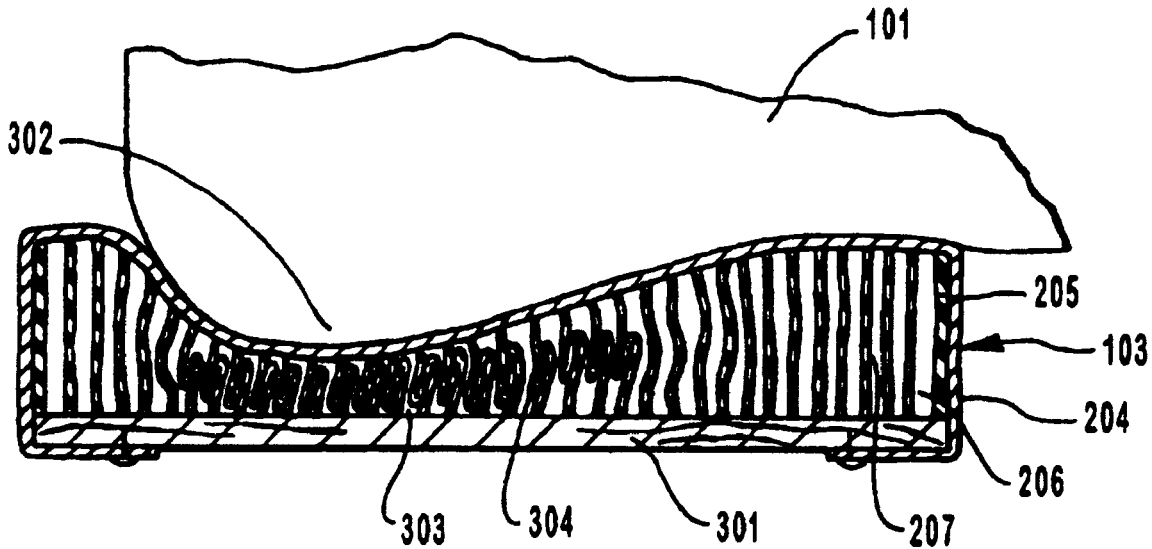

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 1, 2, and 32–37 are determined to be patentable as amended.

Claims 3–31 and 38, dependent on an amended claim, are determined to be patentable.

New claims 39–41 are added and determined to be patentable.

1. A yieldable cushioning element that includes a flexible, resilient, gel cushioning media having shape memory and being substantially solid and non-flowable at temperatures below 130 degrees Fahrenheit, the cushioning element comprising:

a quantity of gel cushioning medium formed to have a top, a bottom, and an outer periphery, said cushioning medium being compressible so that it will deform under the compressive force of a cushioned object, a plurality of hollow columns formed in said cushioning medium, [each of said columns having a longitudinal axis along its length,] each of said columns having a column wall which defines a column interior, and each of said columns having two ends;

wherein the cushioning element is adapted to have a cushioned object placed in contact with said top;

*wherein each of said columns has a straight longitudinal axis extending along its length from said top to said bottom of said quantity of gel cushioning medium in an undeformed condition;* wherein each of said column ends is positioned at two different points of said [column] *longitudinal* axis;

wherein at least one of said columns is positioned within said cushioning medium such that said [column] *longitudinal* axis is positioned generally parallel to the direction of a compressive force exerted on the cushioning element by a cushioned object in contact with said cushioning medium; and wherein at least one of said column walls is capable of buckling beneath a protuberance that is located on the cushioned object.

2. A yieldable cushioning element as recited in claim 1, wherein at least one other of said columns is positioned within said cushioning medium such that said [column] *longitudinal* axis *of said one other of said columns* is positioned generally non-parallel to the direction of [a] *said* compressive [force] *load* exerted on the cushioning element by the cushioned object in contact with said cushioning medium.

32. A yieldable cushion comprising:

a cushioning element having a top, a bottom, a center and an outer periphery, said cushioning element comprising a quantity of gel cushioning media and a plurality of contiguous, adjacent hollow columns located within said cushioning media, said columns each having a column [interior,] *interior and* a column wall, [and a longitudinal axis,]

*wherein each column of a plurality of said columns has a straight longitudinal axis extending along its length from said top to said bottom of said quantity of gel cushioning media in an undeformed condition;* wherein [a] *said* plurality of said columns are positioned such that said [column] *longitudinal* axis is generally parallel to a compressive force exerted on said top of said cushioning element by a cushioned object in contact therewith;

wherein at least one other of said columns is positioned such that said longitudinal axis of said other column is generally non-parallel to a compressive force exerted on said top of said cushioning element by a cushioned object in contact therewith;

wherein said cushion is responsive to the compressive force exerted thereon; and wherein said yieldability of the cushion results from said cushioning media being compressible and from said columns being bucklable, so that the cushion is able to substantially conform to the shape of the cushioned object.

33. A yieldable cushioning element that includes a flexible, resilient, gel cushioning media having shape memory and being substantially solid and non-flowable at temperatures below 130 degrees Fahrenheit, the cushioning element comprising:

a quantity of cushioning medium formed to have a top, a bottom, and an outer periphery, said cushioning medium being deformable so that it will deform under the compressive force of a cushioned object, a plurality of hollow columns formed in said cushioning medium, [each of said columns having a longitudinal axis along its length,] each of said columns having a column wall which defines a column interior, and each of said columns having two ends;

*wherein each of said columns has a straight longitudinal axis extending along its length from said top to said bottom of said quantity of cushioning medium in an undeformed condition;* wherein the cushioning element is adapted to have a cushioned object placed directly or indirectly in contact with said top;

wherein each of said colunm ends is positioned at two different points of said [column] *longitudinal* axis;

wherein a plurality of said columns are positioned within said cushioning medium such that said column *longitudinal* axes are positioned generally parallel to the direction of a compressive force exerted on the cushioning element by a cushioned object in contact with said cushioning medium;

wherein at least one of said column walls is capable of buckling beneath a protuberance that is located on the cushioned object; and wherein said cushioning medium exhibits elastomeric properties.

34. A yieldable cushioning element that includes a flexible, resilient, gel cushioning media having shape memory and being substantially solid and non-flowable at temperatures below 130 degrees Fahreheit, the cushioning element comprising:

a quantity of cushioning medium formed to have a top, a bottom, and an outer periphery, said cushioning medium being deformable so that it will deform under the compressive force of a cushioned object, a plurality of hollow columns formed in said cushioning medium, [each of said columns having a longitudinal axis along its length,] each of said columns having a column wall which defines a column interior, and each of said columns having two ends;

*wherein each of said columns has a straight longitudinal axis extending along its length from said top to said bottom of said quantity of cushioning medium in an undeformed condition;* wherein the cushioning element is adapted to have a cushioned object placed directly or indirectly in contact with said top;

wherein each of said column ends is positioned at two different points of said [column] *longitudinal* axis;

wherein a plurality of said columns [are] *is* positioned within said cushioning medium such that said column *longitudinal* axes are positioned generally parallel to the direction of a compressive force exerted on the cushioning element by a cushioned object in contact with said cushioning medium;

wherein at least one of said column walls is *configured to compress elastically without buckling while said compressive force remains below a buckling threshold force and* [capable of buckling] *to buckle* beneath a protuberance that is located on the cushioned object *when said compressive force exceeds said buckling threshold force;* and wherein said cushioning medium exhibits visco-elastomeric properties.

35. A yieldable cushioning element comprising:

a quantity of a first cushioning medium formed to have a top, a bottom, and an outer periphery and a hollow center, a quantity of a second cushioning medium disposed within said first cushioning medium, said second cushioning medium being deformable so that it will deform under the compressive force of a cushioned object, a plurality of hollow columns formed in said first cushioning medium, [each of said columns having a longitudinal axis along its length,] each of said columns having a column wall which defines a column interior, and each of said columns having two ends;

*wherein each of said columns has a straight longitudinal axis extending along its length from said top to said bottom of said first cushioning medium in an undeformed condition;* wherein the cushioning element is adapted to have a cushioned object placed directly or indirectly in contact with said top;

wherein each of said column ends is positioned at two different points of said [column] *longitudinal* axis;

wherein a plurality of said columns are positioned within the cushion such that said column *longitudinal* axes are positioned generally parallel to the direction of a compressive force exerted on the cushioning element by a cushioned object in contact with the cushion;

wherein at least one of said column walls is capable of buckling beneath a protuberance that is located on the cushioned object; and wherein said second cushioning medium is a gel cushioning medium.

36. A yieldable cushioning element comprising:

a quantity of gel cushioning medium formed to have a top, a bottom, and an outer periphery, said cushioning medium being deformable so that it will deform under the compressive force of a cushioned object, a coating material adhered to said top, said bottom and said outer periphery, a plurality of hollow columns formed in said cushioning medium, [each of said columns having a longitudinal axis along its length,] each of said columns having a column wall which defines a column interior, and each of said columns having two ends;

*wherein each of said columns has a straight longitudinal axis extending along its length from said top to said bottom of said quantity of gel cushioning medium in an undeformed condition;* wherein the cushioning element is adapted to have a cushioned object placed directly or indirectly in contact with said top;

wherein each of said column ends is positioned at two different points of said [column] *longitudinal* axis;

wherein a plurality of said columns [are] *is* positioned within said cushioning medium such that said column *longitudinal* axes are positioned generally parallel to the direction of a compressive force exerted on the cushioning element by a cushioned object in contact with said cushioning medium; and wherein at least one of said column walls is capable of buckling beneath a protuberance that is located on the cushioned object.

37. A yieldable cushioning element comprising:

a quantity of gel cushioning medium formed to have a top, a bottom, and an outer periphery, said cushioning medium being deformable so that it will deform under the compressive force of a cushioned object, a first plurality of hollow columns formed in said cushioning medium, each of said first columns having a first longitudinal axis along its length, each of said first columns having a first column wall which defines a first column interior, and each of said first columns having two ends;

a second plurality of hollow columns formed in said cushioning medium, each of said second columns having a second longitudinal axis along its length, each of said second columns having a second column wall which defines a second interior, and each of said second columns having two ends;

*wherein each of said first longitudinal axes is straight and extends along its length from said top to said bottom of said quantity of gel cushioning medium in an undeformed condition;* wherein the cushioning element is adapted to have a cushioned object placed directly or indirectly in contact with said top;

wherein each of said first column ends is positioned at two different points of said [column] *first longitudinal* axis;

wherein a plurality of said first columns are positioned within said cushioning medium such that said first [column] *longitudinal* axes are positioned generally parallel to the direction of a compressive force exerted on the cushioning element by a cushioned object in contact with said cushioning medium;

wherein a plurality of said second columns are positioned within said cushioning medium such that said second

[column] *longitudinal* axes are positioned generally parallel to one another and generally non-parallel to said first column axes *and said direction of said compressive force*; and wherein at least one of said first column walls is capable of buckling beneath a protuberance that is located on the cushioned object.

39. *The yieldable cushioning element of claim 1, wherein said column walls are configured to deform elastically and to compress without buckling in response to a compressive load exerted on the cushioning element by a cushioned object in contact with said top of said cushioning medium and to buckle beneath a protuberance that is located on the cushioned object as said compressive load exceeds a buckling threshold load.*

40. *The yieldable cushioning element of claim 33, wherein at least one of said column walls is configured to compress elastically without buckling while said compressive force remains below a buckling threshold force and to buckle beneath a protuberance that is located on the cushioned object when said compressive force exceeds said buckling threshold force.*

41. *The yieldable cushioning element of claim 36, wherein at least one of said column walls is configured to compress elastically without buckling while said compressive force remains below a buckling threshold force and to buckle beneath a protuberance that is located on the cushioned object when said compressive force exceeds said buckling threshold force.*

\* \* \* \* \*

US006026527C3

(12) EX PARTE REEXAMINATION CERTIFICATE (10613th)
United States Patent
Pearce

(10) Number: US 6,026,527 C3
(45) Certificate Issued: *Jun. 3, 2015

(54) GELATINOUS CUSHIONS WITH BUCKLING COLUMNS

(75) Inventor: Tony M. Pearce, Alpine, UT (US)

(73) Assignee: EDIZONE, LLC, Alpine, UT (US)

Reexamination Request:
No. 90/013,363, Oct. 7, 2014

Reexamination Certificate for:
Patent No.: 6,026,527
Issued: Feb. 22, 2000
Appl. No.: 08/968,750
Filed: Aug. 13, 1997

Reexamination Certificate C1 6,026,527 issued May 27, 2008

Reexamination Certificate C2 6,026,527 issued Apr. 13, 2010

(*) Notice: This patent is subject to a terminal disclaimer.

Related U.S. Application Data

(63) Continuation-in-part of application No. 08/601,374, filed on Feb. 14, 1996, now Pat. No. 5,749,111.

(51) Int. Cl.
A47C 4/54 (2006.01)
A47C 27/14 (2006.01)
A47C 4/00 (2006.01)
A47C 27/08 (2006.01)
A43B 13/04 (2006.01)
B29C 44/58 (2006.01)
C08K 5/00 (2006.01)
A47C 27/15 (2006.01)
B29C 47/00 (2006.01)
A47C 7/02 (2006.01)
C08L 51/00 (2006.01)
B29C 44/50 (2006.01)
C08L 53/02 (2006.01)
B29C 47/12 (2006.01)
C08K 5/01 (2006.01)
B29L 31/60 (2006.01)
B29C 47/88 (2006.01)
B29K 105/04 (2006.01)

(52) U.S. Cl.
CPC . *A43B 13/04* (2013.01); *A47C 4/54* (2013.01); *B29C 44/583* (2013.01); *C08K 5/0016* (2013.01); *A47C 27/085* (2013.01); *A47C 27/15* (2013.01); *B29C 47/0004* (2013.01); *B29C 47/0028* (2013.01); *A47C 7/021* (2013.01); *C08L 51/006* (2013.01); *B29C 44/50* (2013.01); *C08L 53/025* (2013.01); *B29C 47/12* (2013.01); *C08K 5/01* (2013.01); *A47C 27/144* (2013.01); *C08L 53/02* (2013.01); *B29C 2793/009* (2013.01); *Y10S 5/909* (2013.01); *B29L 2031/60* (2013.01); *B29C 47/884* (2013.01); *B29K 2105/04* (2013.01); *Y10S 5/948* (2013.01); *Y10S 5/953* (2013.01); *Y10T 428/24322* (2015.01); *Y10T 428/24331* (2015.01); *C08L 2666/02* (2013.01)

(58) Field of Classification Search
None
See application file for complete search history.

(56) References Cited

To view the complete listing of prior art documents cited during the proceeding for Reexamination Control Number 90/013,363, please refer to the USPTO's public Patent Application Information Retrieval (PAIR) system under the Display References tab.

*Primary Examiner* — Cary Wehner

(57) ABSTRACT

A cushioning element that has a number of substantially parallel elongate columns which buckle under an appropriate load. The cushioning element may be formed from a soft, easily deformable elastic or visco-elastic cushioning media. As a force is exerted against the cushioning element generally parallel to a column, the cushioning media may compress, and eventually the walls of the column may buckle. This equalizes pressure across the contact area of the object being cushioned.

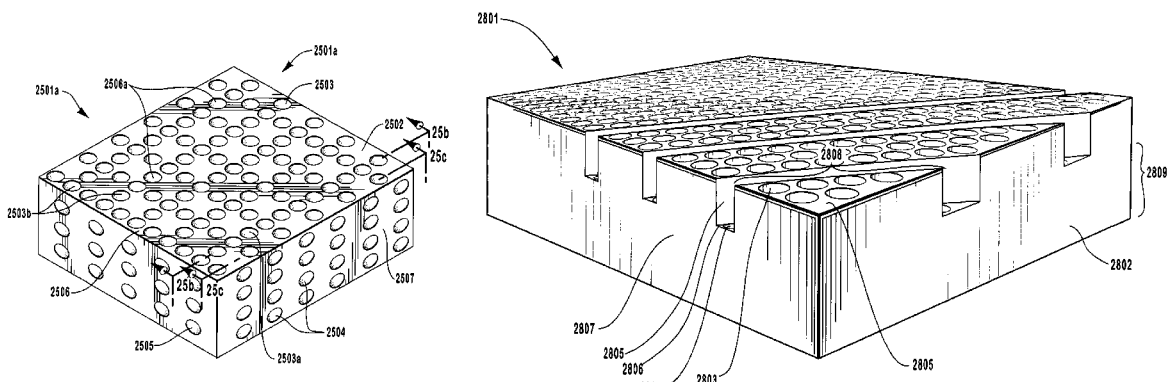

EX PARTE REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1 and 33 is confirmed.

Claims 2-32 and 34-41 were not reexamined.

\* \* \* \* \*